US012665188B2

(12) United States Patent
Chen

(10) Patent No.: US 12,665,188 B2
(45) Date of Patent: Jun. 23, 2026

(54) ULTRA-STABLE SILICON ANODE BY THREE-DIMENSIONAL NANOARCHITECTURE DESIGN

(71) Applicant: The Johns Hopkins University, Baltimore, MD (US)

(72) Inventor: Mingwei Chen, Cockeysville, MD (US)

(73) Assignee: The Johns Hopkins University, Baltimore, MD (US)

( * ) Notice: Subject to any disclaimer, the term of this patent is extended or adjusted under 35 U.S.C. 154(b) by 759 days.

(21) Appl. No.: 17/912,199

(22) PCT Filed: Mar. 16, 2021

(86) PCT No.: PCT/US2021/022614
§ 371 (c)(1),
(2) Date: Sep. 16, 2022

(87) PCT Pub. No.: WO2021/188579
PCT Pub. Date: Sep. 23, 2021

(65) Prior Publication Data
US 2023/0197935 A1      Jun. 22, 2023

Related U.S. Application Data

(60) Provisional application No. 62/990,280, filed on Mar. 16, 2020.

(51) Int. Cl.
| | |
|---|---|
| *H01M 4/36* | (2006.01) |
| *H01M 4/02* | (2006.01) |
| *H01M 4/04* | (2006.01) |
| *H01M 4/38* | (2006.01) |
| *H01M 4/58* | (2010.01) |
| *H01M 4/583* | (2010.01) |

(Continued)

(52) U.S. Cl.
CPC ......... *H01M 4/366* (2013.01); *H01M 4/0404* (2013.01); *H01M 4/0426* (2013.01); *H01M 4/0428* (2013.01); *H01M 4/382* (2013.01); *H01M 4/386* (2013.01); *H01M 4/5825* (2013.01); *H01M 4/583* (2013.01); *H01M 4/661* (2013.01); *H01M 4/745* (2013.01); *H01M 10/0525* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2013/0052537 A1 | 2/2013 | Takeuchi et al. |
| 2015/0044564 A1 | 2/2015 | Wang et al. |

(Continued)

OTHER PUBLICATIONS

Snyder et al., "Oxygen Reduction Reaction in Nanoporous Metal/Ionic Liquid Composite Electrocatalysts", Nat. Mater., (Nov. 2010), vol. 9, pp. 904-907.

(Continued)

*Primary Examiner* — Scott J. Chmielecki
(74) *Attorney, Agent, or Firm* — Venable LLP; Ryan Ward

(57) ABSTRACT

An electrode includes an electrically conductive porous graphene core; a silicon layer disposed on an internal surface of the porous graphene core; and an ion-conductive hybrid silicate layer disposed on the silicon layer.

26 Claims, 40 Drawing Sheets

100

106
104
102

(51) Int. Cl.
  *H01M 4/66* (2006.01)
  *H01M 4/74* (2006.01)
  *H01M 10/0525* (2010.01)

(56) References Cited

U.S. PATENT DOCUMENTS

| | | | | |
|---|---|---|---|---|
| 2019/0044128 | A1* | 2/2019 | Mckinney | H01M 4/134 |
| 2019/0044134 | A1* | 2/2019 | Liu | H01M 4/1395 |
| 2020/0127277 | A1* | 4/2020 | Lu | H01M 4/133 |
| 2020/0136130 | A1* | 4/2020 | Choi | H01M 4/1395 |
| 2020/0161634 | A1* | 5/2020 | Kim | H01M 4/133 |
| 2020/0194785 | A1* | 6/2020 | Jung | H01M 4/625 |
| 2020/0227730 | A1* | 7/2020 | Zhamu | H01M 10/0525 |
| 2021/0218064 | A1* | 7/2021 | Lida | H01M 4/364 |
| 2022/0115646 | A1* | 4/2022 | Colwell | H01M 4/366 |
| 2023/0197935 | A1* | 6/2023 | Chen | H01M 4/625 |
| | | | | 429/231.8 |

OTHER PUBLICATIONS

Han et al., "Full Performance Nanoporous Graphene Based Li?O2 Batteries through Solution Phase Oxygen Reduction and Redox? Additive Mediated Li2O2 Oxidation", Adv. Energy Mater., (2017), vol. 7, (7 pages).
Qiu et al., "Metal and Nonmetal Codoped 3D Nanoporous Graphene for Efficient Bifunctional Electrocatalysis and Rechargeable Zn-Air Batteries", Adv. Mater., (2019), vol. 31, (7 pages).
Yu et al., "Li Storage in 3D Nanoporous Au-Supported Nanocrystalline Tin", Adv. Mater., (2011), vol. 23, 2443-2447.
Huang et al., "Lithiophilic 3D Nanoporous Nitrogen?Doped Graphene for Dendrite?Free and Ultrahigh?Rate Lithium?Metal Anodes", Adv. Mater., (2019), vol. 31, (7 pages).
Huang et al., "Graphene-Based Quasi-Solid-State Lithium-Oxygen Batteries with High Energy Efficiency and a Long Cycling Lifetime", NPG Asia Mater., (2018), vol. 10, 1037-1045.
Yao et al., "Carbon Welding by Ultrafast Joule Heating", Nano Lett., (2016), vol. 16, pp. 7282-7289.
Han et al., "Low-Temperature Carbide-Mediated Growth of Bicontinuous Nitrogen-Doped Mesoporous Graphene as an Efficient Oxygen Reduction Electrocatalyst", Adv. Mater., (2018), vol. 30, (8 pages).
Niu et al., "Direct amination of Si nanoparticles for the preparation of Si@ultrathin SIOx@graphene nanosheets as high performance lithium-ion battery anodes", Journal of Materials Chemistry A, (Aug. 19, 2015), vol. 3, pp. 19892-19900.
Raistrick et al., "Ionic Conductivity of Some Lithium Silicates and Aluminosilicates", Journal of the Electrochemical Society, (Oct. 10, 1976), vol. 123, No. 10, pp. 1469-1476.
Bai et al., "Si@SiOx/graphene hydrogel composite anode for lithium-ion battery", Journal of Power Sources, (Feb. 29, 2016), vol. 306, pp. 42-48.
Goodenough et al., "Challenges for Rechargeable Li Batteries", Chem. Mater., (2009), vol. 22, pp. 587-603.
Nitta et al., "Li-Ion Battery Materials: Present and Future", Mater. Today, (2015), vol. 18, No. 5, pp. 252-264.
Armand et al., "Building Better Batteries", Nature, (Feb. 2008), vol. 451, pp. 652-657.
Choi et al., "Promise and Reality of Post-Lithium-Ion Batteries with High Energy Densities", Nat. Rev. Mater., (Apr. 2016), vol. 1, (16 pages).
Choi et al., "Challenges Facing Lithium Batteries and Electrical Double-Layer Capacitors", Angew. Chem. Int. Ed., (2012), vol. 51, pp. 9994-10024.
Thackeray et al., "Electrical Energy Storage for Transportation-Approaching the Limits of, and Going Beyond, Lithium-Ion Batteries", Energy Environ. Sci., (2012), vol. 5, pp. 7854-7863.
Reddy et al., "Metal Oxides and Oxysalts as Anode Materials for Li Ion Batteries", Chem. Rev., (2013), vol. 113, pp. 5364-5457.
Li et al., "Hiigh-Voltage Positive Electrode Materials for Lithium-Ion Batteries", Chem. Soc. Rev., (2017), vol. 46, pp. 3006-3059.

Li et al., "Graphene Hybridization for Energy Storage Applications", Chem. Soc. Rev., (2018), vol. 47, pp. 3189-3216.
Winter et al., "Before Li Ion Batteries", Chem. Rev., (2018), vol. 118, pp. 11433-11456.
Park et al., Li-Alloy Based Anode Materials for Li Secondary Batteries, Chem. Soc. Rev., (2010), vol. 39, pp. 3115-3141.
Son et al., "Quantification of Pseudocapacitive Contribution in Nanocage-Shaped Silicon-Carbon Composite Anode", Adv. Energy Mater., (2019), vol. 9, (8 pages).
An et al., "Green, Scalable, and Controllable Fabrication of Nanoporous Silicon from Commercial Alloy Precursors for High-Energy Lithium-Ion Batteries", ACS Nano, (2018), vol. 12, pp. 4993-5002.
Zuo et al., "Self-Templating Construction of 3D Hierarchical Macro-/Mesoporous Silicon from 0D Silica Nanoparticles", ACS Nano, (2016), vol. 11, pp. 889-899.
Lee et al., "Everlasting Living and Breathing Gyroid 3D Network in Si@SiOx/C Nanoarchitecture for Lithium Ion Battery", ACS Nano, (2019), vol. 13, pp. 9607-9619.
Park et al., "High Areal Capacity Battery Electrodes Enabled by Segregated Nanotube Networks", Nat. Energy, (Jul. 2019), vol. 4, pp. 560-567.
Zhang et al., "A Yolk-Shell Structured Silicon Anode with Superior Conductivity and High Tap Density for Full Lithium-Ion Batteries", Angew. Chem. Int. Ed., (2019), vol. 58, pp. 8824-8828.
Ge et al., "Scalable Preparation of Porous Silicon Nanoparticles and Their Application for Lithium-Ion Battery Anodes", Nano Res., (2013), vol. 6, No. 3, pp. 174-181.
Li et al., "Growth of Conformal Graphene Cages on Micrometre-Sized Silicon Particles as Stable Battery Anodes", Nat. Energy, (Feb. 2016), vol. 1, Article No. 15029, (9 pages).
Chan et al., "Solution-Grown Silicon Nanowires for Lithium-Ion Battery Anodes", ACS Nano, (2010), vol. 4, No. 3, pp. 1443-1450.
Ge et al., "Porous Doped Silicon Nanowires for Lithium Ion Battery Anode with Long Cycle Life.", Nano Lett., (2012), vol. 12, pp. 2318-2323.
Ryu et al., "Mechanical Mismatch-Driven Rippling in Carbon-Coated Silicon Sheets for Stress-Resilient Battery Anodes", Nat. Commun., (2018), vol. 9, (8 pages).
Ko et al., "Scalable Synthesis of Silicon-Nanolayer-Embedded Graphite for High-Energy Lithium-Ion Batteries", Nat. Energy, (Sep. 2016), vol. 1, (8 pages).
Li et al., "Mesoporous Silicon Sponge as an Anti-Pulverization Structure for High-Performance Lithium-Ion Battery Anodes", Nat. Commun., (Jul. 8, 2014), vol. 5, (7 pages).
Huang et al. "Controllable Synthesis of Hollow Si Anode for Long-Cycle-Life Lithium-Ion Batteries", Adv. Mater., (2014), vol. 26, pp. 4326-4332.
Li et al., "From Commercial Sponge Toward 3D Graphene-Silicon Networks for Superior Lithium Storage", Adv. Energy Mater., (2015), vol. 5, (7 pages).
Xu et al., "Watermelon-Inspired Si/C Microspheres with Hierarchical Buffer Structures for Densely Compacted Lithium-Ion Battery Anodes", Adv. Energy Mater., (2017), vol. 7, (6 pages).
Chen et al., "Dual-Functionalized Double Carbon Shells Coated Silicon Nanoparticles for High Performance Lithium-Ion Batteries", Adv. Mater., (2017), vol. 29, (8 pages).
Wei et al., "Improving the Performance of Micro-Silicon Anodes in Lithium-Ion Batteries with a Functional Carbon Nanotube Interlayer", ChemElectroChem., (2018), vol. 5, pp. 3143-3149.
Wei et al., "Multiphase Ge-Based Ge/FeGe/FeGe2/C Composite Anode for High Performance Lithium Ion Batteries", Electrochim. Acta, (2017), vol. 253, pp. 522-529.
Liu et al., "Synergy of Epoxy Chemical Tethers and Defect-Free Graphene in Enabling Stable Lithium Cycling of Silicon Nanoparticles", Angew. Chem. Int. Ed., (2019), vol. 58, pp. 16590-16600.
Liu et al., "Pristine or Highly Defective? Understanding the Role of Graphene Structure for Stable Lithium Metal Plating", Adv. Energy Mater., (2019), vol. 9, (12 pages).
Shen et al., "Hierarchical Carbon-Coated Ball-Milled Silicon: Synthesis and Applications in Free-Standing Electrodes and High-Voltage Full Lithium-Ion Batteries", ACS Nano, (2018), vol. 12, pp. 6280-6291.

(56) References Cited

OTHER PUBLICATIONS

Han et al., "Bilayered Nanoporous Graphene/Molybdenum Oxide for High Rate Lithium Ion Batteries", Nano Energy, (2018), vol. 45, pp. 273-279.

Han et al. "Effect of Chemical Doping on Cathodic Performance of Bicontinuous Nanoporous Graphene for Li—O2 Batteries", Adv. Energy Mater., (2016), vol. 6, (9 pages).

Guo et al., "3D Nanoporous Nitrogen-Doped Graphene with Encapsulated RuO2 Nanoparticles for Li—O2 Batteries", Adv. Mater., (2015), vol. 27, pp. 6137-6143.

Ito et al., "Bicontinuous Nanoporous N-doped Graphene for the Oxygen Reduction Reaction", Adv. Mater., (2014), vol. 26, pp. 4145-4150.

Ito et al., "Correlation Between Chemical Dopants and Topological Defects in Catalytically Active Nanoporous Graphene", Adv. Mater., (2016), vol. 28, pp. 10644-10651.

Chen et al., "Heavily Doped and Highly Conductive Hierarchical Nanoporous Graphene for Electrochemical Hydrogen Production", Angew. Chem. Int. Ed., (2018), vol. 57, pp. 13302-13307.

Ito et al., "Multifunctional Porous Graphene for High-Efficiency Steam Generation by Heat Localization", Adv. Mater., (2015), vol. 27, pp. 4302-4307.

Liu et al., "Fabrication of Hybrid Silicate Coatings by a Simple Vapor Deposition Method for Lithium Metal Anodes", Adv. Energy Mater., (2018), vol. 8, (7 pages).

Shen et al., "Ultrathin Conformal Polycyclosiloxane Films to Improve Silicon Cycling Stability", Sci. Adv., (2019), vol. 5, (11 pages).

Nanda et al., "Unraveling the Nanoscale Heterogeneity of Solid Electrolyte Interphase Using Tip-Enhanced Raman Spectroscopy", Joule, (Aug. 21, 2019), vol. 3, pp. 2001-2019.

Szczech et al., Nanostructured Silicon for High Capacity Lithium Battery Anodes, Energy Environ. Sci., (2011), vol. 4, pp. 56-72.

Obrovac et al., Alloy Negative Electrodes for Li-Ion Batteries, Chem. Rev., (2014), vol. 114, pp. 11444-11502.

Shen et al., "Research Progress on Silicon/Carbon Composite Anode Materials for Lithium-Ion Battery", J. Energy Chem., (2018), vol. 27, pp. 1067-1090.

Mukanova et al., "A Mini-Review on the Development of Si-Based Thin Film Anodes for Li-Ion Batteries", Mater. Today Energy, (2018), vol. 9, pp. 49-66.

Hou et al., "The Influence of FEC on the Solvation Structure and Reduction Reaction of LiPF6/EC Electrolytes and Its Implication for Solid Electrolyte Interphase Formation", Nano Energy, (2019), vol. 64, (13 pages).

Fujita et al., "Atomic Origins of the High Catalytic Activity of Nanoporous Gold", Nat. Mater., (2012), vol. 11, pp. 775-780.

Lang et al., "Nanoporous Metal/Oxide Hybrid Electrodes for Electrochemical Supercapacitors", Nat. Nanotechnol., (2011), vol. 6, pp. 232-236.

* cited by examiner

100

106
104
102

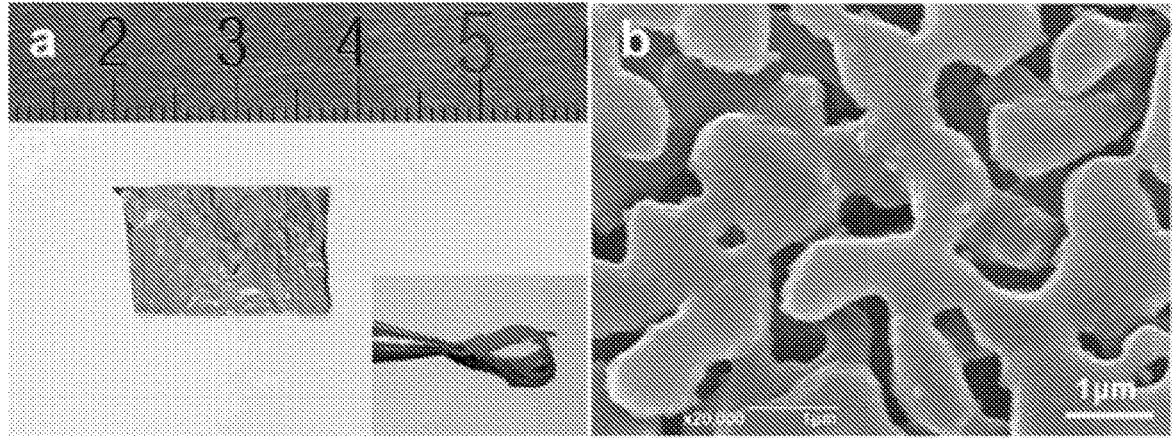
FIG. 3A                    FIG. 3B
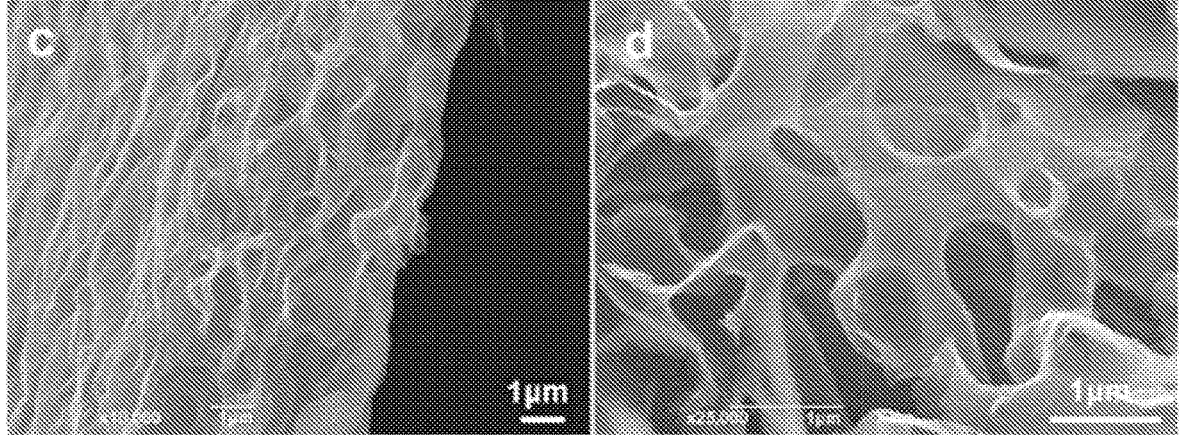
FIG. 3C                    FIG. 3D

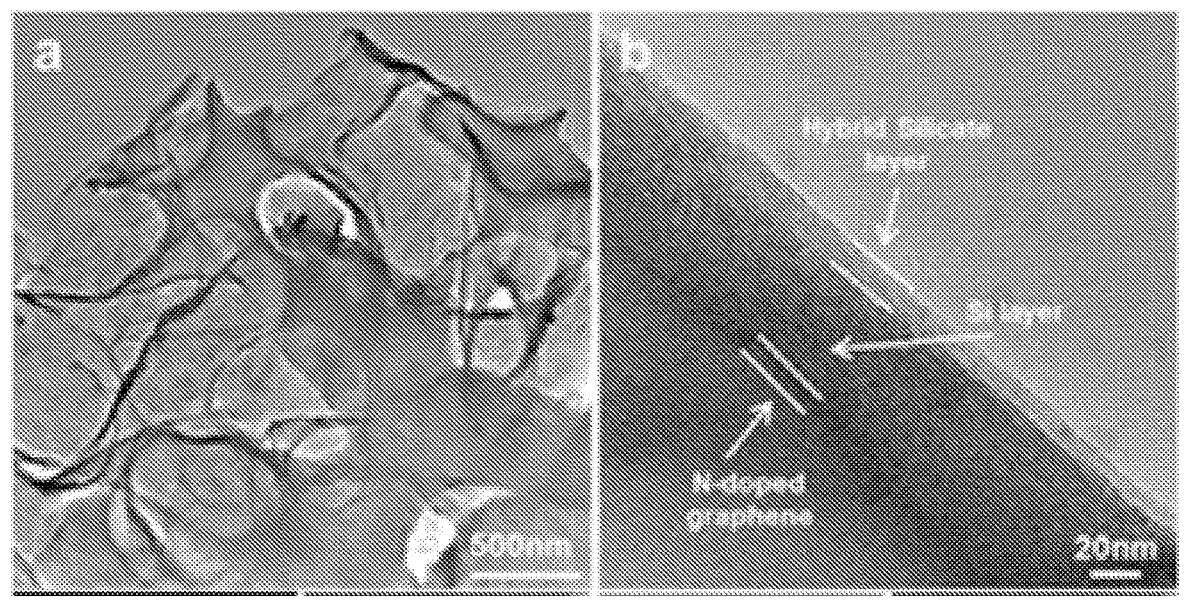
FIG. 4A                                    FIG. 4B
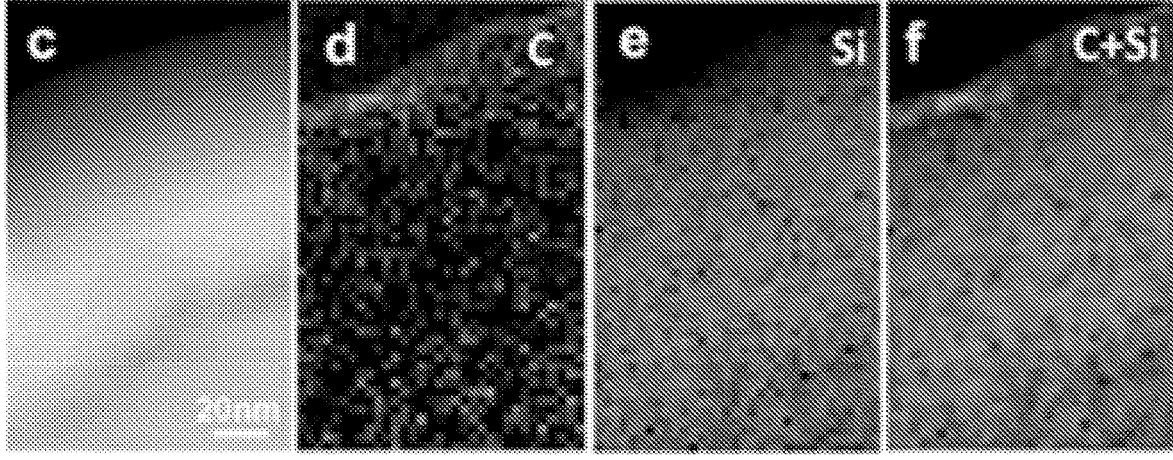
FIG. 4C          FIG. 4D          FIG. 4E          FIG. 4F

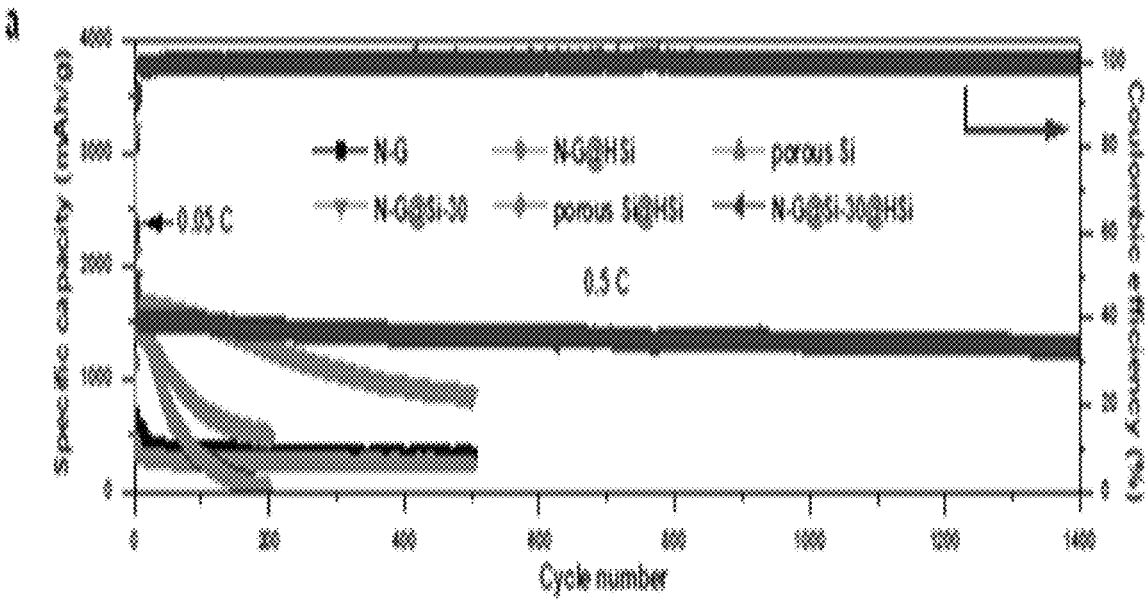
FIG. 5A
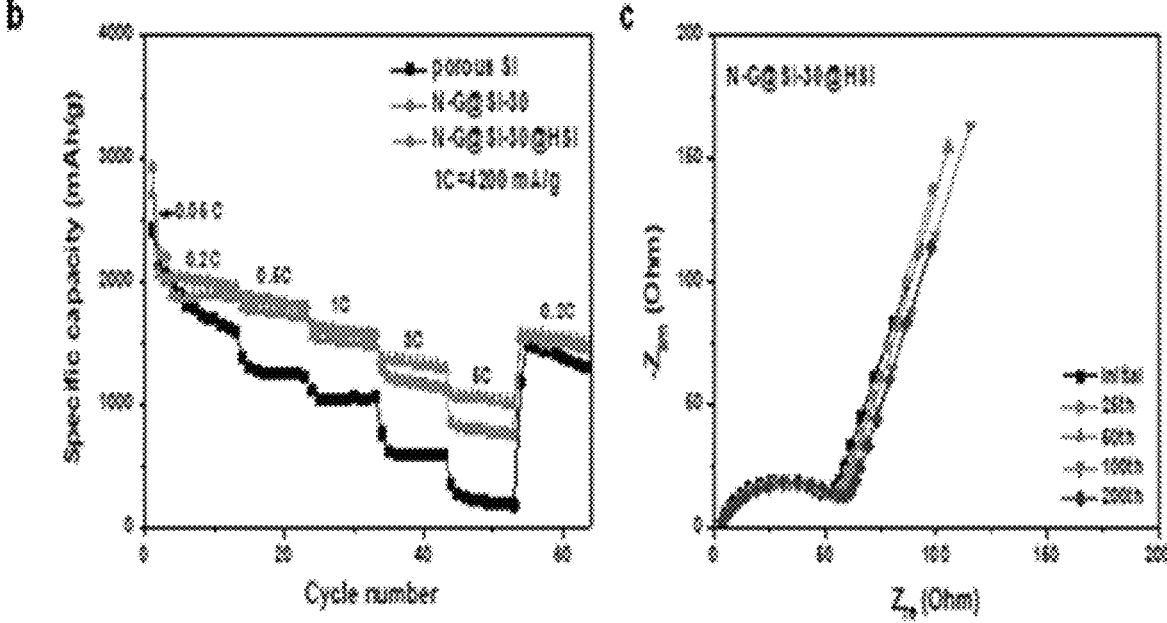
FIG. 5B                                    FIG. 5C

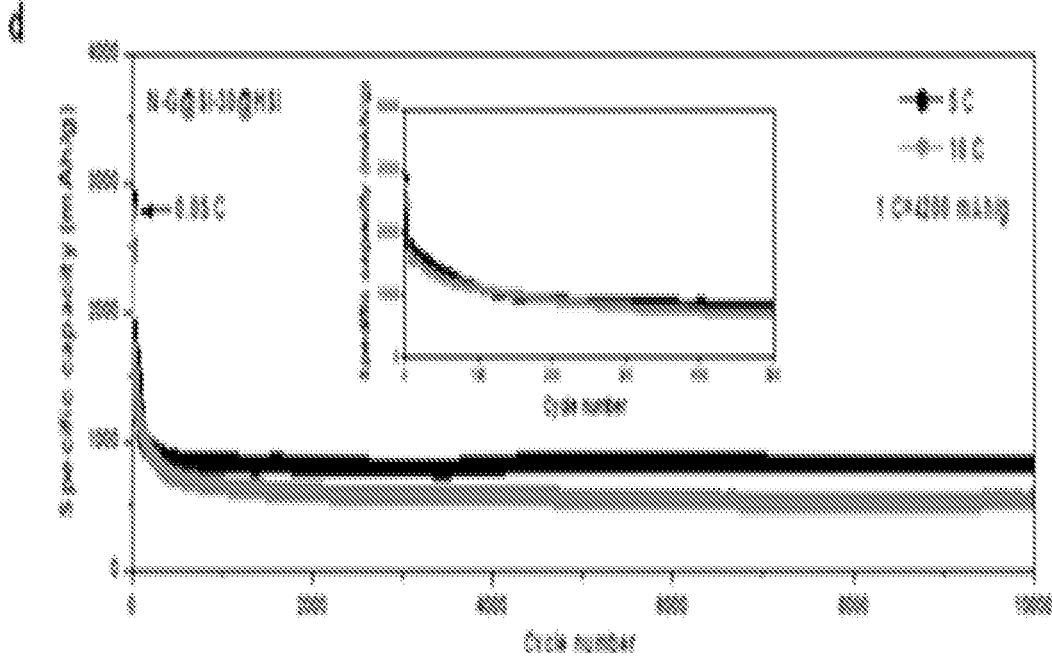
FIG. 5D
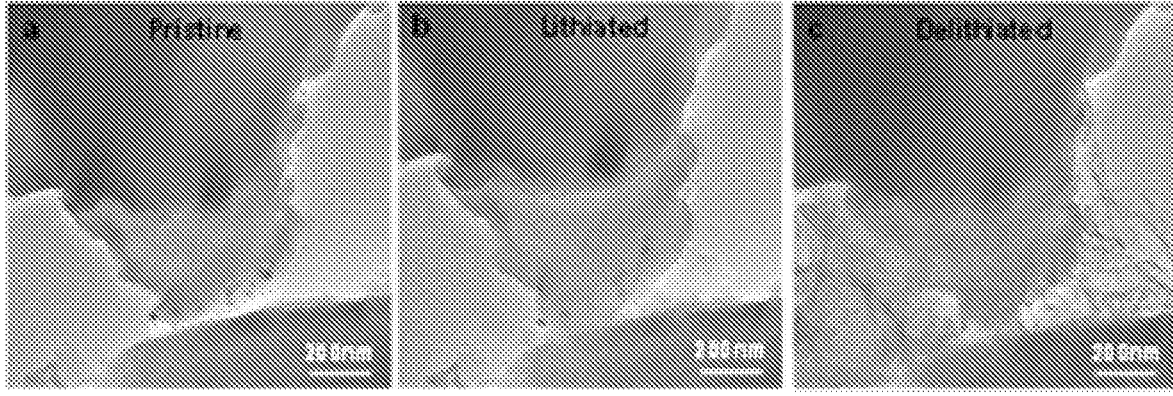
FIG. 6A                    FIG. 6B                    FIG. 6C

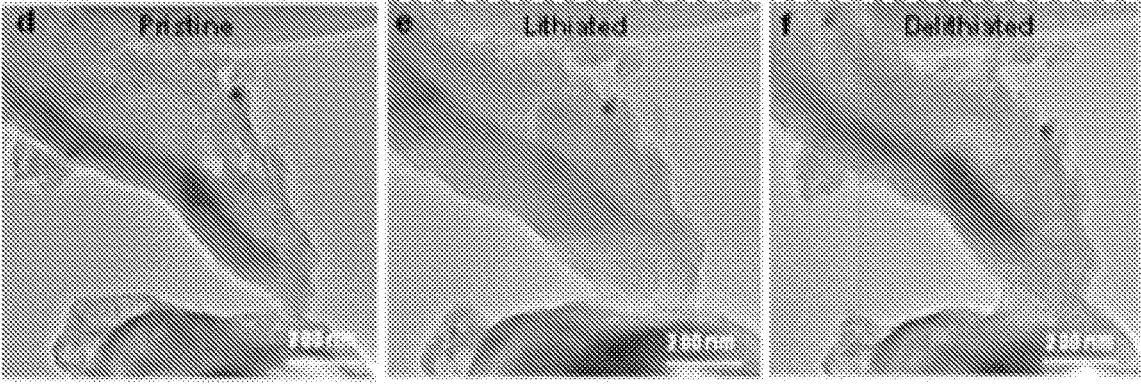
FIG. 6D            FIG. 6E            FIG. 6F
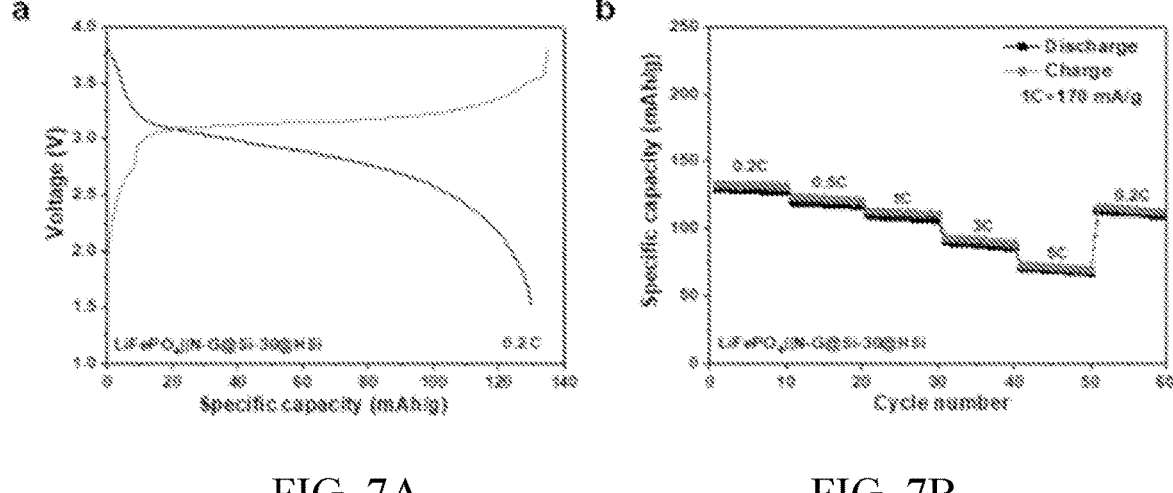
FIG. 7A                    FIG. 7B

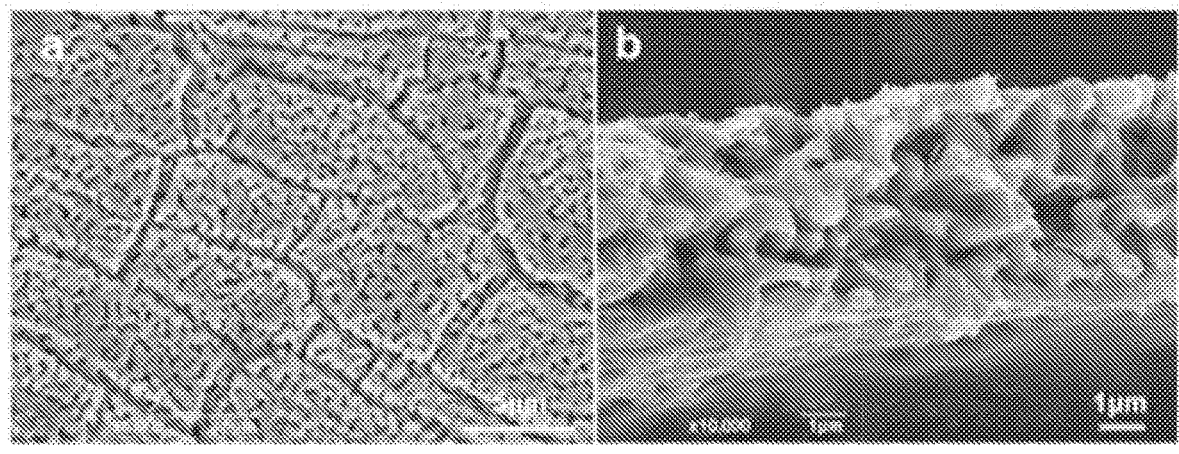
FIG. 9A                              FIG. 9B
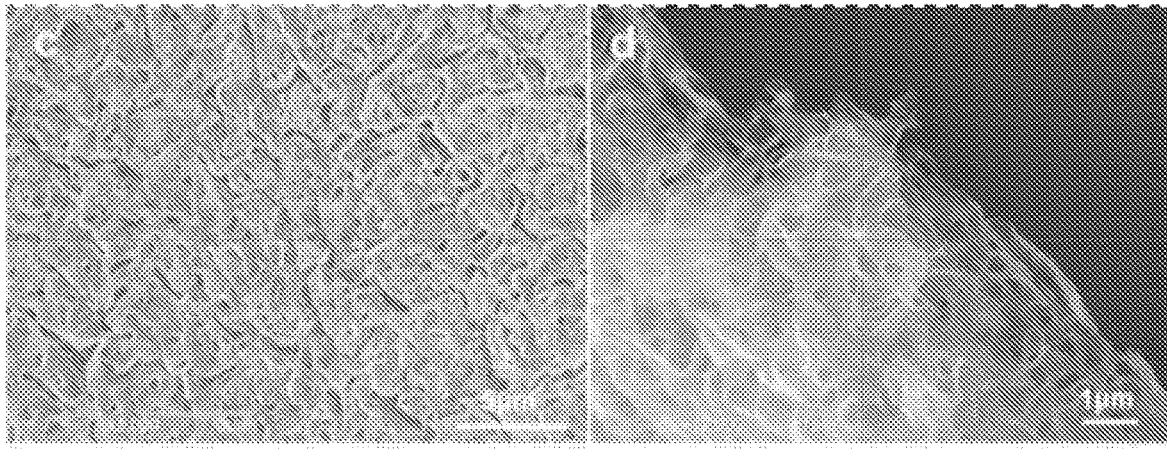
FIG. 9C                              FIG. 9D

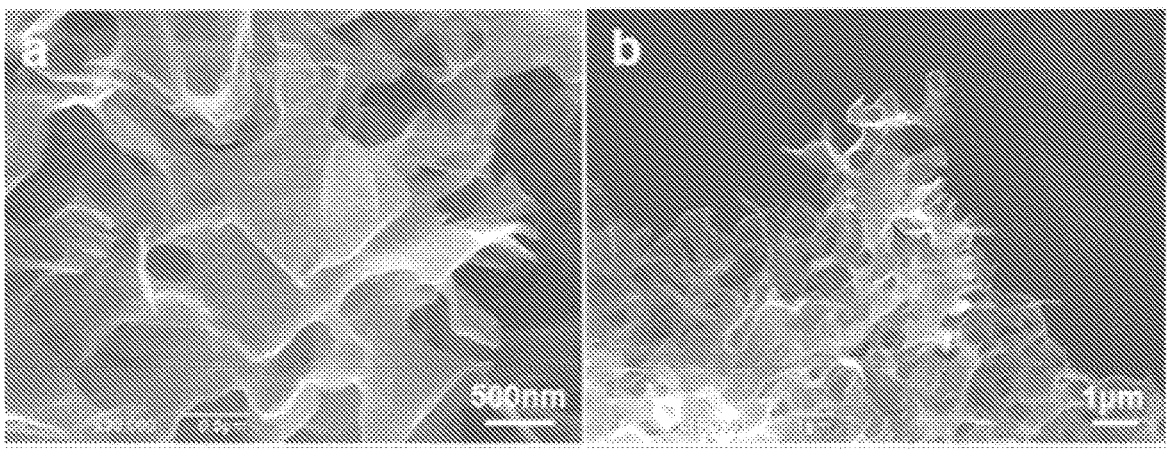
FIG. 14A                    FIG. 14B
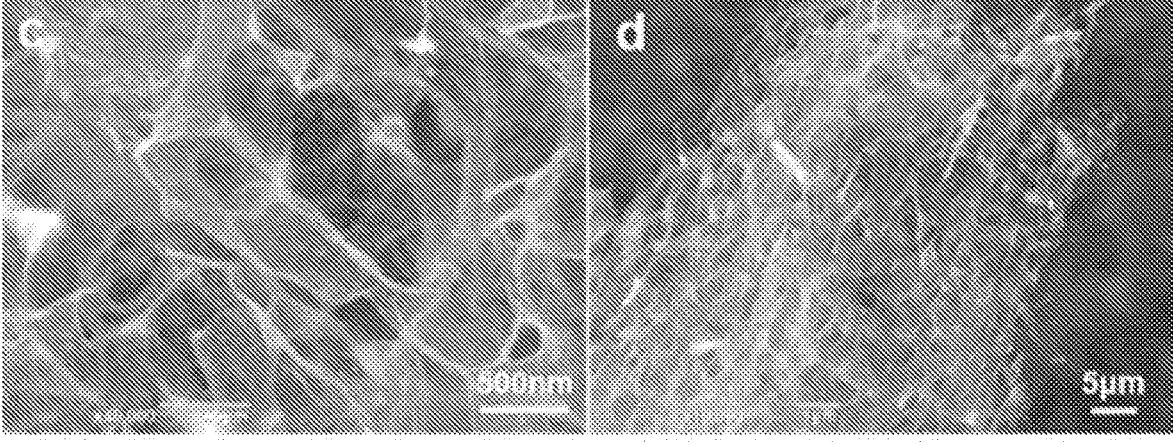
FIG. 14C                    FIG. 14D

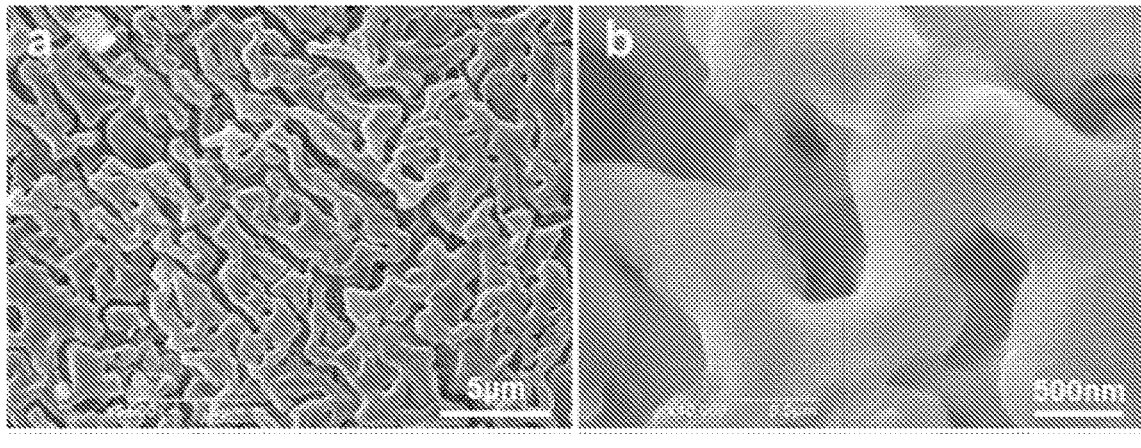
FIG. 21A                    FIG. 21B
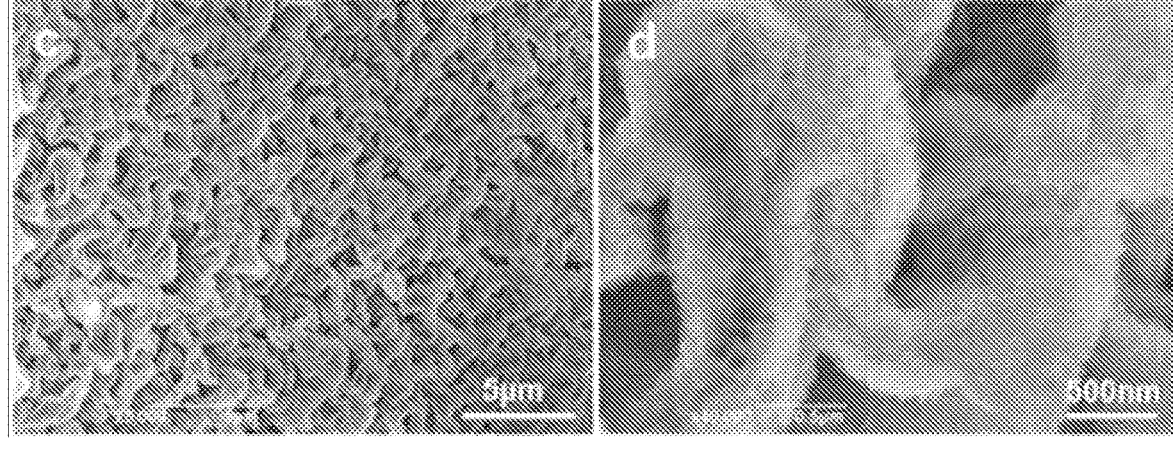
FIG. 21C                    FIG. 21D

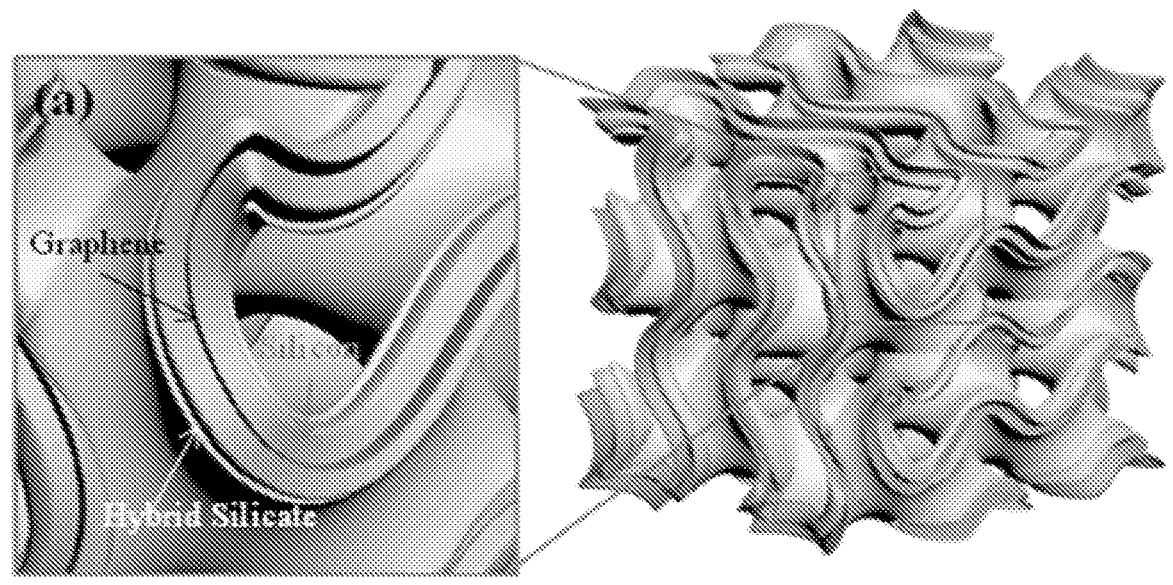
FIG. 27A-z                    FIG. 27A

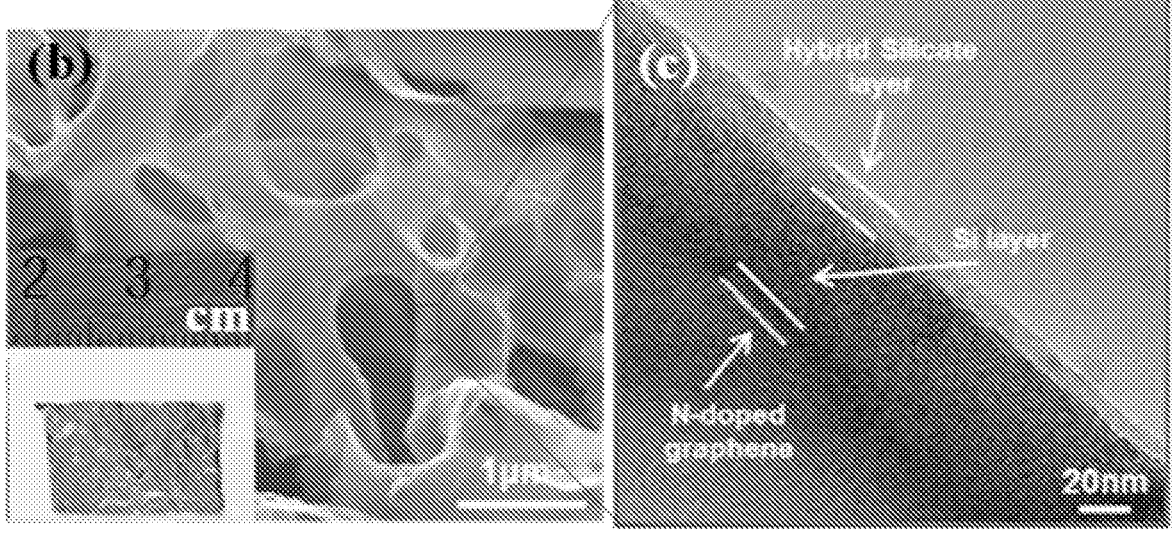
FIG. 27B                   FIG. 27C

ULTRA-STABLE SILICON ANODE BY THREE-DIMENSIONAL NANOARCHITECTURE DESIGN

CROSS REFERENCE TO RELATED APPLICATION

This application is a U.S. National Stage Application of PCT/US2021/022614, filed on Mar. 16, 2021, which claims priority benefit from U.S. provisional patent application No. 62/990,280 filed on Mar. 16, 2020, the entire contents of which are incorporated herein by reference. All references cited anywhere in this specification, including the Background and Detailed Description sections, are incorporated by reference as if each had been individually incorporated.

BACKGROUND

The field of the currently claimed embodiments of this invention relates to electrodes and batteries and methods of making the electrodes.

Conventional carbonaceous anodes are approaching their achievable performance limit in Li-ion batteries. Silicon has been recognized as one of the most promising anodes for next-generation Li-ion batteries due to its advantageous specific capacity and secure working potential. However, the practical implementation of silicon anodes needs to overcome the challenges of substantial volume change, intrinsic low conductivity and unstable solid electrolyte interphase (SEI) films.

SUMMARY OF THE DISCLOSURE

An aspect of the present disclosure is to provide an electrode including: an electrically conductive porous graphene core; a silicon layer disposed on an internal surface of the porous graphene core; and an ion-conductive hybrid silicate layer disposed on the silicon layer.

Another aspect of the present invention is to provide a method of making an electrode. The method includes growing N-doped graphene on an internal surface of porous nickel (Ni) to obtain a substrate having a three-dimensional bi-continuous N-doped graphene on nickel such that the N-doped graphene covers a pore surface of the porous nickel; etching the nickel in the substrate to remove the nickel and form a porous N-doped graphene core; depositing a silicon (Si) layer into the porous N-doped graphene core; and depositing a layer of inorganic-organic hybrid silicate on the silicon layer to obtain an electrode having the silicon layer sandwiched between the porous N-doped graphene and the layer of inorganic-organic hybrid silicate.

A further aspect of the present invention is to provide an electrical battery including a cathode, and an anode spaced apart from the cathode. The anode includes an electrically conductive porous graphene core; a silicon layer disposed on an internal surface of the porous graphene core, and an ion-conductive hybrid silicate layer disposed on the silicon layer. The electrical battery also includes an electrolyte configured to transfer electric charge between the cathode and the anode.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 3A is an Optical image of the free-standing and flexible N-G@Si-30@HSi anode, according to an embodiment of the present invention;

FIG. 3B is a zoomed-in SEM image of the N-G@Si-30@HSi anode, according to an embodiment of the present invention;

FIG. 3C is a low magnification cross-sectional SEM image of the N-G@Si-30@HSi anode, according to an embodiment of the present invention;

FIG. 3D is a zoomed-in cross-sectional SEM image of the N-G@Si-30@HSi anode, according to an embodiment of the present invention;

FIGS. 4A and 4B are TEM images of the N-G@Si-30@HSi, according to an embodiment of the present invention;

FIG. 4C shows a HAADF-STEM image, according to an embodiment of the present invention;

FIGS. 4D-4F are elemental mappings of the N-G@Si-30@HSi, according to an embodiment of the present invention;

FIG. 5A depicts a Half-cell cycling performance of the N-G, N-G@HSi, porous Si, N-G@Si, porous Si@HSi and N-G@Si-30@HSi electrodes and Coulombic efficiency vs. cycle number curve of the N-G@Si-30@HSi electrode, according to an embodiment of the present invention;

FIG. 5B shows a rate capability of the porous Si, N-G@Si and N-G@Si-30@HSi electrodes at various current densities, from 0.2 C to 5 C, according to an embodiment of the present invention;

FIG. 5C shows EIS measurements of the N-G@Si-30@HSi electrode at different cycles, according to an embodiment of the present invention;

FIG. 5D shows a long-term cycling performance of the N-G@Si-30@HSi electrode at 5 and 10 C, according to an embodiment of the present invention;

FIGS. 6A-6C show in situ TEM characterization of the N-G@Si-30, according to an embodiment of the present invention;

FIGS. 6D-6F show TEM characterization of the N-G@Si-30@HSi anodes during the initial lithiation-delithiation process, according to an embodiment of the present invention;

FIG. 7A shows an Electrochemical performance of full LiFePO₄‖N-G@Si-30@HSi cells with a typical charge/discharge curves of the LiFePO₄‖N-G@Si-30@HSi cell at a current density of 0.2 C, according to an embodiment of the present invention;

FIG. 7B shows a rate performance of the LiFePO₄‖N-G@Si-30@HSi cell at a current density range from 0.2 to 5 C, according to an embodiment of the present invention;

FIGS. 9A and 9B are SEM images of Ni@N-G, according to an embodiment of the present invention;

FIGS. 9C and 9D are SEM images of N-G, according to an embodiment of the present invention;

FIGS. 14A-14B are SEM images of N-G@HSi, according to an embodiment of the present invention;

FIGS. 14C-14D are SEM images porous silicate after burning off the N-doped graphene, according to an embodiment of the present invention;

FIGS. 21A-21B are SEM images of N-G@Si-30@HSi, according to an embodiment of the present invention;

FIGS. 21C-21D are SEM images of N-G@Si-30 electrodes after cycling for 1000 times at 5 C, according to an embodiment of the present invention;

FIG. 27A show schematics of the nanoarchitectured anode, according to an embodiment of the present invention;

FIG. 27A-z is a zoomed in portion of FIG. 27A;

FIG. 27B is a SEM image of a prototype anode, according to an embodiment of the present invention;

FIG. 27C is a HRTEM image of the sandwiched nanostructure, according to an embodiment of the present invention;

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "nanoporous" is used herein throughout to broadly include any porosity size from a nanoporous (pores having a size of a few nanometers) to microporous (pores having a size of few micrometers). For example, the pore size can be from about 10 nm to about 10 μm. In general, the porosity is about 50% to 97% of the volume of a bulk material.

Figures 1, 2:
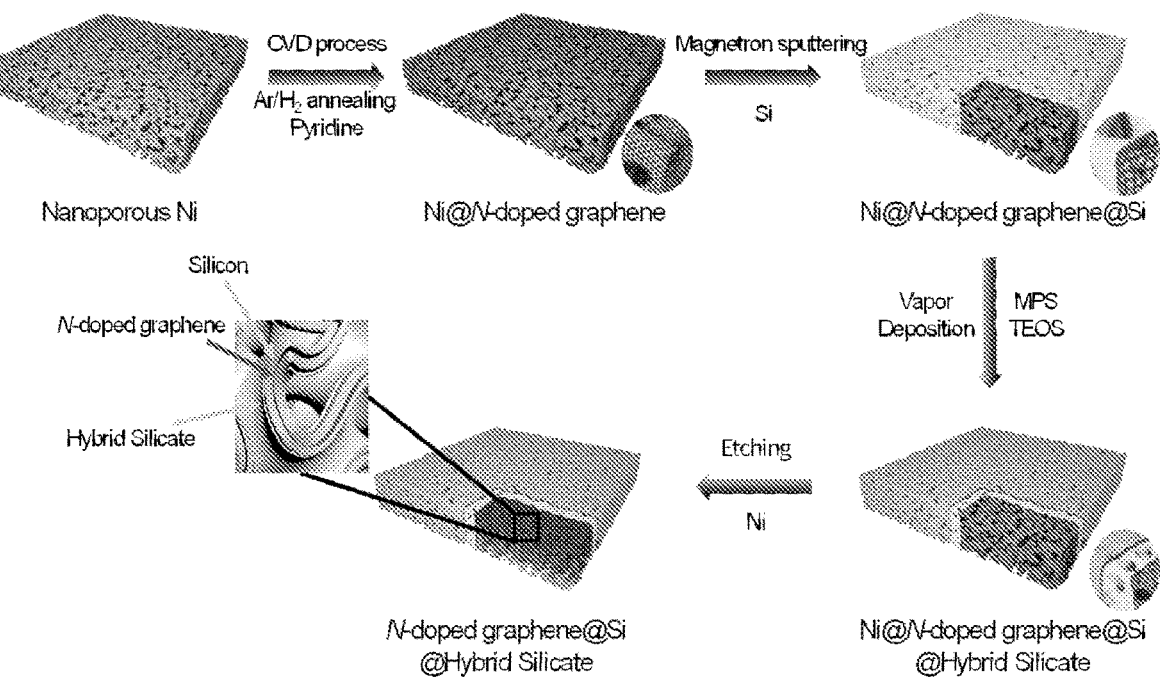
FIG. 1 is a schematic cross-sectional view of an electrode (e.g., an anode), according to an embodiment of the present invention.
FIG. 2 is a schematic illustration of the fabrication process of the nanoporous N-G@Si@HSi anode, according to an embodiment of the present invention.

FIG. 1 is a schematic cross-sectional view of an electrode (e.g., an anode), according to an embodiment of the present invention. The electrode (e.g., anode) has a three-dimensional porous architecture. The skeleton (i.e., walls) of the electrode 100 comprises an electrically conductive graphene core 102. The skeleton 100 further includes a silicon layer 104 disposed on an internal surface of the graphene core 102. The skeleton 100 also includes an ion-conductive hybrid silicate (HSi) layer 106 disposed on the silicon layer 104.

In an embodiment, the electrically conductive graphene core 102 includes N-doped graphene. In an embodiment, the N-doped graphene is porous.

In an embodiment, the ion-conductive hybrid silicate (HSi) layer 106 is configured to prevent electrolyte infiltration into the silicon layer 104. In an embodiment, the ion-conductive hybrid silicate (HSi) layer 106 comprises a layer of inorganic-organic hybrid silicate.

In an embodiment, the ion-conductive hybrid silicate (HSi) layer 106 is configured to regulate solid electrolyte interphase (SEI) on an outer surface of the ion-conductive hybrid silicate layer 106.

In an embodiment, the ion-conductive hybrid silicate (HSi) layer 106 includes silicon oxide Si$_x$O$_y$ and organic moeities. Where x and y are integer numbers. In an embodiment, the organic moeities can be any one of —OCH$_3$, —OCH$_2$CH$_3$ and —CH$_2$CH$_2$SH or any combination thereof.

In an embodiment, a silicon-oxygen bond forms at an interface between the silicon layer 104 and the ion-conductive hybrid silicate layer (HSi) 106.

In an embodiment, the ion-conductive hybrid silicate (HSi) layer 106 has an ionic conductivity greater than 10$^{-6}$ S/cm.

In an embodiment, the silicon layer 104 has a thickness between 10 nm and 500 nm. In an embodiment, the electrically conductive graphene core 102 has a thickness of approximately 0.335 nm (e.g., monolayer) to about 5 nm.

In an embodiment, the electrode 100 has a reversible capacity greater than 1286 mAh/g and a lifespan greater than 1400 cycles. In an embodiment, a mass fraction of the silicon layer 104 to the electrically conductive porous graphene core 102 is higher than 30 wt %.

Another aspect of the present invention is to provide a method of making an electrode. The method includes growing N-doped graphene on an internal surface of porous nickel (Ni) to obtain a substrate having a three-dimensional bi-continuous N-doped graphene on nickel such that the N-doped graphene covers a pore surface of the porous nickel. The method further includes etching the nickel in the substrate to remove the nickel and form a porous N-doped graphene core. The method also includes depositing a silicon (Si) layer on the porous N-doped graphene core. The method further includes depositing a layer of inorganic-organic hybrid silicate on the silicon layer to obtain an electrode (e.g., electrode 100 shown in FIG. 1) having the silicon layer sandwiched between the N-doped graphene and the layer of inorganic-organic hybrid silicate in a 3D porous architecture.

In an embodiment, growing the N-doped graphene on the internal surface of porous nickel (Ni) includes growing the N-doped graphene on the internal surface of the porous nickel by chemical vapor deposition (CVD).

In another embodiment, growing the N-doped graphene on the internal surface of porous nickel (Ni) includes carburizing the porous nickel (Ni) by using a low temperature chemical reaction to form a porous Ni3C, and annealing at a higher temperature to obtain porous graphene on porous nickel. In an embodiment, we start with a dealloyed porous nickel (e.g., nanoporous) and we carburize the nickel by the low temperature chemical reaction (e.g., a temperature of about 180 deg. C.) to obtain the porous Ni3C. We then anneal the Ni3C at the higher temperature (e.g., a temperature of about 500 deg. C.) to form a porous graphene@porous nickel. Further detail can be found in "Low-Temperature Carbide-Mediated Growth of Bi-continuous Nitrogen-Doped Mesoporous Graphene as an efficient Oxygen Reduction Catalyst," Jiuhui Han et al., Adv. Mater. 2018 30, 1803588, the entire content of which is incorporated herein by reference.

In an embodiment, depositing the silicon into the porous N-doped graphene core includes depositing the silicon using a sputtering method. In an embodiment, depositing the silicon into the porous N-doped graphene core includes depositing the silicon for a period of time greater than 30 minutes to generate a loading mass of silicon greater than 0.085 mg/cm$^3$ and a thickness of the silicon layer greater than 59 nm. In an embodiment, depositing the silicon into the porous N-doped graphene core includes coating an internal surface of the N-doped graphene.

In an embodiment, depositing the layer of inorganic-organic hybrid silicate on the silicon layer comprises depositing the layer of inorganic-organic hybrid silicate using a vapor deposition process. In an embodiment, the inorganic-organic hybrid silicate prevents direct contact of the silicon layer with an electrolyte during operation.

Another aspect of the present invention is to provide an electrical battery including a cathode and an anode spaced apart from the cathode. The anode includes an electrically conductive porous graphene core; a silicon layer disposed on an internal surface of the porous graphene core, and an ion-conductive hybrid silicate layer disposed on the silicon layer. The electrical battery further includes an electrolyte configured to transfer electric charge between the cathode and the anode. In an embodiment, the battery is a lithium-ion battery having lithium in the cathode.

In an embodiment, the electrically conductive porous graphene core includes N-doped graphene. In an embodiment, the ion-conductive hybrid silicate (HSi) layer is configured to prevent infiltration of the electrolyte into the silicon layer. In an embodiment, the ion-conductive hybrid silicate (HSi) layer includes silicon oxide $Si_xO_y$ and organic moeities, where x and y are integer numbers.

In an embodiment, the anode is free-standing and re-stackable. The term "free-standing" is used herein to mean that the anode does not need any additional support and can be directly installed in the battery for use. The term "re-stackable" is used herein to mean the anode can be stacked with other anodes to provide increased silicon loading amount (g/cm$^2$). In an embodiment, the multiple anodes are "paper-like" thin sheets and the loading of the silicon can be increased by staking the thin sheets. In this way, the overall areal anode capacity can be increased. Conventional silicon anodes suffer from lower areal silicon loading amounts and poor areal capacity. The present anode solves this and other problems encountered in conventional anodes.

Various practical examples of the structure of the electrode (e.g., anode) and manufacturing methods of the electrode (e.g., anode) as well as practical use in a battery are described in detail the following paragraphs.

According to an embodiment of the present invention, we provide a sandwich N-doped graphene@Si@hybrid silicate anode with bicontinuous porous nanoarchitecture, which can simultaneously conquer various issues of the conventional anodes. For example, in the hybrid Si anode, the nanoporous N-doped graphene can act as a flexible and conductive support and the amorphous hybrid silicate coating can enhance the robustness and suppleness of the electrode and facilitates the formation of stable SEI films. As a result, this ingeniously designed hybrid electrode achieves excellent rate capability and cycling performance (for example, 817 mAh/g at 5 C for 10,000 cycles). Even paired with LiFePO$_4$ cathodes in full batteries, over 100 stable cycling can be readily realized.

Higher energy densities of rechargeable lithium-ion batteries (LIBs) have been intensively pursued to cater the ever-increasing energy demands of mobile devices and electric vehicles. However, graphitic materials, the most commonly used anode materials, cannot satisfy these demands due to their low theoretical capacities. In view of the history of LIB development, each breakthrough in energy density was brought by the exploitation of new electrode materials. Therefore, there is a need of new anode materials that are capable of delivering higher energy density, enduring longer cycling life and possessing secure discharge/charge potentials. Of all possible anode candidates, silicon (Si) stands out owing to its geographical ubiquity, low cost and large reversible capacity (for example, 4200 mAh/g) via an alloying-dealloying reaction with lithium at satisfactory working potentials. However, at least two issues need to be solved before commercial implementation of Si anodes becomes possible: one is the extreme large volume change (>300%) during repetitive charge/discharge cycling, which results in disintegration of the electrodes, contact loss with current collectors, everlasting side reactions with electrolytes, and thus rapid capacity drop and short lifetime. The other issue is the intrinsic poor ionic and electrical conductivity of Si, leading to inferior rate capability. To overcome the volume change issue, a common and effective approach is nano-structuring by decreasing the Si size down to, for example, the nano-regime or incorporating voids or pores within Si nanostructures. The resulting low-dimensional Si nanoparticles, nanowires and nanosheets, porous Si sponges, and hollow Si structures can withstand mechanical strains for extended cycling stability. However, the nanostructures often result in poor ionic/electronic conductivities caused by large inter-particle resistance and surface/interface scattering. The high surface areas of the nanostructures expose more silicon surfaces to electrolyte, which increases side reactions and lower the Coulombic efficiency. Moreover, the nanostructures cannot solve the intrinsic poor electric conduction of Si and its unstable interfaces with electrolytes.

To address these challenges, various Si nanocomposites have been developed by employing conductive reinforcements (graphene, carbon nanotubes, etc.) as supports or coating layers to form 3D graphene-silicon networks, Si/C microspheres and double carbon shells coated silicon nanoparticles. Although these nanocomposites can improve the lithium storage performances of Si to some extent, the fundamental challenges in the stability of Si anodes and SEI films as well as the electronic/ionic conductivity of the nanostructures have not been well solved. In particular, the abundant chemical and structural defects, such as residual oxygen groups, dangling bonds and flaws, in carbon materials, are detrimental to form stable solid electrolyte interphase (SEI) films. Consequently, conquering these issues has not yet been realized for the successful achievement of Si anodes with inspiring rate-capability and long cycling lifespan at a large current density. Moreover, most Si anodes are prepared by slurry casting of the mixture of active Si materials, conductive additives and polymer binders onto Cu foils. The large mass fraction of electrochemically inert binder and current collector significantly sacrifices the advantage of Si in energy density and, more importantly, the conductive additives cannot guarantee stable contact during Si volume changes on cycling.

Graphene with appealing characteristics, such as atomic thickness, high conductivity, large surface area and superb mechanical and electrochemical stability, surpasses many other carbonaceous materials for serving as host materials to accommodate Si. However, constructing a 3D graphene architecture with a well-reserved large accessible surface area and high electric conductivity for electrode applications faces dramatic challenges because of the weak Van der Waals interaction and high contact resistance between 2D graphene sheets.

Different from those 3D porous graphene or graphene foams from the assembly of discrete graphene sheets, the present 3D bi-continuous nanoporous graphene, constructed by a seamlessly interconnected graphene sheet, possesses an excellent structural integrity that can cater all the required properties for building integrated Si anodes with a high conductivity and large volume change tolerance. Moreover, the 3D porous (e.g., nanoporous) graphene is compatible with the hybrid silicate with hard inorganic $Si_xO_y$ and soft organic moieties, like —$OCH_3$, —$OCH_2CH_3$ and —$CH_2CH_2SH$, which has been demonstrated as an artificial SEI film with high mechanical flexibility and chemical stability to stabilize Li anodes. In this study, we developed a porous N-doped graphene@Si@hybrid silicate (N-G@Si@HSi) free-standing anode. In the 3D nanoarchitecture, the nanoporous graphene is used as a strong and conductive backbone and the ion-conductive hybrid silicate (HSi) acts as an outer shell to prevent the electrolyte infiltration into the middle Si layer and to regulate the SEI formation on outer surfaces. With this elaborate configuration and material design, the hybrid Si anode enables efficient endurance of volume changes, fast (de)alloying reaction with Li and stable electrode-electrolyte interface and, as a result, gives rise to excellent cycling performances and rate capability in both half and full cells.

Synthesis and Characterizations of N-G@Si@HSi Anode: FIG. 2 is a schematic illustration of the fabrication process of the nanoporous N-G@Si@HSi anode, according to an embodiment of the present invention. FIG. 2 schematically illustrates the fabrication procedure and the sandwich structure of the porous N-G@Si@HSi anode. First, N-doped graphene (N-G) is grown by chemical vapor deposition (CVD) on the internal surface of dealloyed nanoporous Ni with a 3D bicontinuous structure. The resulting N-G@Ni is used as the substrate to deposit Si by magnetron sputtering.

Figures 10A, 10B, 10C, 10D, 10E, 10F:
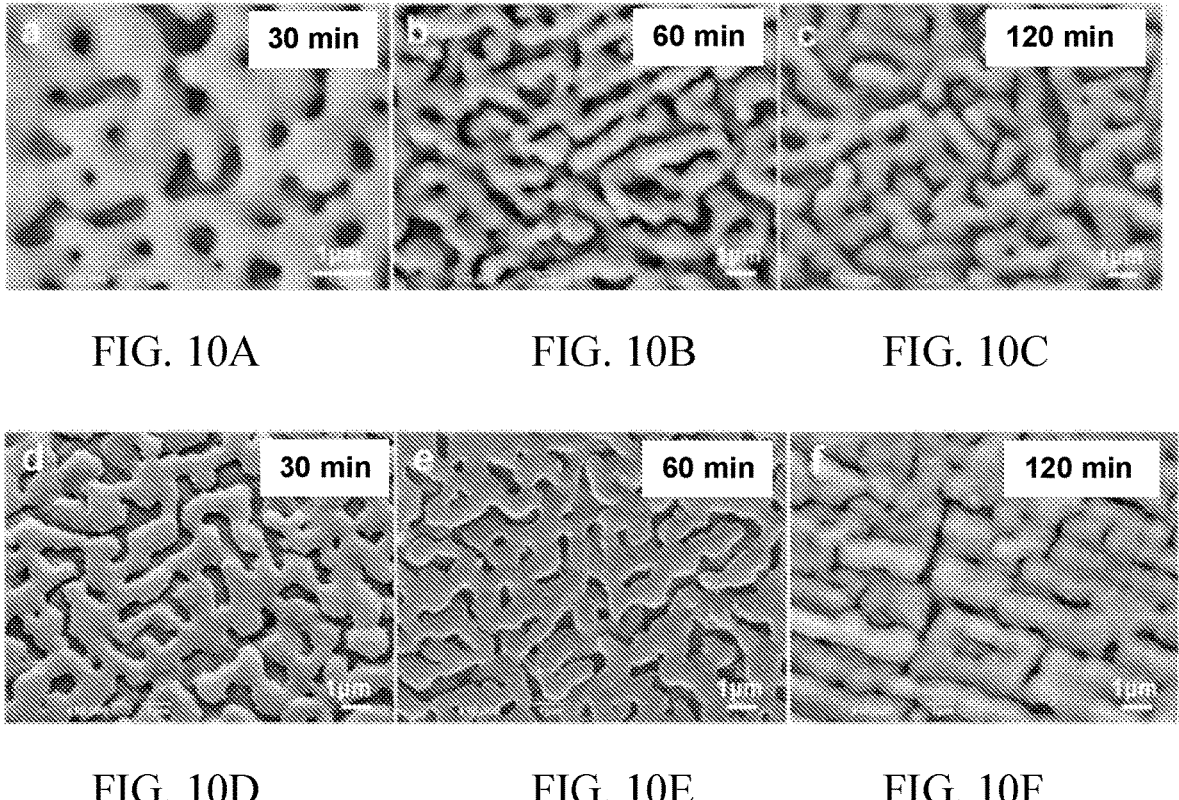
FIGS. 10A-10C are SEM images of Ni@N-G@Si-x, according to an embodiment of the present invention.
FIGS. 10D-10F are SEM images of N-G@Si-x, according to an embodiment of the present invention.

FIGS. 10A-10C are SEM images of Ni@N-G@Si-x, according to an embodiment of the present invention. FIGS. 10D-10F are SEM images of N-G@Si-x (x=30, 60 and 120), according to an embodiment of the present invention. As indicated in FIG. 10A, with a deposition time of 30 min, Si homogeneously coats on the graphene surface of the nanoporous N-G@Ni substrate. Importantly, the loading amount and layer thickness of Si can be rationally controlled by sputtering time (FIGS. 10B-10F). For example, 30, 60 and 120 min depositions generate a loading mass of 0.085, 0.138 and 0.308 mg/cm$^2$ (based on the total mass of N-G and Si) and a Si layer thickness of 59, 139 and 223 nm (N-G@Si-x, x=30, 60 and 120, FIGS. 11A-11F, FIG. 12 and Table 1).

Figures 11A, 11B:
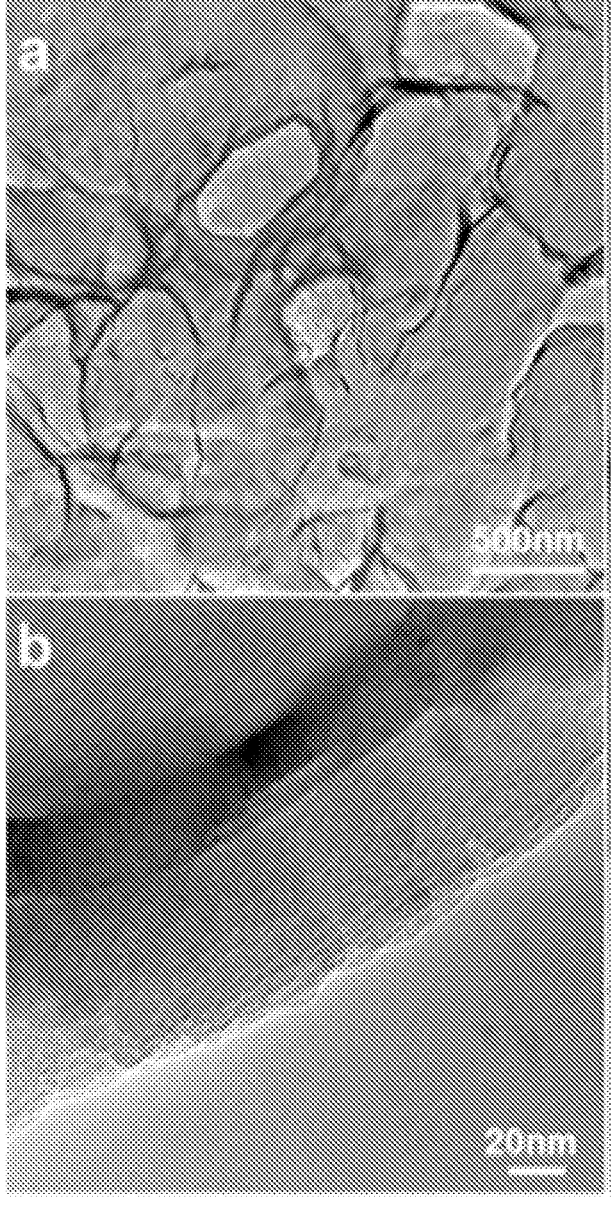
FIGS. 11A-11B are TEM images of the N-G@Si with different Si loading amounts controlled by sputtering time, at 30 min, according to an embodiment of the present invention.
Figures 11C, 11D:
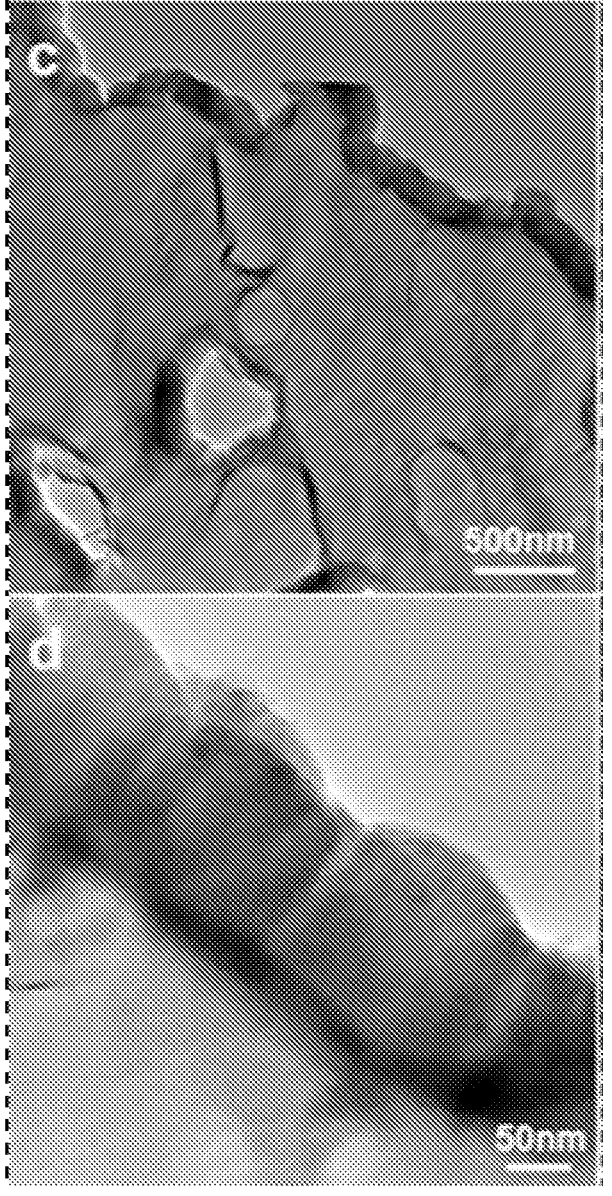
FIGS. 11C-11D are TEM images of the N-G@Si with different Si loading amounts controlled by sputtering time, at 60 min, according to an embodiment of the present invention.
Figures 11E, 11F:
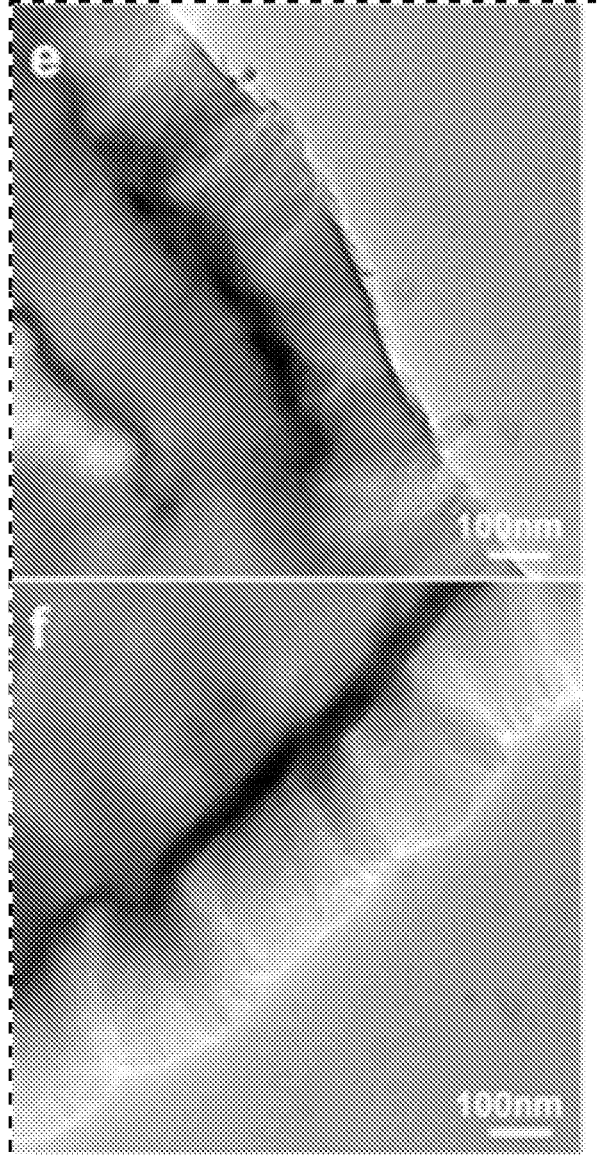
FIGS. 11E-11F are TEM images of the N-G@Si with different Si loading amounts controlled by sputtering time, at (e, f) 120 min, according to an embodiment of the present invention.
Figure 12:
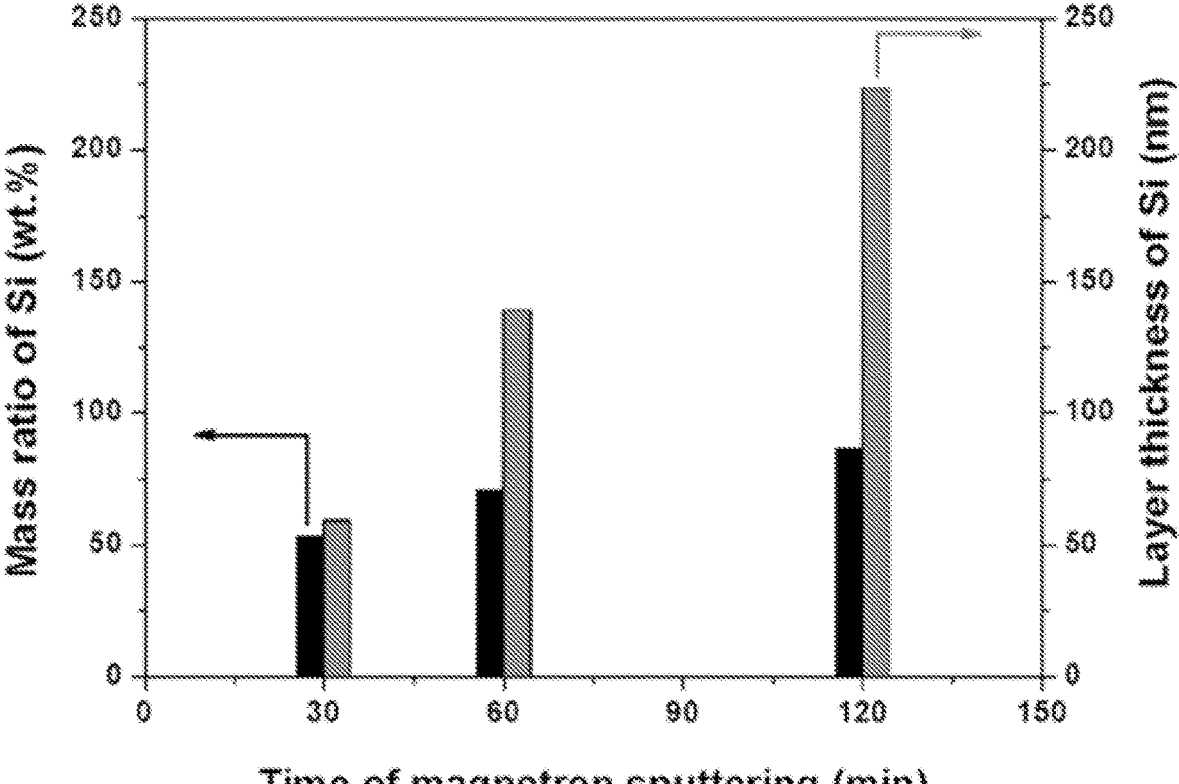
FIG. 12 is a bar-graph of a mass ratio and layer thickness of Si in the N-G@Si composites with different magnetron sputtering periods, according to an embodiment of the present invention.

FIGS. 11A-11B are TEM images of the N-G@Si with different Si loading amounts controlled by sputtering time, at 30 min, according to an embodiment of the present invention. FIGS. 11C-11D are TEM images of the N-G@Si with different Si loading amounts controlled by sputtering time, at 60 min, according to an embodiment of the present invention. FIGS. 11E-11F are TEM images of the N-G@Si with different Si loading amounts controlled by sputtering time, at (e, f) 120 min, according to an embodiment of the present invention. FIG. 12 is a bar-graph of a mass ratio and layer thickness of Si in the N-G@Si composites with different magnetron sputtering periods, according to an embodiment of the present invention.

TABLE 1

| Materials parameters of the synthesized electrodes | | | | | |
|---|---|---|---|---|---|
| Sample | Thickness (μm) | Mass loading (mg/cm$^2$) | Electrode density (g/cm$^3$) | Mass ratio of Si (%) | Electrical conductiviy (S/m) |
| N-G | 4 | 0.040 | 0.1 | N/A | 1135 |
| N-G@Si-30 | 4.06 | 0.085 | 0.21 | 52.9% | 917 |
| N-G@Si-60 | 4.14 | 0.138 | 0.33 | 71.0% | 632 |
| N-G@Si-120 | 4.22 | 0.308 | 0.73 | 87.0% | 159 |
| N-G@Si-30@HSi | 4.07 | 0.109 | 0.25 | 41.3% | 725 |
| N-G@Si-60@HSI | 4.15 | 0.159 | 0.38 | 61.6% | 439 |
| N-G@Si-120@HSI | 4.23 | 0.321 | 0.76 | 83.5% | 3.2 |

Figure 13A:
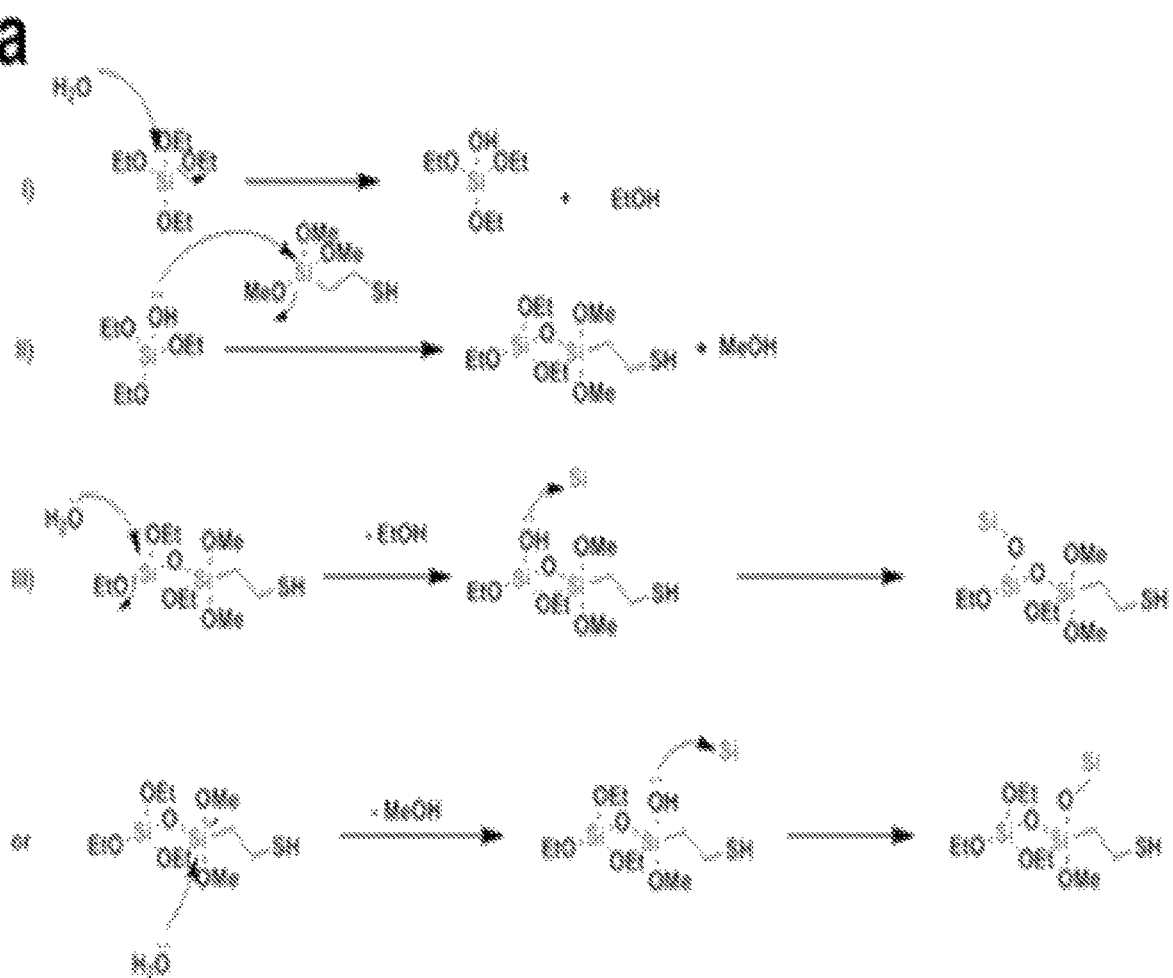
FIGS. 13A-13B is an illustration of the formation of a hybrid silicate coating layer on the N-G@Si, according to an embodiment of the present invention.
Figure 13B:
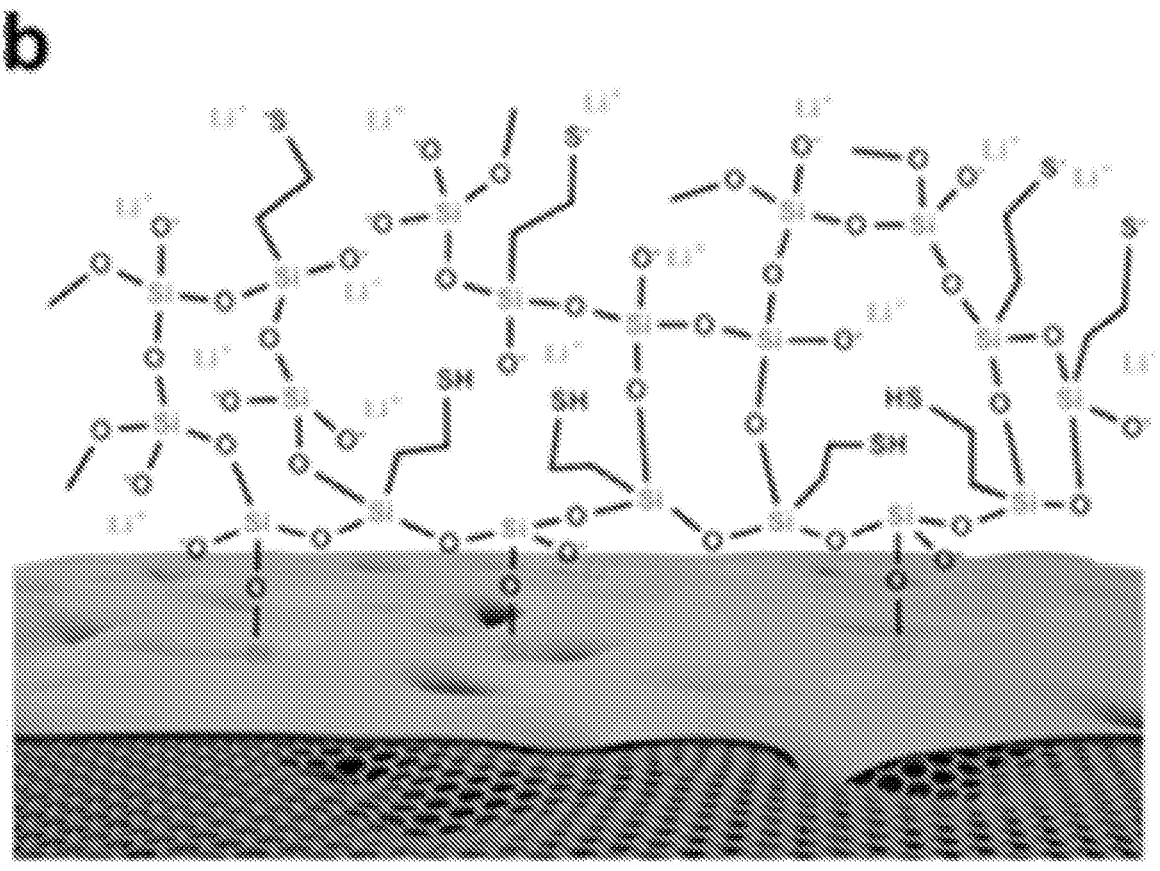

The mass fraction of Si in the 4.06 μm N-G@Si-30 hybrid is as high as 53 wt % after removing the Ni substrate (Table 1). To form a stable electrode/electrolyte interface, a conformal coating layer of inorganic-organic hybrid silicate is introduced on the top surface Si in the Ni@N-G@Si structure by a vapor deposition process to prevent the direct contact of Si with electrolyte (FIGS. 13A-13B). FIGS. 13A-13B is an illustration of the formation of a hybrid silicate coating layer on the N-G@Si, according to an embodiment of the present invention. The free-standing N-G@Si@hybrid silicate (N-G@Si@HSi) film is obtained after etching away the Ni substrates. The optical and scanning electron microscope (SEM) images in FIGS. 3A-3D show that the sandwich N-G@Si-30@HSi film with the ultrathin Si and HSi coating layers well maintains the 3D porous structure of the pristine nanoporous Ni template. FIG. 3A is an Optical image of the free-standing and flexible N-G@Si-30@HSi anode, according to an embodiment of the present invention. FIG. 3B is a zoomed-in SEM image of the N-G@Si-30@HSi anode, according to an embodiment of the present invention. FIG. 3C is a low magnification cross-sectional SEM image of the N-G@Si-30@HSi anode, according to an embodiment of the present invention. FIG. 3D is a zoomed-in cross-sectional SEM image of the N-G@Si-30@HSi anode, according to an embodiment of the present invention.

Figure 15A:
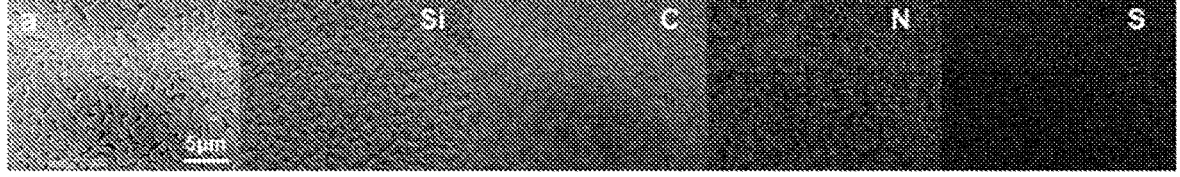
FIG. 15A is an SEM image and corresponding elemental mappings of N-G@Si-30, according to an embodiment of the present invention.
Figure 15B:
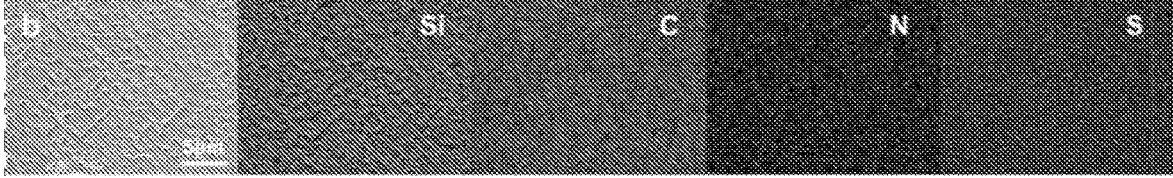
FIG. 15B is an SEM image and corresponding elemental mappings of N-G@HSi, according to an embodiment of the present invention.

The conformal coating of the HSi layer can be demonstrated by the acquisition of free-standing porous hybrid silicate film after burning off the graphene host in the N-G@HSi composite and the uniform distributions of S element from organic moieties in the N-G@Si-30@HSi hybrid (FIGS. 13A-14D and FIGS. 15A-15B). FIGS. 14A-14B are SEM images of N-G@HSi, according to an embodiment of the present invention. FIGS. 14C-14D are SEM images porous silicate after burning off the N-doped graphene, according to an embodiment of the present invention. FIG. 15A is an SEM image and corresponding elemental mappings of N-G@Si-30, according to an embodiment of the present invention. FIG. 15B is an SEM image and corresponding elemental mappings of N-G@HSi, according to an embodiment of the present invention.

FIG. 5A depicts a Half-cell cycling performance of the N-G, N-G@HSi, porous Si, N-G@Si, porous Si@HSi and N-G@Si-30@HSi electrodes and Coulombic efficiency vs. cycle number curve of the N-G@Si-30@HSi electrode, according to an embodiment of the present invention. The current density is 0.05 C for the initial three cycles and 0.5 C for later cycles. FIG. 5B shows a rate capability of the porous Si, N-G@Si and N-G@Si-30@HSi electrodes at various current densities from 0.2 C to 5 C, according to an embodiment of the present invention. FIG. 5C shows EIS measurements of the N-G@Si-30@HSi electrode at different cycles, according to an embodiment of the present invention. FIG. 5D shows a long-term cycling performance of the N-G@Si-30@HSi electrode at 5 and 10 C, according to an embodiment of the present invention. Inset is the zoom-in view of the initial 500 cycles.

Figure 16A:
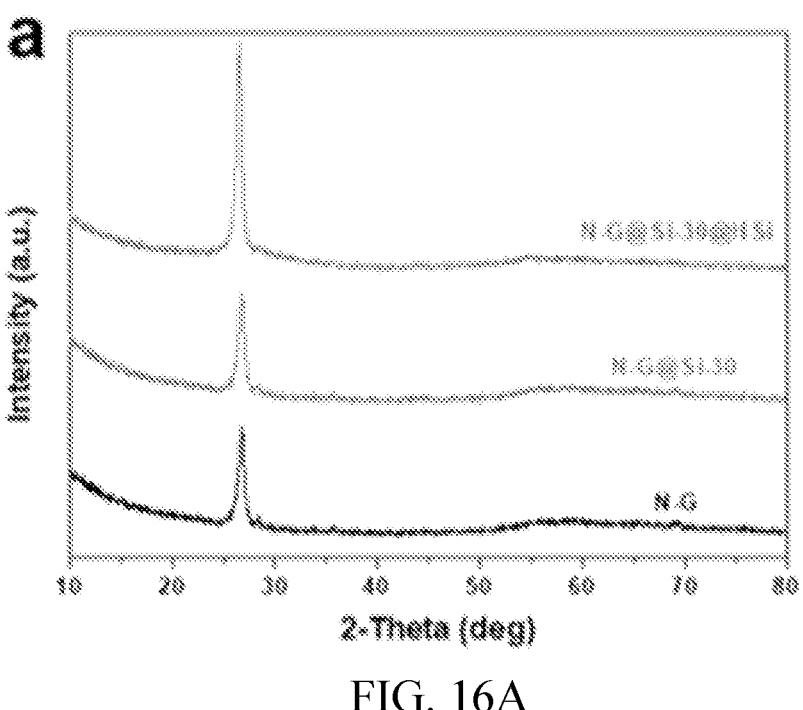
FIG. 16A shows XRD patterns of N-G, N-G@Si-30 and N-G@Si-30@HSi, according to an embodiment of the present invention.
Figure 16B:
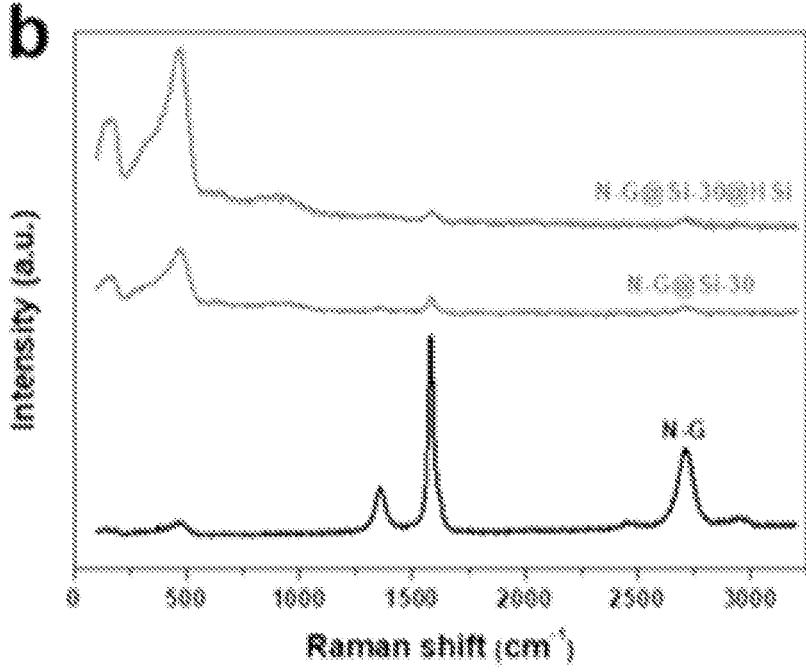
FIG. 16B shows Raman spectra of N-G, N-G@Si-30 and N-G@Si-30@HSi, according to an embodiment of the present invention.
Figure 17A:
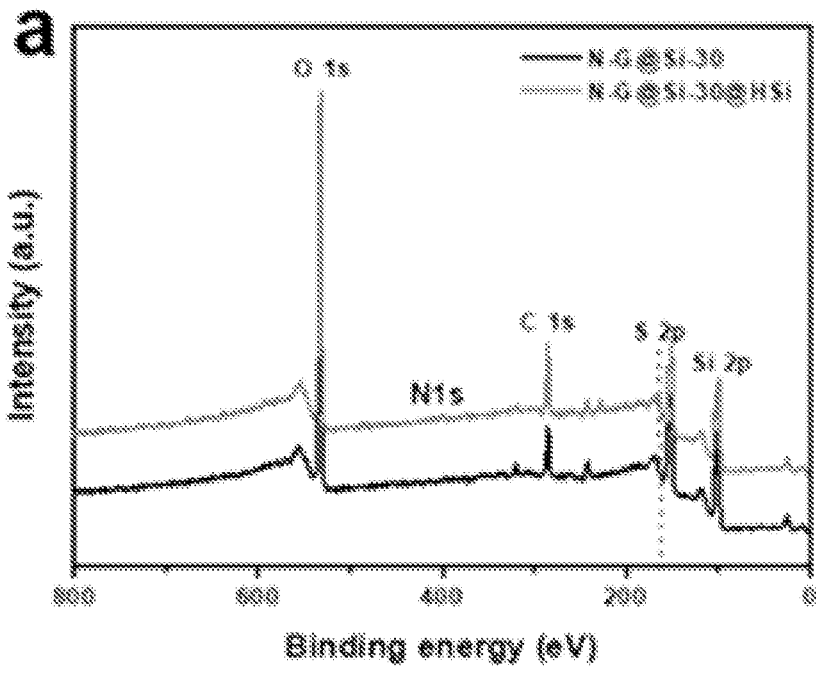
FIG. 17A shows XPS spectra of the N-G@Si-30 and N-G@Si-30@HSi composites, according to an embodiment of the present invention.
Figure 17B:
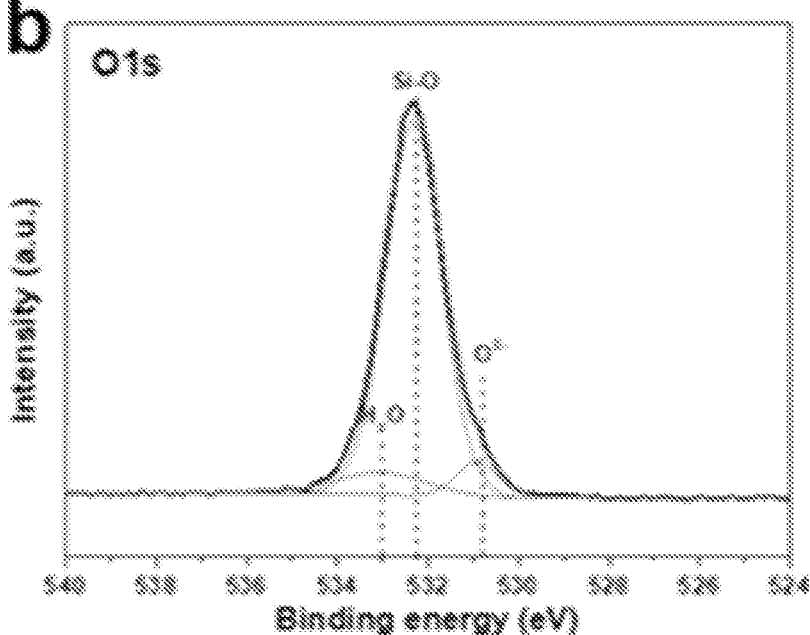
FIG. 17B shows XPS expanded spectra of O1s, according to an embodiment of the present invention.
Figure 17C:
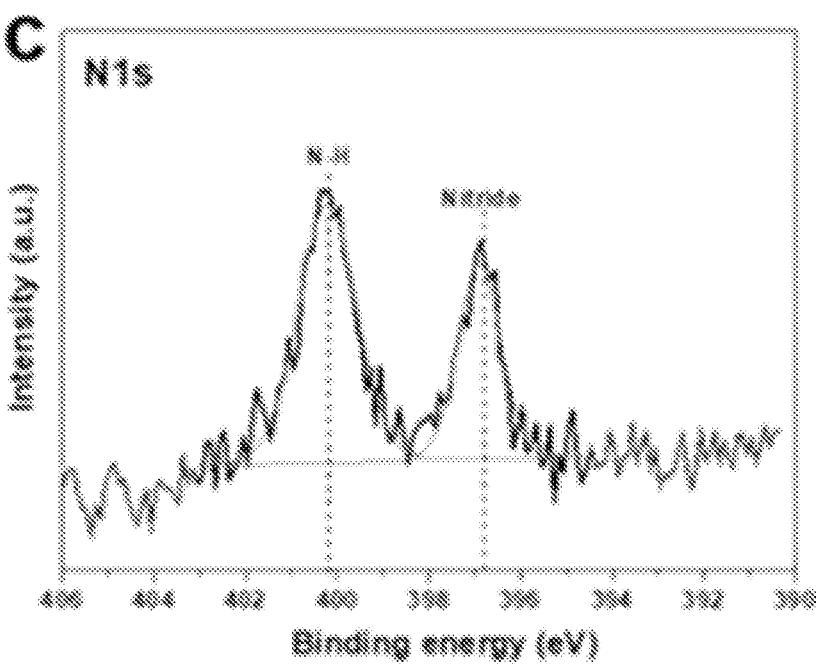
FIG. 17C shows XPS expanded spectra N1s, according to an embodiment of the present invention.
Figure 17D:
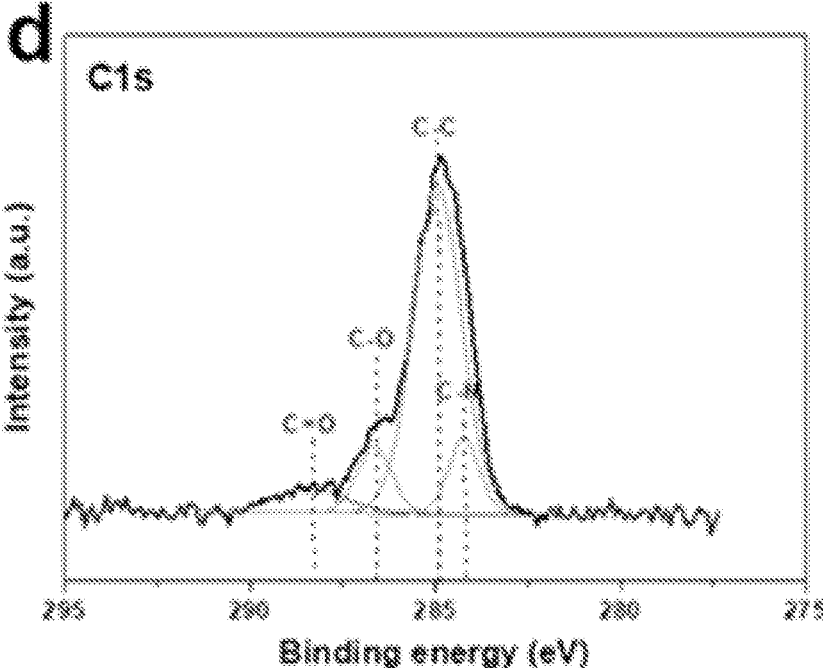
FIG. 17D shows XPS expanded spectra C1s, according to an embodiment of the present invention.
Figure 17E:
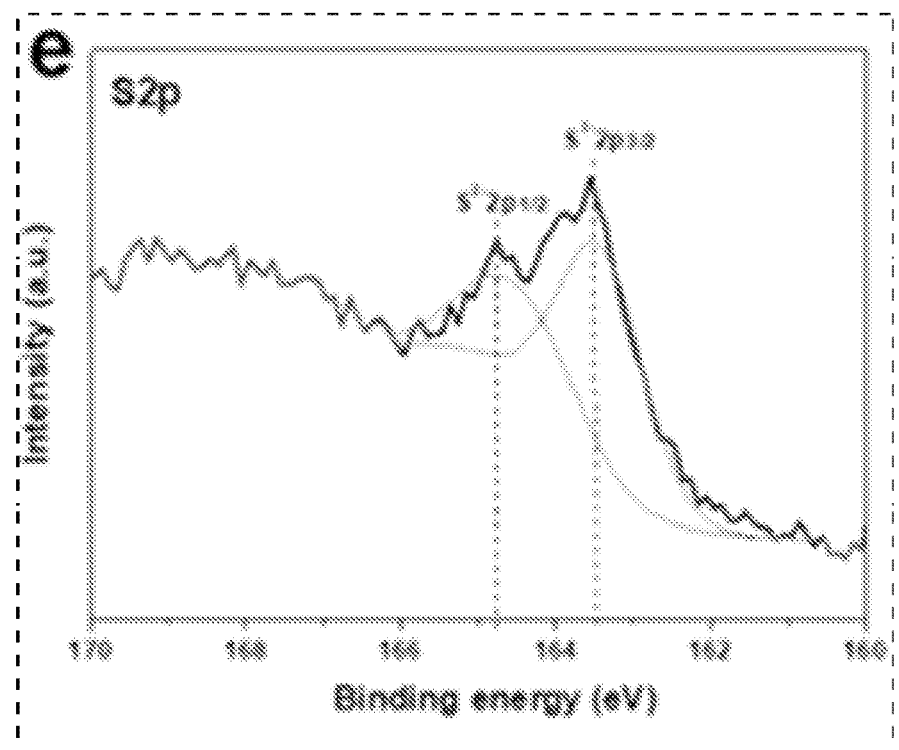
FIG. 17E shows XPS expanded spectra S2p, according to an embodiment of the present invention.
Figure 17F:
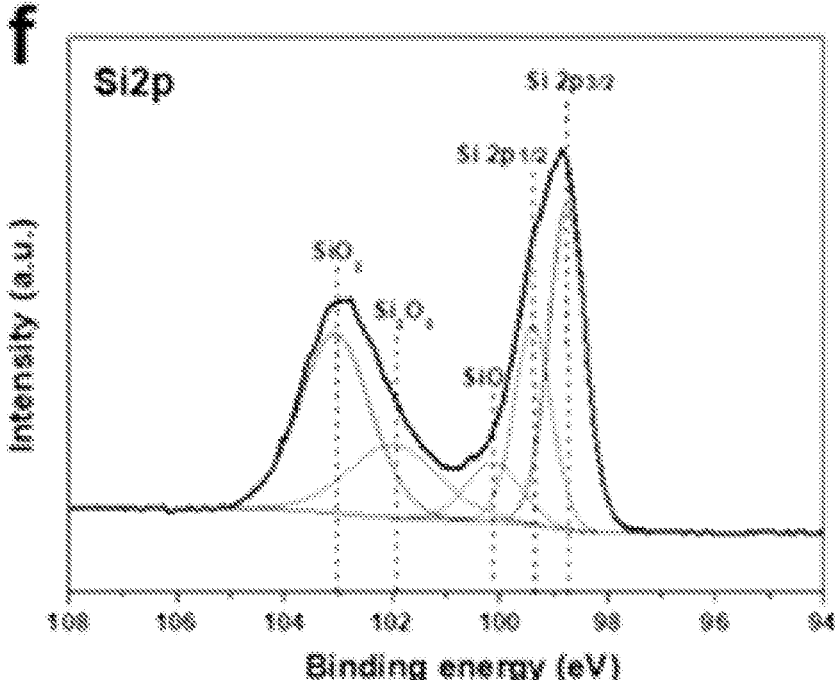
FIG. 17F shows XPS expanded spectra of Si2p of the N-G@Si-30@HSi, according to an embodiment of the present invention.

The detailed structure of N-G@Si-30@HSi is further elucidated by transmission electron microscopy (TEM). FIGS. 4A and 4B are TEM images of the N-G@Si-30@HSi, according to an embodiment of the present invention. FIG. 4C shows a HAADF-STEM image, according to an embodiment of the present invention. FIGS. 4D-4F are elemental mappings of the N-G@Si-30@HSi, according to an embodiment of the present invention. From FIGS. 4A-4B one can see that the N-G@Si-30@HSi with homogeneous coatings of Si and hybrid silicate exhibits a typical sandwich structure with closely contacted interfaces between each layer. TEM EDS mappings also confirm the successful deposition of Si and HSi layers on the internal surface of nanoporous N-G host (FIGS. 4C-4D). X-ray diffraction (XRD) and Raman measurements reveal the amorphous nature of the Si and HSi and the high crystallinity of the N-G host (FIGS. 16A-16B). FIG. 16A shows XRD patterns of N-G, N-G@Si-30 and N-G@Si-30@HSi, according to an embodiment of the present invention. FIG. 16B shows Raman spectra of N-G, N-G@Si-30 and N-G@Si-30@HSi, according to an embodiment of the present invention. As characterized by X-ray photoelectron spectroscopy (XPS) (FIGS. 17A-17F), the HSi layer mainly consists of $Si_xO_y$ and organic moieties, like —$OCH_3$, —$OCH_2CH_3$ and —$CH_2CH_2SH$. FIG. 17A shows XPS spectra of the N-G@Si-30 and N-G@Si-30@HSi composites, according to an embodiment of the present invention. FIG. 17B shows XPS expanded spectra of O1s, according to an embodiment of the present invention. FIG. 17C shows XPS expanded spectra N1s, according to an embodiment of the present invention. FIG. 17D shows XPS expanded spectra C1s, according to an embodiment of the present invention. FIG. 17E shows XPS expanded spectra S2p, according to an embodiment of the present invention. FIG. 17F shows XPS expanded spectra of Si2p of the N-G@Si-30@HSi, according to an embodiment of the present invention. The strong Si—O bond formed at the Si—HSi interface guarantees firm binding between these two layers. Moreover, such conformal coatings with hard inorganic and soft organic moieties of HSi are expected to possess high mechanical flexibility and chemical stability to stabilize the SEI layer. Moreover, the amorphous network structure of the HSi with an ionic conductivity of ~$10^{-6}$ S/cm not only permits fast Li ion transport but also can effectively prevent electrolyte infusion and direct reaction between electrolyte and Si, regulating the SEI growing on the outer surface of the HSi layer.

Figures 18A, 18B, 18C:
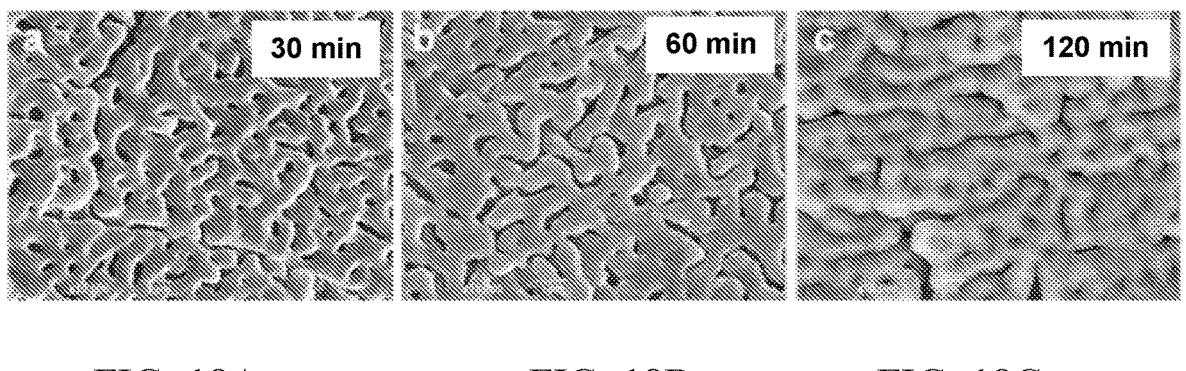
FIG. 18A is an SEM image of N-G@Si@HSi with the magnetron sputtering time of 30 min, according to an embodiment of the present invention.
FIG. 18B is a SEM image of N-G@Si@HSi with the magnetron sputtering time of 60 min, according to an embodiment of the present invention.
FIG. 18C is an SEM image of N-G@Si@HSi with the magnetron sputtering time of 120 min, according to an embodiment of the present invention.
Figure 18D:
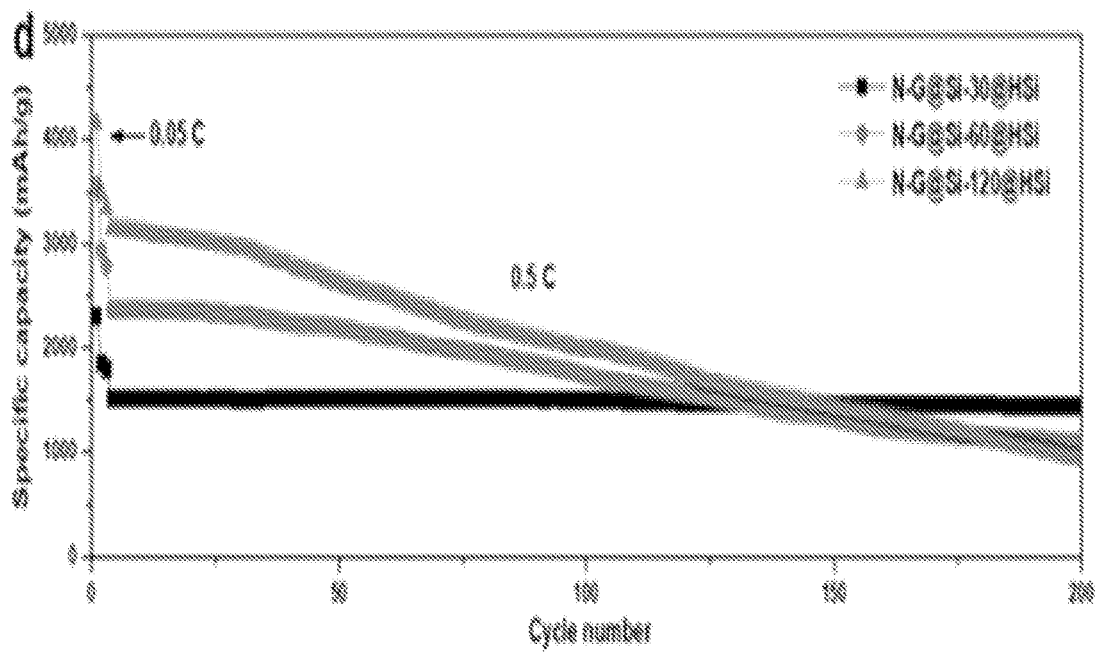
FIG. 18D depicts cycling performances of the N-G@Si-x@HSi electrodes (x=30, 60 and 120), according to an embodiment of the present invention.

Electrochemical Testing of N-G@Si@HSi Anode: In an embodiment, the synthesized N-G@Si-x@HSi (x=30, 60 and 120) anodes were galvanostatically discharged/charged in a half-cell configuration (Figure S10, Supporting Information). The free-standing nature of the hybrid anodes avoids the use of current collectors and binders for the battery assembly. As indicated in FIG. 18D, the reversible capacities of the hybrid anodes increase with the Si loading amounts while the N-G@Si-30@HSi anode displays the best cycling performance in comparison with those of N-G@Si-60@HSi and N-G@Si-120@HSi (Table 1 and Table 2). The outstanding cycling stability of N-G@Si-30@HSi is probably due to the appropriate thickness of Si layer (~59 nm) and the high conductivity of the electrode (725 S/m, Table 2). The volume changes of the 59 nm thick Si layer during cycling can be well accommodated by the sufficient porous space from the N-G host and tolerated by the high flexibility of the HSi topmost coating (FIGS. 11A-11F and FIGS. 18A-18C). FIG. 18A is an SEM image of N-G@Si@HSi with the magnetron sputtering time of 30 min, according to an embodiment of the present invention. FIG. 18B is a SEM image of N-G@Si@HSi with the magnetron sputtering time of 60 min, according to an embodiment of the present invention. FIG. 18C is an SEM image of N-G@Si@HSi with the magnetron sputtering time of 120 min, according to an embodiment of the present invention. FIG. 18D depicts cycling performances of the N-G@Si-x@HSi electrodes (x=30, 60 and 120), according to an embodiment of the present invention. The current density was 0.05 C for the initial three cycles and 0.5 C for later cycles, according to an embodiment of the present invention.

TABLE 2

Electrochemical properties of the synthesized electrodes

| Sample | $200^{th}$ Area capacity (mAh/cm²) | $200^{th}$ Volumetric capacity (mAh/cm³) | Capacity rentention $200^{th}/10^{th}$ (%) |
|---|---|---|---|
| N-G | 0.0135 | 33.7 | 64.6 |
| N-G@Si-30 | 0.109 | 270.1 | 76.1 |
| N-G@Si-30@HSi | 0.157 | 360.3 | 94.8 |
| N-G@Si-60@HSi | 0.176 | 419.5 | 46.6 |
| N-G@Si-120@HSi | 0.298 | 706.1 | 29.8 |

Figure 19A:
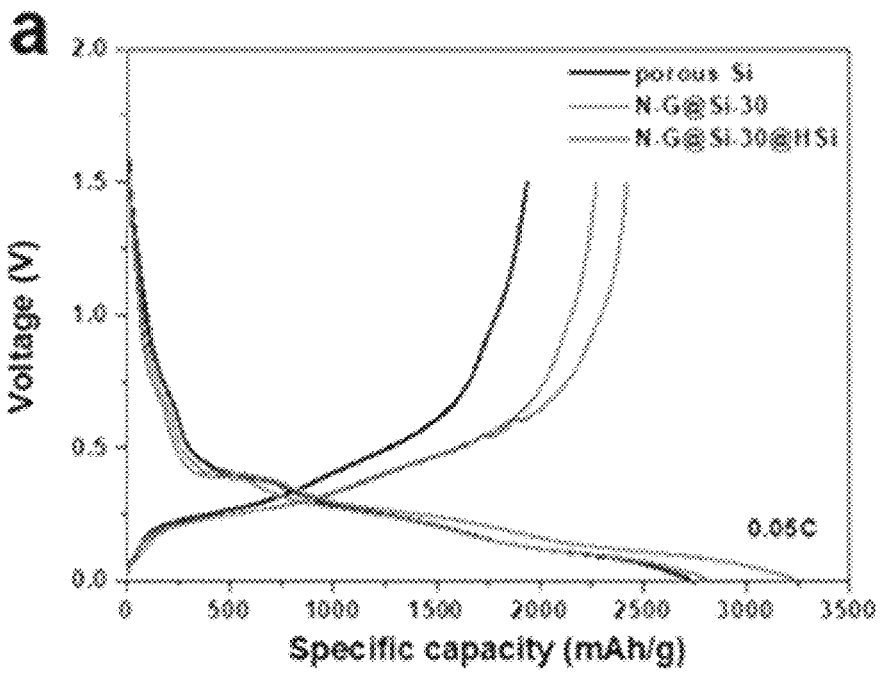
FIG. 19A shows first discharge/charge voltage profiles of the porous Si, N-G@Si-30 and N-G@Si-30@HSi electrodes in the voltage range of 0.01-1.5 V at a current rate of 0.05 C, according to an embodiment of the present invention.
Figure 19B:
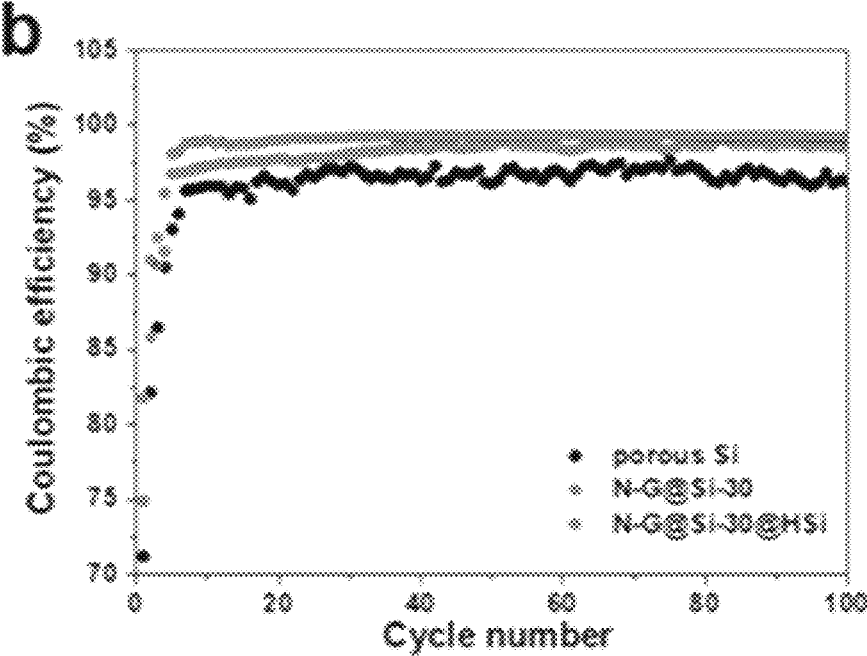
FIG. 19B shows coulombic efficiency vs. cycle number curves of the porous Si, N-G@Si-30 and N-G@Si-30@HSi electrodes, according to an embodiment of the present invention.
Figure 19C:
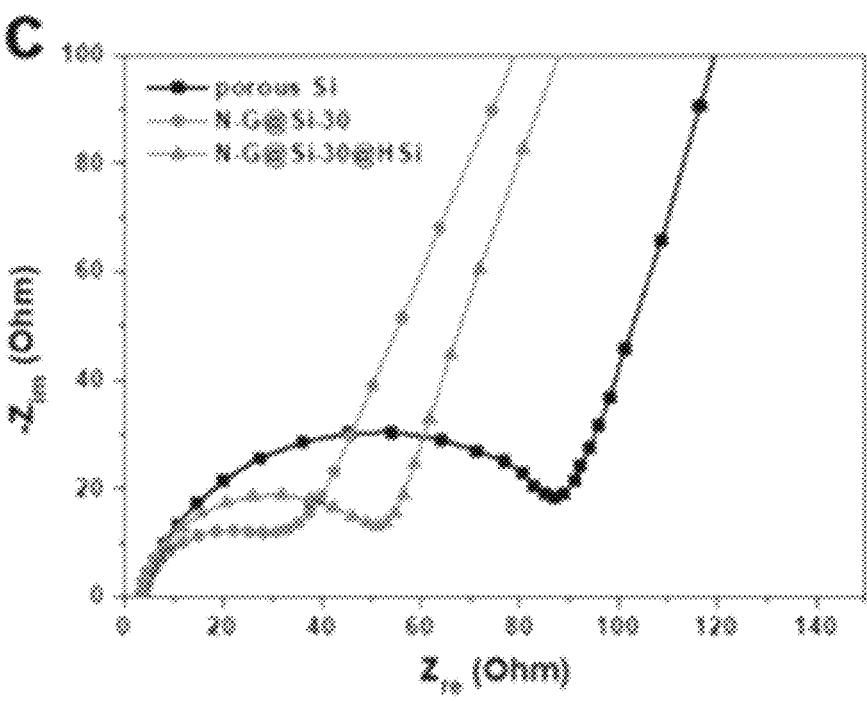
FIG. 19C shows Nyquist plots of the porous Si, N-G@Si-30 and N-G@Si-30@HSi electrodes before cycling, according to an embodiment of the present invention.
Figure 19D:
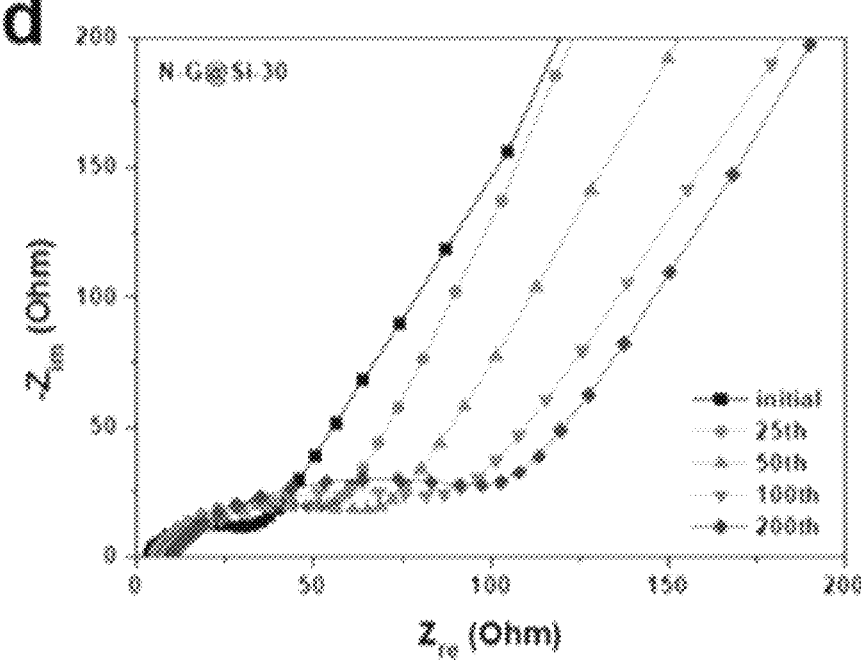
FIG. 19D shows EIS measurements of the N-G@Si-30 electrode at different cycles, according to an embodiment of the present invention.

In an embodiment, to verify the favorable effects of the sandwich structure on Si anodes, porous Si, N-G@Si-30, porous Si@HSi and N-G@Si-30@HSi were used as anodes, pairing with Li counter electrodes, to assemble LIBs. FIG. 4a gives the capacity vs. cycle number profiles of these four batteries at 0.5 C (1 C=4200 mAh/g). It can be seen that the N-G@Si-30@HSi anode displays high reversible capacities (>1286 mAh/g), stable Coulombic efficiencies (CE) and an ultra-long lifespan (>1400 cycles) without obvious capacity decay. While for N-G@Si-30 electrode, although the reversible capacity is higher than that of N-G@Si-30@HSi in the first 100 cycles, it experiences capacity attenuation and the capacity drops to 854 mAh/g after 500 cycles, indicating that unstable Si/electrolyte interfaces obviously influence the cycling performance of the Si anode. For porous Si@HSi electrode, both the reversible capacity and the capacity retention are lower than those of N-G@Si-30@HSi and N-G@Si-30 electrodes, revealing the indispensable role of the conductive N-G network in enabling a large capacity and a long-term cycling stability. The capacity fall-off phenomenon is even worse for porous Si electrode, decreasing from the initial 2400 mAh/g to almost zero after 200 cycles, which can be ascribed to the structure disintegration and conductivity disconnection of the electrode. The discrepancy in the lithium storage behavior of the porous Si, N-G@Si-30 and N-G@Si-30@HSi anodes is further emphasized by the representative discharge/charge and CE curves, as shown in FIGS. 19A-19B. FIG. 19A shows first discharge/charge voltage profiles of the porous Si, N-G@Si-30 and N-G@Si-30@HSi electrodes in the voltage range of 0.01-1.5 V at a current rate of 0.05 C, according to an embodiment of the present invention. FIG. 19B shows coulombic efficiency vs. cycle number curves of the porous Si, N-G@Si-30 and N-G@Si-30@HSi electrodes, according to an embodiment of the present invention. The current density is 0.05 C for the initial three cycles and 0.1 C for later cycles. FIG. 19C shows Nyquist plots of the porous Si, N-G@Si-30 and N-G@Si-30@HSi electrodes before cycling, according to an embodiment of the present invention. FIG. 19D shows EIS measurements of the N-G@Si-30 electrode at different cycles, according to an embodiment of the present invention. The N-G@Si-30 electrode achieves an initial reversible capacity of 2421 mAh/g with a CE of 74.9% at 0.05 C, which are much higher than those of porous Si electrode (1936 mAh/g and 71.2%, FIG. 19A). It suggests that the Si in N-G@Si-30 is electrically well connected with N-G and fully participates in the alloying-dealloying reactions. Moreover, the first-cycle CE can be further increased to 81.0% with the introduction of HSi coating layer due to the shielding effect.

In an embodiment, as shown in FIG. 19B, the N-G@Si-30@HSi electrode exhibits constantly high CEs (>99% after 10 cycles) without notable fluctuation during the 100 cycling. The significant improvement, compared with porous Si and N-G@Si-30 electrodes with wavy and lower CEs, demonstrates the configurational advantages of the designed hybrid Si anode. Apart from the excellent cycling stability, the N-G@Si-30@HSi electrode also manifests outstanding rate capability with slow downtrend in capacity from 1871 to 1036 mAh/g as the current density increases from 0.2 to 5 C. Moreover, nearly full recovery of reversible capacity can be achieved when resetting the C-rate to 0.2 C again (FIG. 5B), showing excellent performance for high rate LIBs. Considering the lower capacities of N-G and N-G@HSi layers in the sandwich structure (FIG. 5A), their contributions to the capacity of N-G@Si-30@HSi electrode can be neglected. Therefore, the high reversibility and superior cycling and rate capability of the N-G@Si-30@HSi electrode are rewarded by the sandwich configuration in which the inner N-G layer behaves as the conductive and stress accommodating matrix and outer HSi layer serves as the SEI shielding and volume change buffering shell.

In an embodiment, electrochemical impedance spectroscopy (EIS) was performed to understand the enhanced lithium storage performances of the N-G@Si-30@HSi anode. As shown in FIG. 19C, the Nyquist plots of the porous Si, N-G@Si-30 and N-G@Si-30@HSi electrodes consist of depressed semicircles associated with charge transfer resistance, and straight lines ascribed to diffusion resistance of Li$^+$ ions. Apparently, the diameters of semicircles of N-G@Si-30 and N-G@Si-30@HSi anodes are much smaller than that of porous Si electrode, verifying that the N-G backbone can significantly enhance the electric conductivity and promote charge transfer at the electrode-electrolyte interfaces. Even after 200 cycles, no obvious radius change can be observed for N-G@Si-30@HSi (FIG. 5C) while N-G@Si-30 undergoes a progressive increase in impedance (FIG. 19D). The different performance underlines the importance of the outer flexible HSi layer in stabilizing the electrode/electrolyte interfaces for the high cycling performance of Si anodes.

Figure 20:
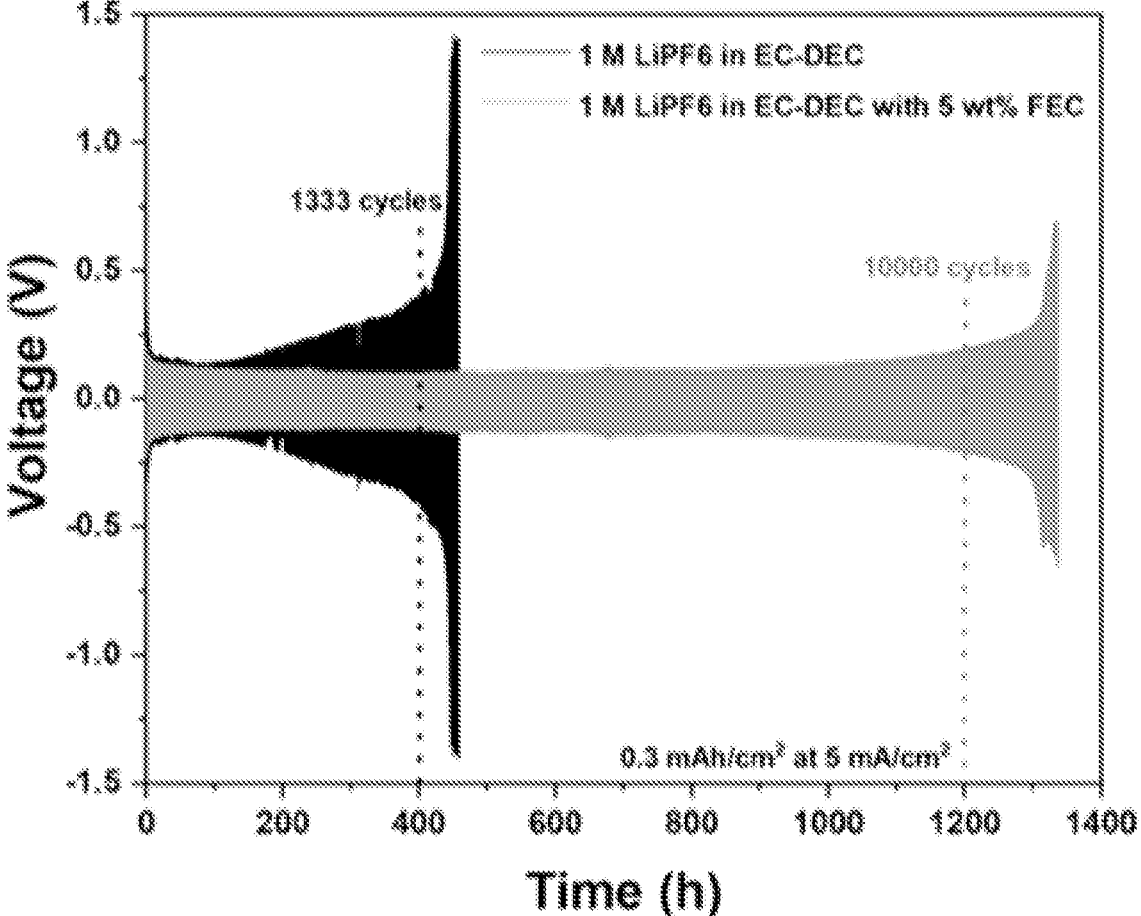
FIG. 20 depicts galvanostatic cycling of symmetric Li cells with and without FEC additive at a stripping/plating capacity of 0.3 mAh/cm$^2$ and a current density of 5 mA/cm$^2$, according to an embodiment of the present invention.

Impressively, the advantageous 3D sandwich nanoarchitecture with a stable SEI also enables inspiring cycling stability at large current densities (FIG. 5D). Despite the capacity obviously declines in initial 100 cycles (Inset of FIG. 5D), high reversible capacities as large as 817 and 537 mAh/g can still be obtained at rigorously high rates of 5 and 10 C after 10,000 cycles. In an embodiment, the use of fluoroethylene carbonate electrolyte additive, for example, enables the Li counter electrodes to sustain this long-term cycling (FIG. 20). FIG. 20 depicts galvanostatic cycling of symmetric Li cells with and without FEC additive at a stripping/plating capacity of 0.3 mAh/cm$^2$ and a current density of 5 mA/cm$^2$, according to an embodiment of the present invention. The capacity decay in the first 100 cycles can be associated with the Li$^+$ ion diffusion limited capacity loss at the high charge/discharge rates of 5 C and 10 C from the fully activated Si anode by a very low charge/discharge rate of 0.05 C at the first three cycles. The continuous capacity decay in the first 100 cycles may also be related to the gradual stabilization of the active Si layer and/or SEI films in the complex 3D architecture. These extremely high reversible capacities and long cycle lifetime at such high rates have not been achieved from Si anodes before (Table 3).

TABLE 3

Current densities and gravimetric capacities of some representative Si anodes

| | Current density (mA/g) | Cycles | Gravimetric capacity (mAh/g) | Ref. |
|---|---|---|---|---|
| CNT-Si film | 0.1 C | 50 | 1711 | *ACS Nano* 2010, 4, 3671. |
| Si-CNT sponge | 0.2 C | 500 | 900 | *Adv. Energy Mater.* 2011, 1, 523. |
| Silicon pomegranate | 0.5 C | 1000 | 1160 | *Nat Nanotechnol.* 2014, 9, 187. |
| 3D graphene-Si | 200 | 200 | 2050 | *Adv. Energy Mater.* 2015, 5, 1500289. |
| Mesoporous amorphous silicon | 3,000 | 700 | 1025 | *Angew. Chem. Int. Ed.* 2016, 55, 14063 |
| Graphene-encapsulated Si microparticle | 0.5 C | 300 | 1400 | *Nat. Energy* 2016, 1, 15029. |
| Double carbon shells coated Si nanoparticles | 0.2 C 10 C | 1000 200 | 1355 ~500 | *Adv. Mater.* 2017, 29, 1605650. |
| Custard-apple-like silicon@N, O-doped carbon | 2 C | 4000 | 900 | *Nano Energy* 2017, 39, 253. |
| Nanoporous silicon | 1000 | 400 | 1180 | *ACS Nano* 2018, 12, 4993 |
| N-G@Si-30@HSi | 0.5 C (2,100) 5 C (21,000) 10 C (42,000) | 1400 10000 10000 | 1286 817 537 | This work |

Figure 22A:
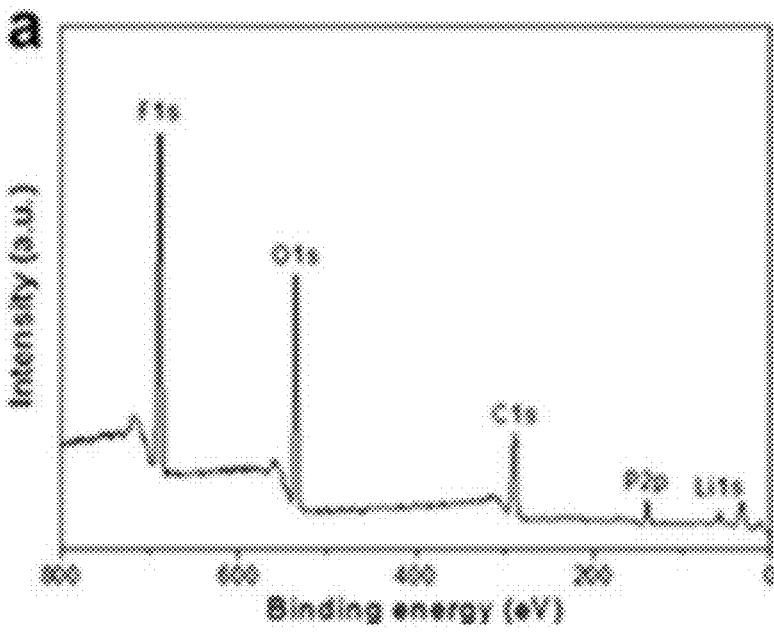
FIG. 22A is a surface layer characterization of the N-G@Si-30 electrode after cycling for 1000 times at 5 C showing a full XPS spectrum, according to an embodiment of the present invention.
Figure 22B:
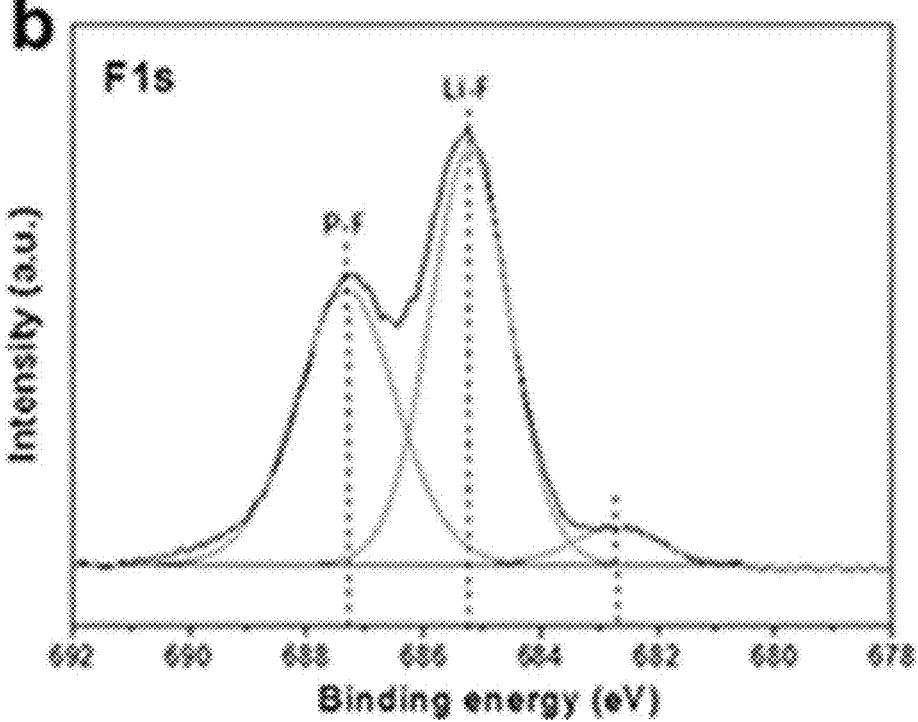
FIG. 22B is an XPS expanded spectrum of F1s, according to an embodiment of the present invention.
Figure 22C:
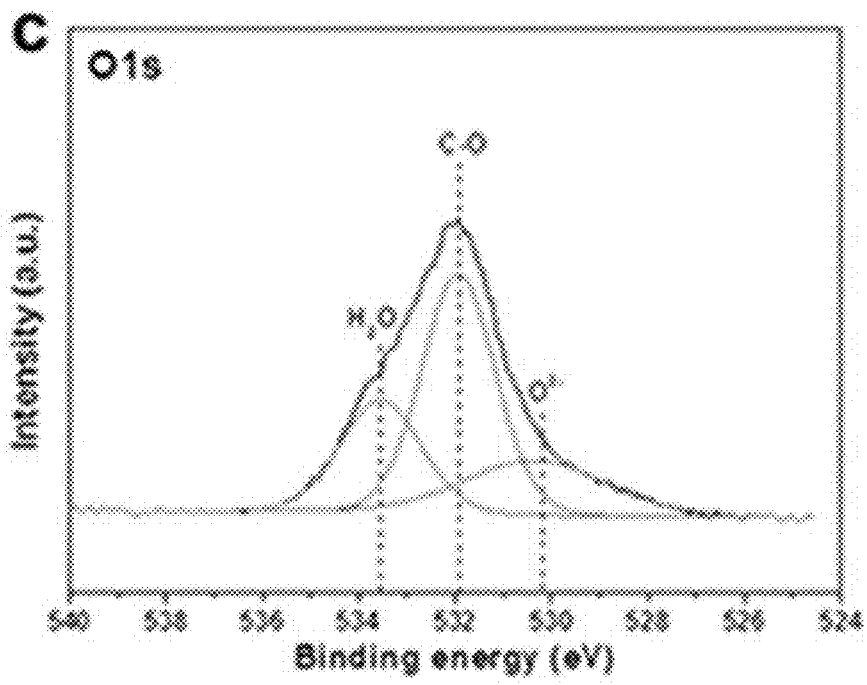
FIG. 22C is an XPS expanded spectrum of O1s, according to an embodiment of the present invention.
Figure 22D:
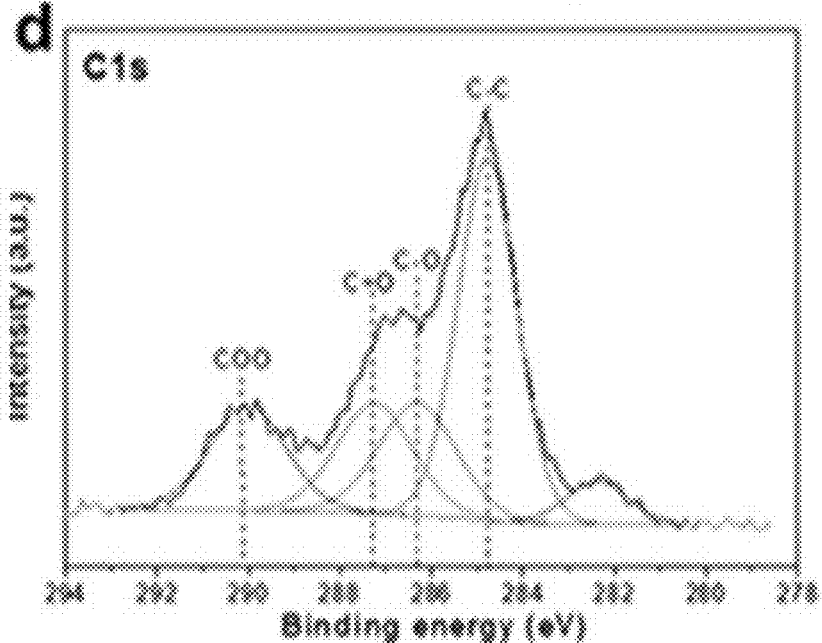
FIG. 22D is an XPS expanded spectrum of C1s, according to an embodiment of the present invention.
Figure 22E:
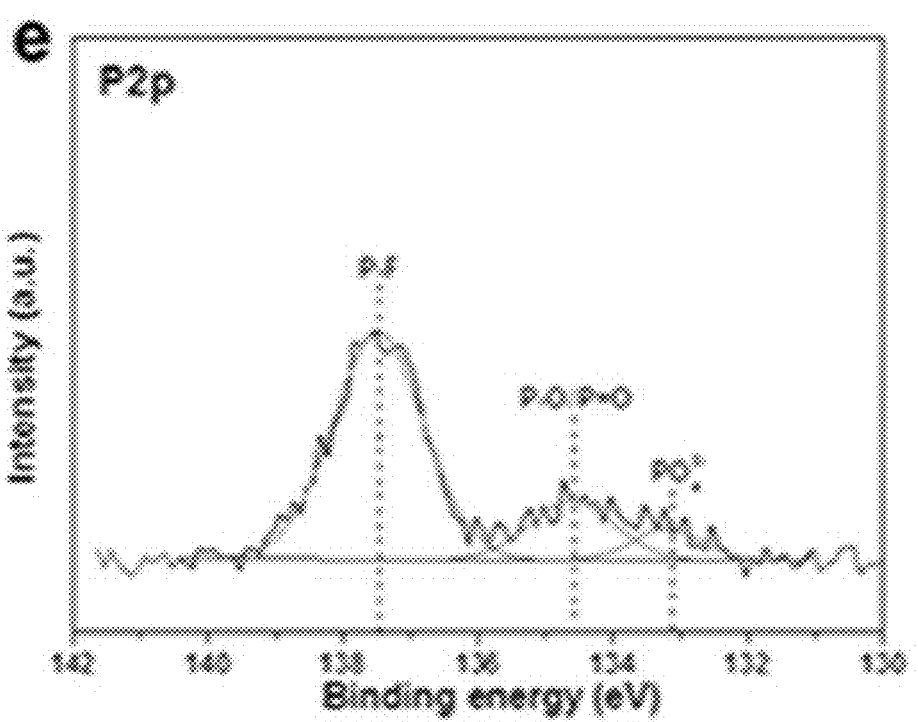
FIG. 22E is an XPS expanded spectrum of P2p, according to an embodiment of the present invention.
Figure 22F:
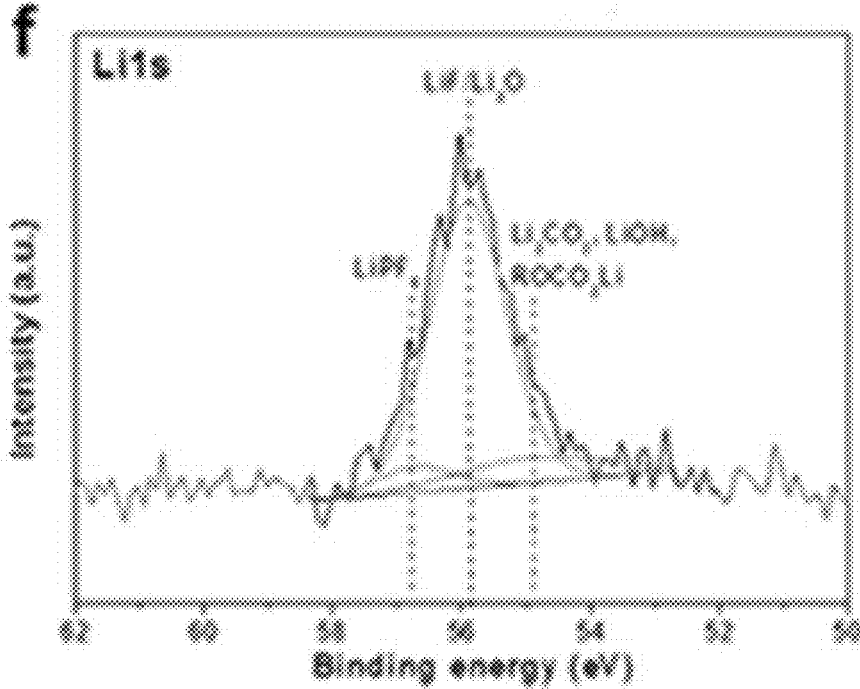
FIG. 22F is an XPS expanded spectrum Li1s, according to an embodiment of the present invention.
Figure 23A:
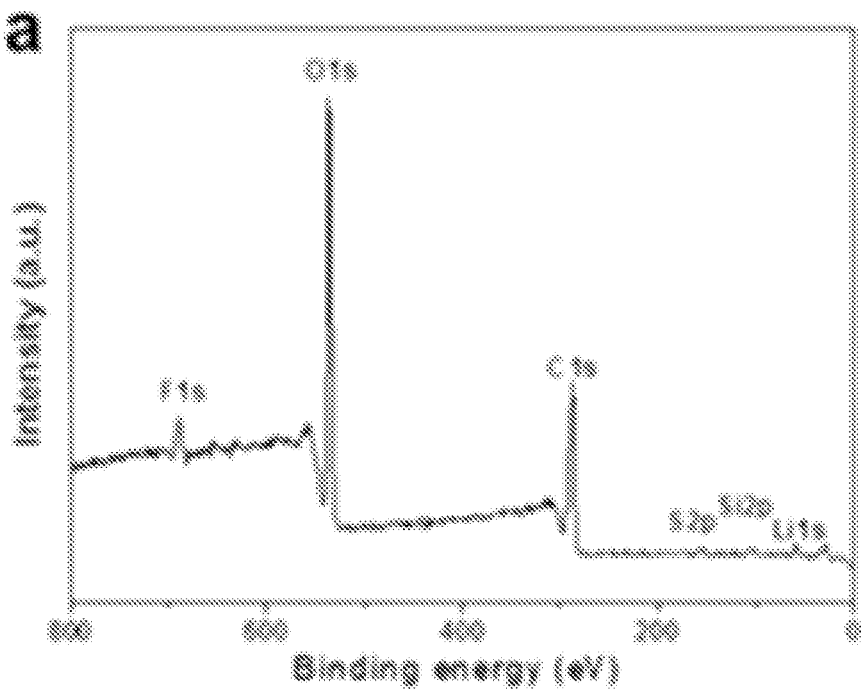
FIG. 23A is a surface layer characterization of the N-G@Si-30@HSi electrode after cycling for 1000 times at 5 C, showing a full XPS spectrum, according to an embodiment of the present invention.
Figure 23B:
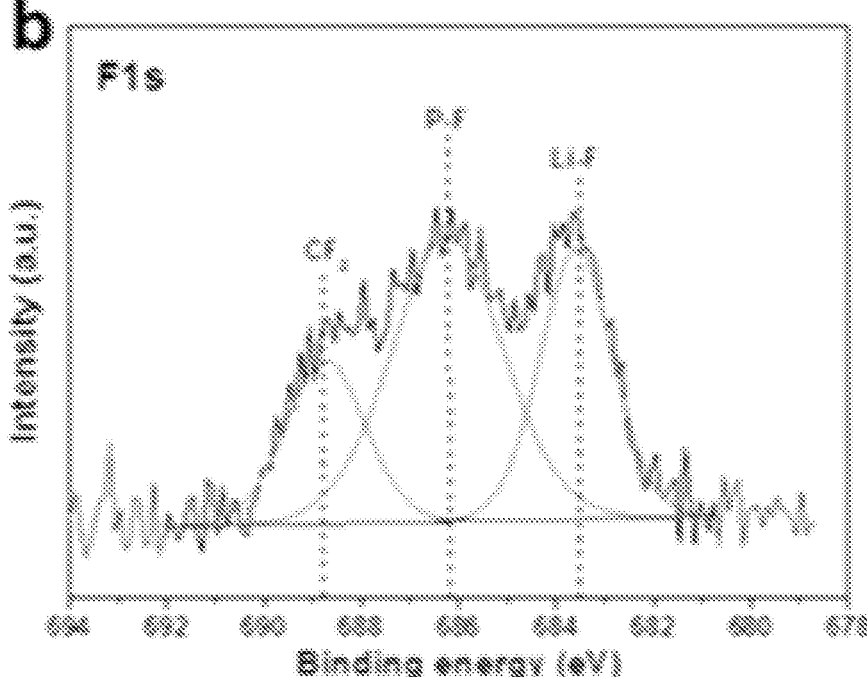
FIG. 23B is an XPS expanded spectrum of F1s, according to an embodiment of the present invention.
Figure 23C:
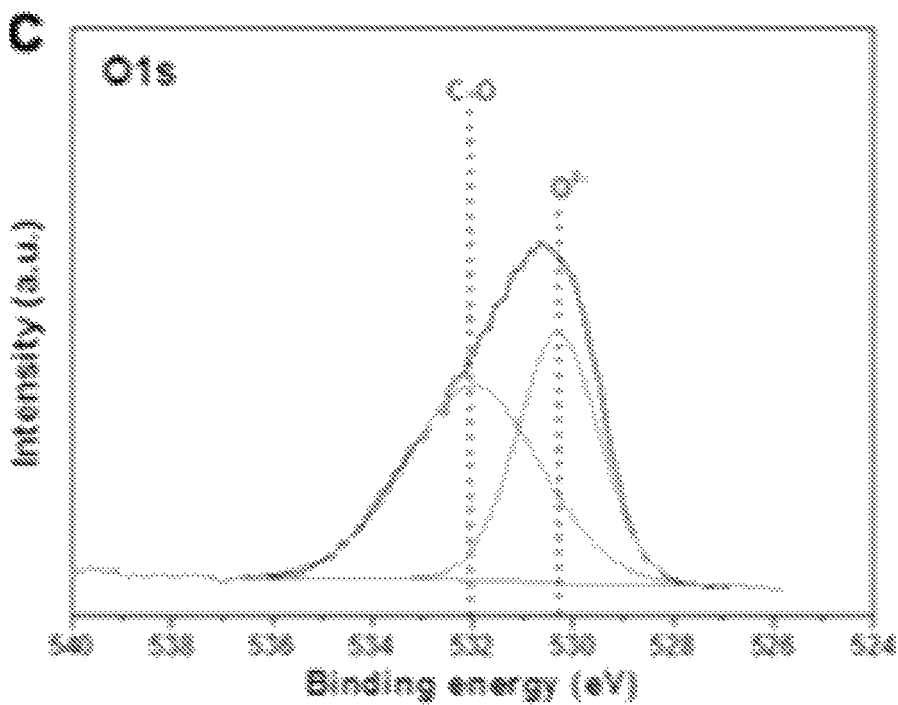
FIG. 23C is an XPS expanded spectrum of O1s, according to an embodiment of the present invention.
Figure 23D:
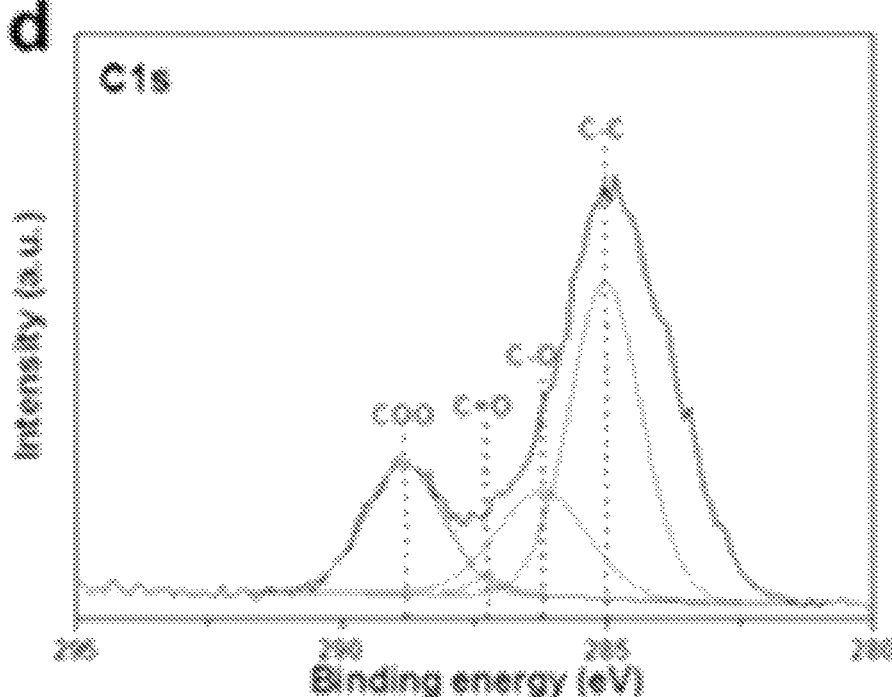
FIG. 23D is an XPS expanded spectrum of C1s, according to an embodiment of the present invention.
Figure 23E:
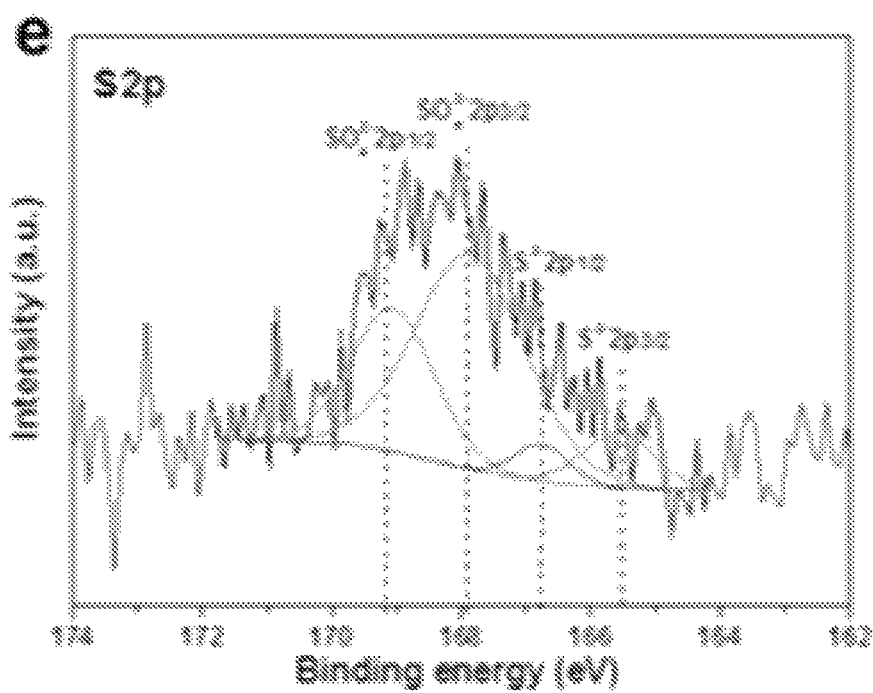
FIG. 23E is an XPS expanded spectrum of S2p, according to an embodiment of the present invention.
Figure 23F:
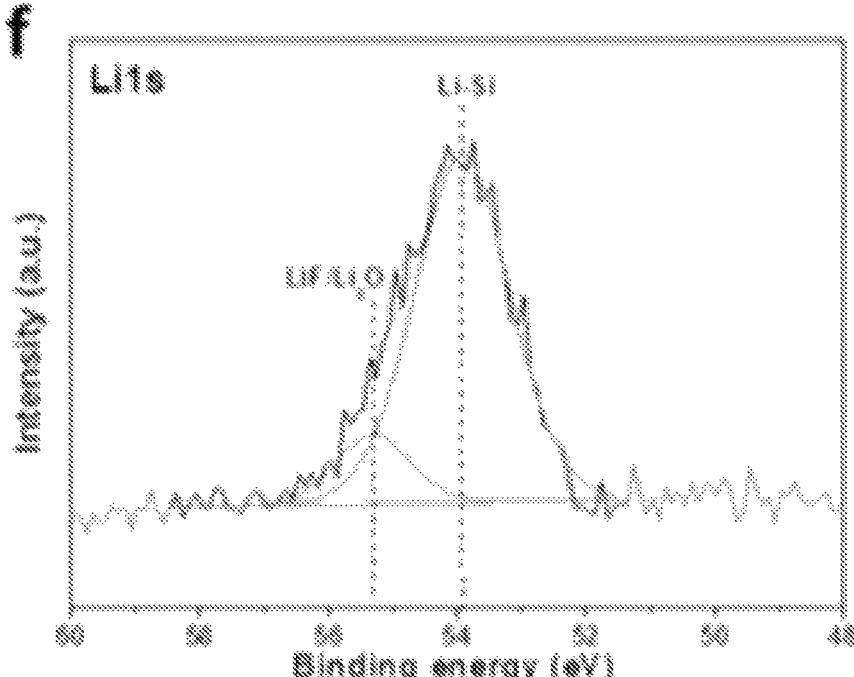
FIG. 23F is an XPS expanded spectrum of Li1s, according to an embodiment of the present invention.

Morphology and Surface Composition Evolutions of Cycled N-G@Si-30@HSi Anode: In an embodiment, the evolution of morphology and composition of the N-G@Si-30 and N-G@Si-30@HSi electrodes after 1000 cycles at 5 C were inspected by SEM and XPS. FIGS. 21A-21B are SEM images of N-G@Si-30@HSi, according to an embodiment of the present invention. FIGS. 21C-21D are SEM images of N-G@Si-30 electrodes after cycling for 1000 times at 5 C, according to an embodiment of the present invention. From FIGS. 21A-21B we can see that the N-G@Si-30@HSi electrode well retains the smooth surfaces and 3D porous structure and no obvious Si layer pulverization and aggregation can be discerned. The stable microstructure demonstrates that the 3D porous sandwich structure can effectively accommodate the volume change of Si during cycling and stabilize SEI layers. In contrast, the N-G@Si-30 electrode exhibits serious structural damage with the formation of a rough electrode surface caused by Si layer crushing and SEI layer breaking (FIGS. 21C-21D), well elucidating its poor cycling stability and low CEs (FIG. 4A and FIG. 19B). The surface layer discrepancy between these two electrodes can be further clarified by XPS (FIGS. 22A-22F and FIGS. 23A-23F). FIG. 22A is a surface layer characterization of the N-G@Si-30 electrode after cycling for 1000 times at 5 C showing a full XPS spectrum, according to an embodiment of the present invention. FIG. 22B is an XPS expanded spectrum of Fis, according to an embodiment of the present invention. FIG. 22C is an XPS expanded spectrum of O1s, according to an embodiment of the present invention. FIG. 22D is an XPS expanded spectrum of C1s, according to an embodiment of the present invention. FIG. 22E is an XPS expanded spectrum of P2p, according to an embodiment of the present invention. FIG. 22F is an XPS expanded spectrum Li1s, according to an embodiment of the present invention. FIG. 23A is a surface layer characterization of the N-G@Si-30@HSi electrode after cycling for 1000 times at 5 C, showing a full XPS spectrum, according to an embodiment of the present invention. FIG. 23B is an XPS expanded spectrum of F1s, according to an embodiment of the present invention. FIG. 23C is an XPS expanded spectrum of O1s, according to an embodiment of the present invention. FIG. 23D is an XPS expanded spectrum of C1s, according to an embodiment of the present invention. FIG. 23E is an XPS expanded spectrum of S2p, according to an embodiment of the present invention. FIG. 23F is an XPS expanded spectrum of Li1s, according to an embodiment of the present invention. A stronger peak intensity of F1s is detected from the N-G@Si-30 electrode surface while the Si $2p$ peak disappears (FIGS. 22A-22F), reflecting serious decomposition of electrolyte and shading of the Si signal by thick SEI layers. The formation of thick SEI layers can be ascribed to the severe volume change of N-G@Si-30 electrode during cycling, which results in the SEI layer repeatedly breaking and reforming with the evolution of chemical composition. While for N-G@Si-30@HSi electrode, no apparent chemical changes are discerned except the emergence of a small amount of F and Li elements (FIGS. 23A-23F), indicating the ultrathin thickness of the SEI layer. These results confirm that the presence of conformal and mechanically flexible HSi layer together with the polymeric species from SEI can effectively stabilize the SEI film and, thus, well preserve the SEI topography and homogeneity. This functional HSi layer, in combination with conductive N-G backbone, simultaneously addresses the low conductivity, poor mechanical stability and unstable SEI issues of Si anodes, and offers the N-G@Si-30@Si hybrid anode excellent lithium storage properties.

Moreover, in an embodiment, we also conducted in situ TEM observations to investigate the morphology evolutions of the N-G@Si-30 and N-G@Si-30@HSi electrodes during lithiation and delithiation. FIGS. 6A-6C show in situ TEM characterization of the N-G@Si-30, according to an embodiment of the present invention. FIGS. 6D-6F show TEM characterization of the N-G@Si-30@HSi anodes during the initial lithiation-delithiation process, according to an embodiment of the present invention. As indicated in FIGS. 6A-6C, the dimension and morphology of the N-G@Si-30@HSi electrode has smaller volume changes during discharging and charging (FIGS. 9A-9D, which is in line with the high electrochemical cycling stability. While for N-G@Si-30 electrode, obvious volume expansion can still be observed after charging (FIGS. 6D-6F and FIGS. 10A-10F). The difference in morphology reveals the critical role of the hybrid silicate layer to alleviate the volume changes and maintain the structure integrity of the N-G@Si-30@HSi. The unvaried dimension of the N-G@Si-30@HSi during cycling can well preserve the ion- and electron-conduction networks of the electrode and facilitate the formation of thin and homogeneous SEI layer, which is indispensable to guarantee the cycling stability. FIGS. 9A and 9B are SEM images of Ni@N-G, according to an embodiment of the present invention. FIGS. 9C and 9D are SEM images of N-G, according to an embodiment of the present invention.

Figure 7C:
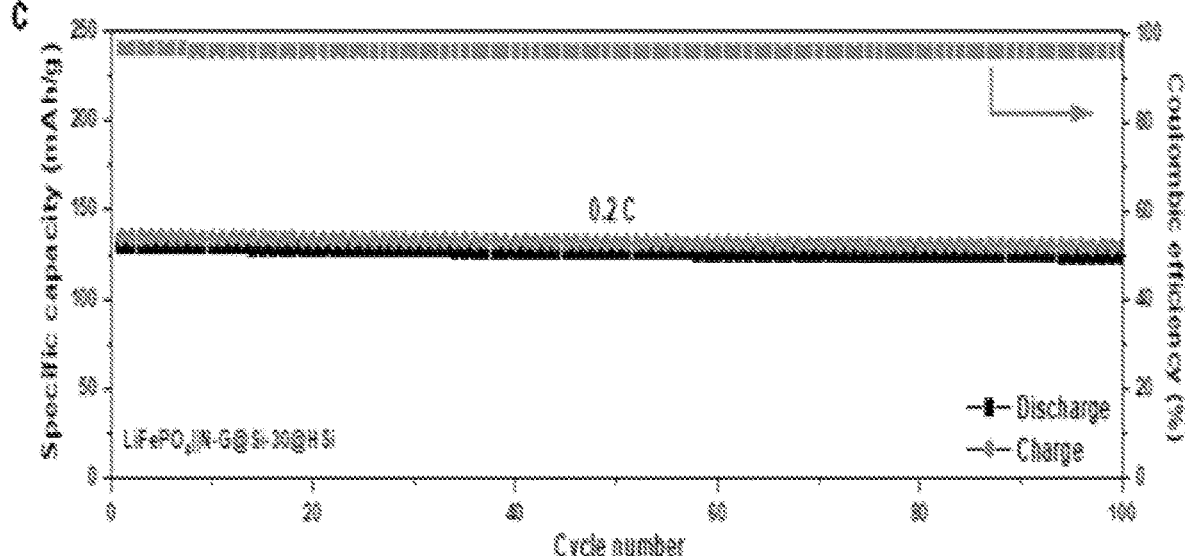
FIG. 7C shows a capacity and Coulombic efficiency vs. cycle number curves of LiFePO₄‖N-G@Si-30@HSi cell at a current density of 0.2 C, according to an embodiment of the present invention.

Assessment of Electrochemical Performance of N-G@Si-30@HSi Hybrid Anode in Full Cells: FIG. 7A shows an Electrochemical performance of full LiFePO$_4$||N-G@Si-30@HSi cells with a typical charge/discharge curves of the LiFePO$_4$||N-G@Si-30@HSi cell at a current density of 0.2 C, according to an embodiment of the present invention. FIG. 7B shows a rate performance of the LiFePO$_4$||N-G@Si-30@HSi cell at a current density range from 0.2 to 5 C, according to an embodiment of the present invention. FIG. 7C shows a capacity and Coulombic efficiency vs. cycle number curves of LiFePO$_4$||N-G@Si-30@HSi cell at a current density of 0.2 C, according to an embodiment of the present invention. In an embodiment, the sandwich nano-architecture of N-G@Si-30@HSi provides the structure integrity and electrical connectivity on the whole electrode level. Thus, prototype full cells were assembled by paring N-G@Si-30@HSi anodes with LiFePO$_4$ cathodes to demonstrate the commercial viability of the hybrid Si anodes. Before assembling full cells, the N-G@Si-30@HSi anodes were stabilized in the half cells for 20 cycles to eliminate the irreversibility. The full cell was cathode capacity limited to prevent Li metal deposition during the charging process. FIG. 6a gives the initial voltage curves of the full cell at a current density of 0.2 C (1 C=170 mAh/g).

Figure 24A:
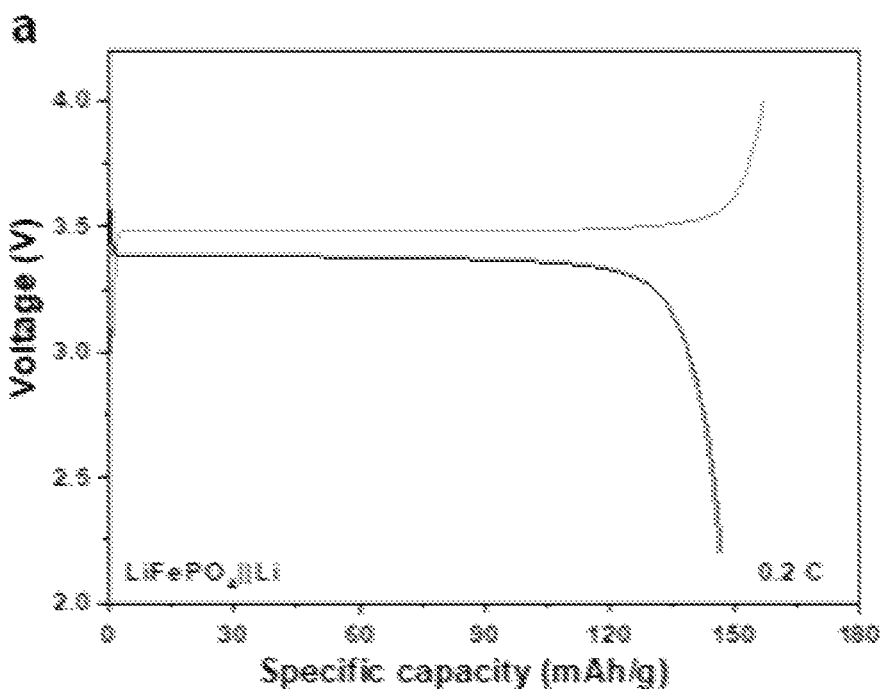
FIG. 24A shows typical 1$^{st}$ charge/discharge curves of the LiFePO$_4$||Li cell at a current density of 0.2 C, according to an embodiment of the present invention.
Figure 24B:
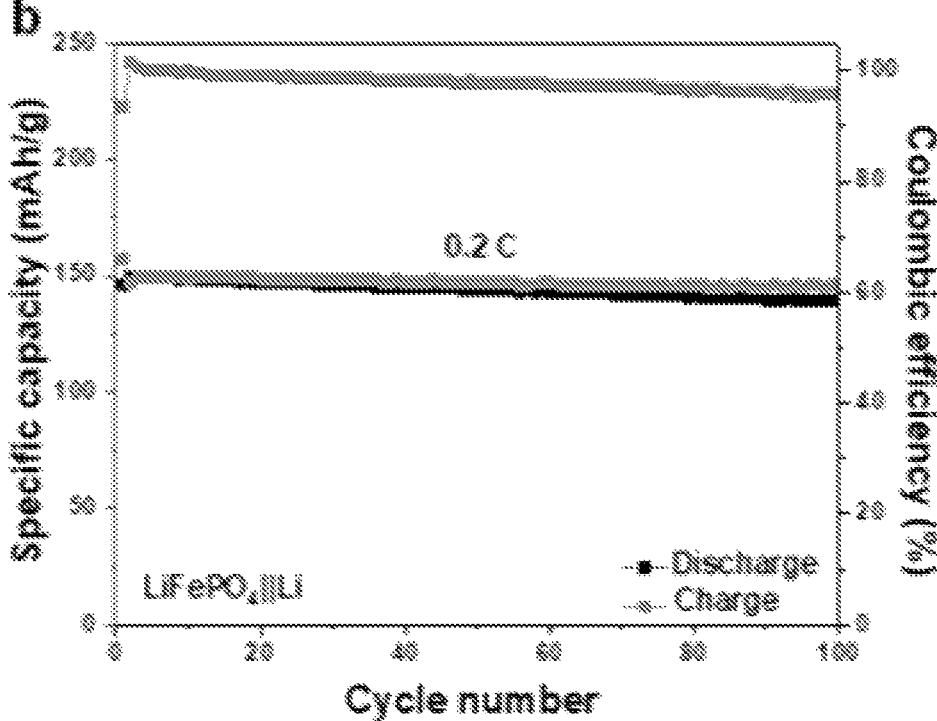
FIG. 24B shows capacity and Coulombic efficiency vs. cycle number curves of LiFePO$_4$||Li cell at a current density of 0.2 C, according to an embodiment of the present invention.

FIG. 24A shows typical 1$^{st}$ charge/discharge curves of the LiFePO$_4$||Li cell at a current density of 0.2 C, according to an embodiment of the present invention. FIG. 24B shows capacity and Coulombic efficiency vs. cycle number curves of LiFePO$_4$||Li cell at a current density of 0.2 C, according to an embodiment of the present invention. A specific discharge capacity of 129.5 mAh/g is delivered with an average voltage of 2.86 V and a CE of 96.5%, comparable to those of LiFePO$_4$||Li battery (FIG. 24A). As the current density step-wise increases from 0.2 to 5 C, decent capacity decay is observed and the capacity is almost fully recovered when returning the current density to 0.2 C (FIG. 7B), demonstrating excellent rate performance of the full cell.

Figure 25:
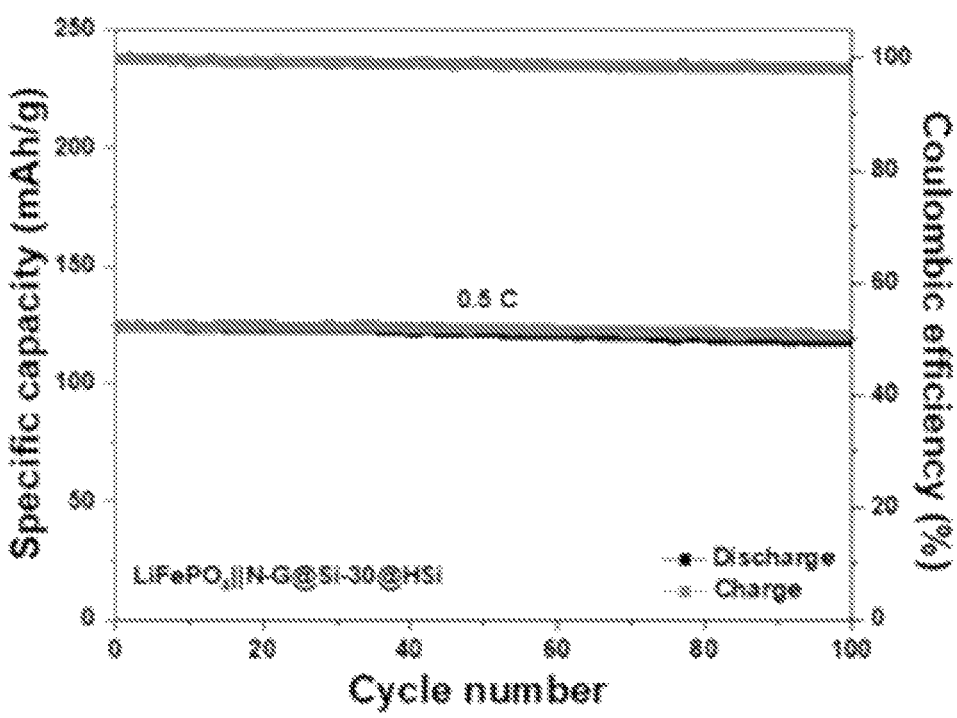
FIG. 25 shows capacity and Coulombic efficiency vs. cycle number curves of LiFePO$_4$‖N-G@Si-30@HSi cell at a current density of 0.5 C, according to an embodiment of the present invention.

Moreover, the cycling measurement shows that immutably high CEs are achieved and capacity retentions of 95.7% and 95.4% are still realized even after 100 cycles at 0.2 and 0.5 C (FIG. 7C and FIG. 25), superior to that of LiFePO$_4$∥Li battery (94.7%, FIG. 24B). These exceptional full-cell rate and cycling performances verify the advantages of the 3D porous sandwich configuration in fulfilling the strict demands of high-performance Si anodes. FIG. 25 shows capacity and Coulombic efficiency vs. cycle number curves of LiFePO$_4$∥N-G@Si-30@HSi cell at a current density of 0.5 C, according to an embodiment of the present invention.

In an embodiment, there are three inter-dependent features of the sandwich design that empower the N-G@Si-30@HSi anode with outstanding lithium storage performances in both half and full cells. The first one is the high electric conductive network endowed by the seamless and interconnected N-G matrix, providing fast electron transport and transfer highway. The second one is the fantastic stress-accommodation ability and structural integrity offered by the mechanically stable N-G backbone and flexibly conformal HSi coatings with hard inorganic and soft organic moieties. Moreover, the large surface area and open pore channels of the hybrid anode can lower the large current density to small effective local current and allow fast diffusion of the electrolyte for the high rate capability. The last characteristic is the spatially restricted formation of SEI imparted by the static electrolyte-blocking HSi layer. The formation of thin and stable SEI, regulated by HSi, promotes the high CEs and excellent cycling stability. An additional benefit of the designed hybrid anode is its free-standing nature, eliminating the use of electrochemically inactive current collectors, binders and conductive additives, which not only simplifies the electrode preparation procedure, but also gives rise to high reversible capacities. Therefore, this sandwich design concept simultaneously conquers the critical issues of volume change, unstable SEI film and poor electric conductivity of Si anodes, rendering the hybrid anode with outstanding electrochemical performances for applications in next generation of high-energy and high-power LIBs.

Figure 26A:
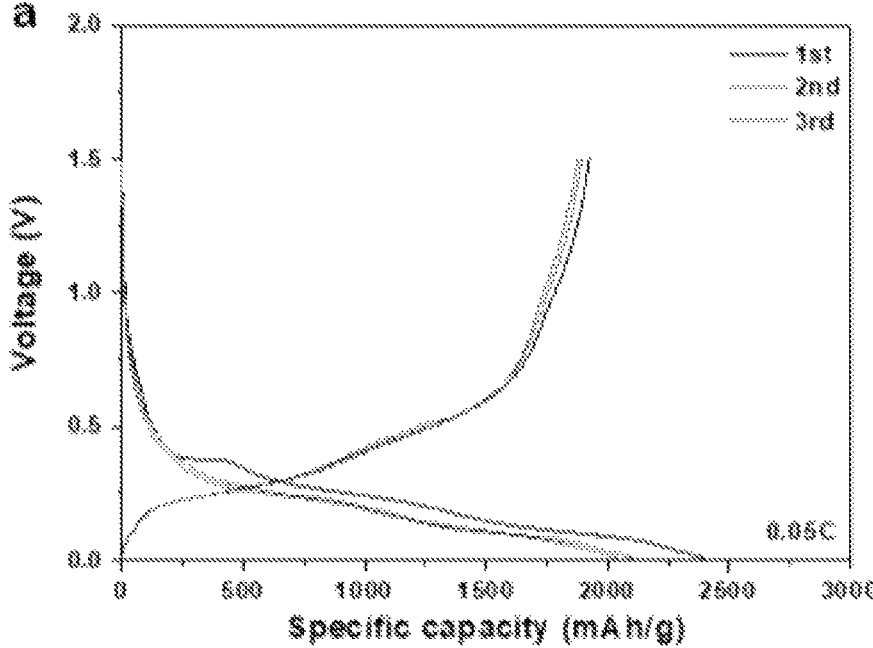
FIG. 26A shows the initial three discharge/charge voltage profiles of the three pieces of N-G@Si-30@HSi laminated electrode in the voltage range of 0.01-1.5 V at a current rate of 0.05 C, according to an embodiment of the present invention.
Figure 26B:
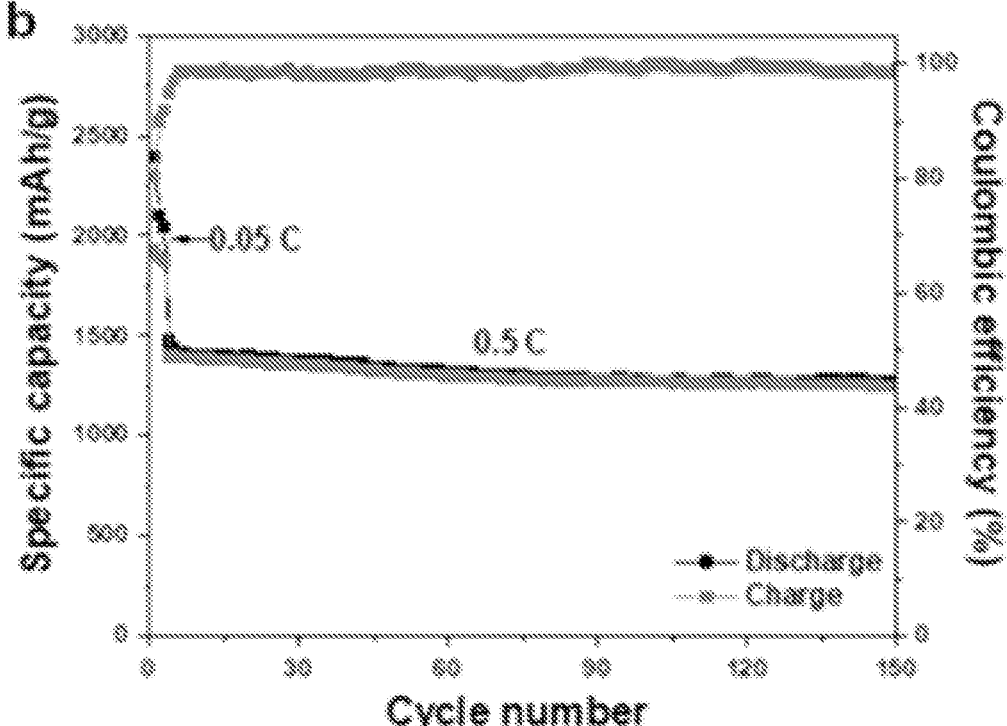
FIG. 26B shows capacity and Coulombic efficiency vs. cycle number of the three pieces of N-G@Si-30@HSi laminated electrode, according to an embodiment of the present invention.

In an embodiment, we noticed that the areal and volumetric capacities of the sandwich N-G@Si-30@HSi anode is relatively lower than many dense Si anodes reported in the literature because of its ultrathin thickness (4.07 μm) and excess open space in the porous architecture. The areal capacity can be simply boosted by laminating several pieces of N-G@Si-30@HSi together to assemble an integrated electrode or using thick N-doped graphene films as backbone to construct the hybrid electrode. FIG. 26A shows the initial three discharge/charge voltage profiles of the three pieces of N-G@Si-30@HSi laminated electrode in the voltage range of 0.01-1.5 V at a current rate of 0.05 C, according to an embodiment of the present invention. FIG. 26B shows capacity and Coulombic efficiency vs. cycle number of the three pieces of N-G@Si-30@HSi laminated electrode, according to an embodiment of the present invention. The current density is 0.05 C for the initial three cycles and 0.1 C for later cycles. As a demonstration, the three pieces of N-G@Si-30@HSi laminated electrode well reproduces the excellent performances of a single piece of N-G@Si-30@HSi (FIGS. 26A-26B), illustrating its feasibility to improve the areal capacity. The low volumetric capacity drawback can be potentially resolved by maximizing the Si loading amount through optimizing the porosity and pore sizes of graphene. Although there is a large space to further improve the performances of the sandwich Si anode, the current work has demonstrated that the robust sandwich configuration can be used to design high-performance Si electrodes for advanced Li-ion batteries.

In summary, in some embodiments, we have developed an innovative sandwich Si anode with 3D bicontinuous nano-architecture to address the key challenges of practical implementation of Si anodes in LIBs. This elaborately designed N-G@Si-30@HSi anode fulfills the strictest requirements demanded for Si anodes and thus resolves the long-lasting and critical issues of structural fracture, poor conductivity and SEI instability of Si anodes. The anode realizes inspiring lithium storage performances in terms of reversible capacity, Coulombic efficiency, cycling stability and rate capability in both half and full cells. More importantly, this hybrid Si anode achieves 10,000 stable cycling with a high capacity of 537 mAh/g at an ultra-high 10 C rate, demonstrating a commercial viability of the Si anode. This robust sandwich design can be extended to develop other high-performance alloy electrodes for advanced batteries.

Synthesis of Nanoporous Ni@N-Doped Graphene: In an embodiment, the Ni@N-doped graphene was fabricated using a nanoporous Ni templated CVD method. The porous Ni substrates were first annealed at 900° C. for 3 min under a mixed gas flow of 100 sccm H$_2$ and 2500 sccm Ar. Then, pyridine was introduced into the CVD chamber with gas flow for 2 min for the growth of N-doped graphene. Once the reaction was over, the furnace was immediately opened and cooled with a fan to ambient temperature. Free-standing nanoporous N-doped graphene films were obtained by etching away Ni substrates and subsequently supercritical CO$_2$ drying. The N-doped nanoporous graphene has a low density of 0.06 g/cm$^3$, high electric conductivity of ~1.2×10$^4$ S/m and large porosity of >95%.

Synthesis of Ni@N-Doped Graphene@Si: In an embodiment, silicon was loaded into the nanoporous Ni@N-doped graphene film using a RF magnetron sputtering system, where a pure silicon target was sputtered at 50 W under a working pressure of 0.40 Pa. To control the loading amount of Si, different sputtering time (30, 60 and 120 min) was adopted. N-doped graphene@Si film could be obtained after dissolving Ni by HCl and porous Si electrode was prepared by burning off the graphene in the N-doped graphene@Si-30.

Synthesis of N-doped Graphene@Si@Hybrid Silicate: In an embodiment, Ni@N-doped graphene@Si@hybrid silicate was synthesized by a vapor deposition method. First, a mixture of 3-mercaptopropyl trimethoxysilane (MPS), tetraethoxysilane (TEOS) and H$_2$O with a volume ratio of 1:1:0.1 was prepared. Then, the Ni@N-doped graphene@Si film was exposed to the above mixed vapor at 100° C. for 4 h. After this, the sample was taken out and further heat treated at 120° C. for 30 min to obtain the Ni@N-doped graphene@Si@hybrid silicate. Finally, free-standing nanoporous N-doped graphene@Si@hybrid silicate film was obtained by etching away Ni substrates and subsequently supercritical CO$_2$ drying. To confirm the uniform coating of hybrid silicate onto the whole N-doped graphene@Si framework, N-doped graphene@hybrid silicate was also synthesized with the same procedures except using N-doped graphene as host. After burning off the N-doped graphene, a nanoporous hybrid silicate film with the porous structural features of the graphene was obtained. Porous Si@hybrid silicate was synthesized by using porous Si as host with the above procedures. FIGS. 14A-14B are SEM images of N-G@HSi, according to an embodiment of the present invention. FIGS. 14C-14D are SEM images porous silicate after burning off the N-doped graphene, according to an embodiment of the present invention.

Materials Characterization: In an embodiment, A RIGAKU SmartLab 9MTP X-ray diffractometer was used to study the phases of each sample. The microstructure of the samples and the corresponding EDS mappings were characterized by a JEOL JIB-4600F field-emission scanning electron microscope and a JEOL JEM-2100F field-emission transmission electron microscope. An AXIS ultra DLD Shimazu X-ray photoelectron spectrometer with an Al Kα (mono) source in a vacuum of $10^{-7}$ Pa was applied to collect the XPS spectra. Raman measurements were carried out using a Renishaw InVia RM 1000 micro-Raman spectrometer with a 514 nm excitation laser. The electrical conductivities of the samples were conducted on a Physical Property Measurement System by a 4-probe method at room temperature.

In an embodiment, the in situ TEM characterization was performed on a FEI, Titan ETEM G2 environmental TEM using a Nanofactory TEM holder. The working electrode was prepared by attaching N-doped graphene@Si or N-doped graphene@Si@hybrid silicate to an aluminum (Al) rod with conductive silver epoxy and mounted on one side of the holder. The reference and counter electrode was formed by scratching lithium metal on a tungsten rod inside a glovebox and mounted on the other side of the holder. A $Li_2O$ layer formed on the Li metal during the holder transfer process served as the solid electrolyte. A bias voltage from −2 to 2 V was applied between the two electrodes to initiate the lithiation and delithiation processes of the N-doped graphene@Si and N-doped graphene@Si@hybrid silicate electrodes.

In an embodiment, for studying the morphology changes of the N-doped graphene@Si and N-doped graphene@Si@hybrid silicate electrodes after cycling, the cycled batteries were disassembled in a glove box and the electrodes were rinsed several times with dimethyl carbonate (DMC). After drying in vacuum for 30 min, the electrodes were quickly transferred to the vacuum chamber of SEM.

Electrochemical Measurements: In an embodiment, the electrochemical performances of the N-doped graphene, N-doped graphene@hybrid silicate, porous Si, N-doped graphenen@Si and N-doped graphene@Si@hybrid silicate electrodes as the working electrodes were evaluated by galvanostatic cycling of CR2032-type coin cells with a pure lithium foil as the counter electrode and Whatman glass fiber as the separator. 1 M $LiPF_6$ dissolved in ethyl carbonate and diethyl carbonate (1:1 in volume) with 5 wt % fluoroethylene carbonate additive was used as the electrolyte. Galvanostatic cycling tests of the coin cells were carried out between 0.01 and 1.5 V using a Hokuto battery testing system. The current density was 0.05 C (1 C=4200 mAh/g) for the initial three cycles. The electrochemical impedance measurement was conducted on a BioLogic VMP3 electrochemical workstation. All the specific capacities and current densities were calculated on the basis of the mass of the free-standing electrodes.

In an embodiment, the cycling stability of the pure Li metal anode was checked by R2032-type symmetric cells. The electrolyte consisted of 1 M $LiPF_6$ dissolved in ethyl carbonate and diethyl carbonate (1:1 in volume) with and without 5 wt % fluoroethylene carbonate additive. The stripping/plating capacity was 0.3 mAh/cm$^2$ at a current density of 5 mA/cm$^2$.

In an embodiment, full batteries based on the configuration of $LiFePO_4$‖glass fiber separator‖N-doped graphene@Si@hybrid silicate were assembled. The $LiFePO_4$ cathodes were prepared by using a typical slurry coating method with $LiFePO_4$ powder, carbon black and polyvinylidene fluoride (PVDF) in a weight ratio of 8:1:1. The electrolyte was the same as that used in the half cell. The loading mass of the $LiFePO_4$ for the testing cathodes was about 1 mg/cm$^2$ and 50 μL electrolyte was used for each cell. The anode capacity was 120% of that of the cathode capacity. Galvanostatic discharge/charge tests were performed on a Hokuto battery testing system with a voltage potential range of 1.5-3.8 V. Before assembling the full cells, the N-doped graphene@Si@hybrid silicate anodes were first electrochemically stabilized in half battery for 20 cycles to eliminate the initial active lithium loss and then disassembled for assembling full batteries. The $LiFePO_4$‖Li cells were tested with a voltage potential range of 2.2-4.0 V. All specific capacities and current densities were calculated based on the active material of the cathodes.

In the following paragraphs a Binder-Free and Stackable Nanoarchitectured Silicon Anodes for High-Energy-Density Li-Ion Batteries are described in further detail.

Technical Description and Impacts: FIG. 27A show schematics of the nanoarchitectured anode, according to an embodiment of the present invention. FIG. 27A-z is a zoomed in portion of FIG. 27A. FIG. 27B is a SEM image of a prototype anode, according to an embodiment of the present invention. The inset in FIG. 27B is a prototype anode. FIG. 27C is a HRTEM image of the sandwiched nanostructure, according to an embodiment of the present invention. In an embodiment, a binder-free and stackable graphene@Si@hybrid silicate anode with a 3D bi-continuous nanoarchitecture (FIG. 27A) to address the key challenges that impede silicon materials for practical implementation in high energy Li-ion batteries (LIBs) is provided. The feasibility of the ingenious electrode design has been demonstrated by prototype silicon anodes. The preliminary results from both half- and full-cell measurements show great promise that the cell performance of the 3D nanoarchitectured silicon anode can reach and even surpass all the Performance Targets of this FOA AOI 1a: Lithium Ion Batteries using Silicon-based Anodes Research, after structural and material optimizations, assisted by in situ and ex situ characterizations and numerical modeling.

Innovation and Impact: In an embodiment, higher energy densities of rechargeable LIBs have been intensively pursued to cater the ever-increasing energy demands of all electrical vehicles. As the state-of-the-art graphitic anodes are reaching the limit of their ultimate energy density (372 mAh g$^{-1}$), it is a desperate need of new anode materials that are capable of delivering higher energy density, enduring longer cycling life and possessing secure discharge/charge potentials. Of all possible candidates, Si stands out owing to its geographical ubiquity, low cost and large reversible capacity at satisfactory working potentials. However, at least two fundamental issues need to be solved before the commercial implementation of Si anodes becomes possible: (i) The large volume changes (>300%) during charge/discharge cycling, resulting in battery failure by disintegration of the electrodes, breaking of solid-electrolyte-interphase (SEI) films, contact loss with current collectors, and everlasting side reactions with electrolytes. (ii) The intrinsically poor ionic and electrical conductivities of Si, leading to inferior rate capability. To overcome the volume changes, an effective approach is nanostructuring by decreasing feature sizes of Si materials down to nano-regime. However, the nanostructures cannot solve the intrinsically poor electrical conduction of Si and the unstable interphases with electrolytes and are often challenged by lower Si loadings and poor scalability. Although carbon materials (graphene, CNT, etc.)

can improve the lithium storage performance of Si as conductive additives, the challenges in the stability of Si anodes and SEI films as well as the electronic/ionic conductivities of Si have not been fundamentally solved. Moreover, most Si anodes are currently prepared by slurry casting. The large mass fraction of inactive binders and current collectors significantly sacrifices the advantage of Si in energy density and, importantly, the conductive additives cannot guarantee stable contact during Si volume changes on cycling.

In an embodiment, the concept of binder-free & stackable nano-architectured Si anodes is conceived from our innovation of dealloying synthesis of free-standing nanoporous electrodes. The approach can be utilized to fabricate various porous materials with a high electrical conductivity, fast mass transport and a large specific surface area as electrodes of pseudocapacitors, cathodes of fuel cells, Li-air batteries and Zn-air batteries, and stable Tin and Li anodes. The development of nanoporous graphene (N-G) based Li-air batteries by PI and his team has been recognized as an important progress in battery technology by Japan Science and Technology Agency (JST) and documented as the technology innovation in Japan Government White Paper 2017.

Figure 28:
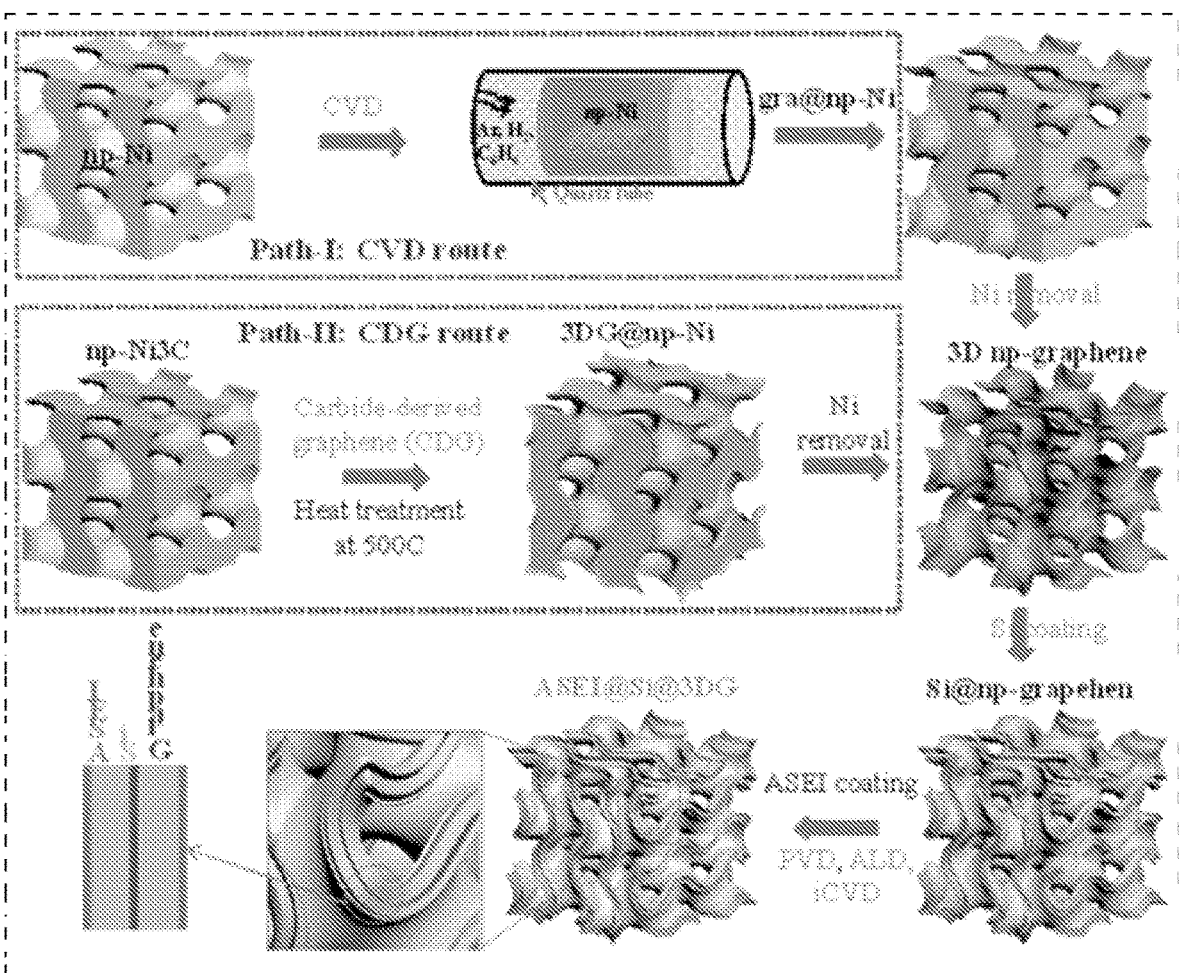
FIG. 28 is a schematic diagram of the processing routes of the sandwiched Si anode with a 3D bi-continuous architecture, according to an embodiment of the present invention.

FIG. 28 is a schematic diagram of the processing routes of the sandwiched Si anode with a 3D bi-continuous architecture, according to an embodiment of the present invention. In an embodiment, we conducted preliminary study to fabricate a prototype graphene@Si@hybrid silicate anode by following the CVD route (Path-I in FIG. 28). 3D N-G is fabricated as a free-standing and flexible film, which can be scaled up to B5 paper size (9.84×6.93 inches) using a commercial CVD system. The thickness of the N-G films can also be tuned from several to hundreds of micrometers with well retained structural integrity and high electrical conductivity. A relatively thin N-G film (~4 μm) was chosen to load Si by magnetron sputtering. The loading amount of Si is controlled by sputtering time. For example, after 30 min deposition, the uniform Si layer thickness in the N-G@Si is ~59 nm (FIG. 27C) and the mass fraction of Si is 53 wt. %. To form a stable electrode/electrolyte interface, a nanometer-thick conformal coating of inorganic-organic hybrid silicate (HSi) was deposited on the top surface of the Si layer by vapor deposition (FIG. 27A and FIG. 27C), acting as an artificial SEI (ASEI) film to prevent the direct contact of Si with electrolytes. The resulting N-G@Si@HSi anode is a free-standing and flexible film with a thickness of 4.07 μm (the inset of FIG. 27B). The Si loading in the 4 μm thick film varies from 0.085 to 0.308 mg/cm$^2$ with the sputtering from 30 to 120 min. The areal Si loading can be simply increased by stacking the N-G@Si@HSi papers. For examples, twenty layers give the areal Si loading of 2-6 mg/cm$^2$ at the anode thickness of ~80 μm.

Figure 29:
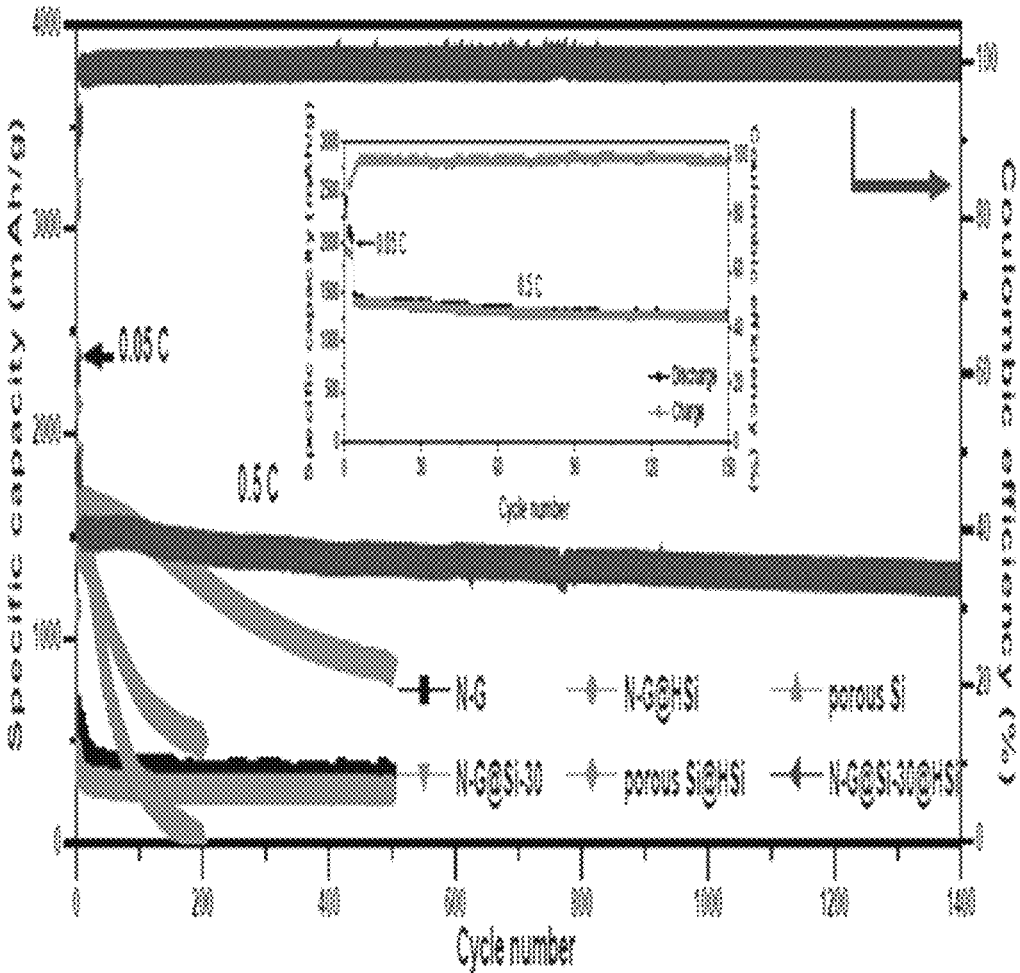
FIG. 29 shows a half-cell performance and Coulombic efficiency of the N-G@Si-30@HSi anodes tested at room temperature, according to an embodiment of the present invention.

FIG. 29 shows a half-cell performance and Coulombic efficiency of the N-G@Si-30@HSi anodes tested at room temperature, according to an embodiment of the present invention. FIG. 29 is similar to FIG. 5A. The current density is 0.05 C for the first three cycles and 0.5 C for later cycles. The voltage is between 0.01 and 1.5 V. The alloying/dealloying capacity is ~0.16 mAh/cm$^2$ for a single layer anode (4.07 μm thick) and ~0.48 mAh/cm$^2$ for three-layer anode (~12 μm) (the inset). The half-cell performance of the N-G@Si-30@HSi anode (Si sputtering time for 30 min) displayed a high reversible capacity (>1286 mAh/g), stable Coulombic efficiencies (CE) of 99% and an ultra-long lifespan (>1400 cycles without obvious capacity decay) at 0.5 C (1 C=4200 mAh/g), which are significantly better than those of porous Si, N-G@Si-30 and porous Si-30@HSi (FIG. 29), demonstrating that the novel Si anode design is feasible.

The advantageous 3D nanoarchitecture with a stable SEI also enables inspiring cycling stability at large current densities. High reversible capacities of 817 and 537 mAh/g can be obtained at rigorously high rates of 5 and 10 C after 10,000 cycles. The excellent performances can be well reproduced in multi-layer stacking anodes with a larger Si loading amount (the inset of FIG. 29). To explore the potential commercial viability of the Si anode, we also tested a prototype full cell which paired with a LiFePO$_4$ cathode. The cathode-capacity-limited cell delivered rechargeable capacity of 129.5 mAh/g at a current density of 0.2 C (1 C=170 mAh/g). The cycling measurement shows that immutably high CEs are achieved and capacity retentions of 95.7% and 95.4% are still realized after 100 cycles at 0.2 and 0.5 C.

In an embodiment, our preliminary studies have shown promising performance of the nanoarchitectured Si anodes. We aim to advance the research to further improve the anode performance at large scales and high Si loadings by combining structural and electrochemical characterizations, materials and processing optimization, and numerical simulations.

Figure 8:
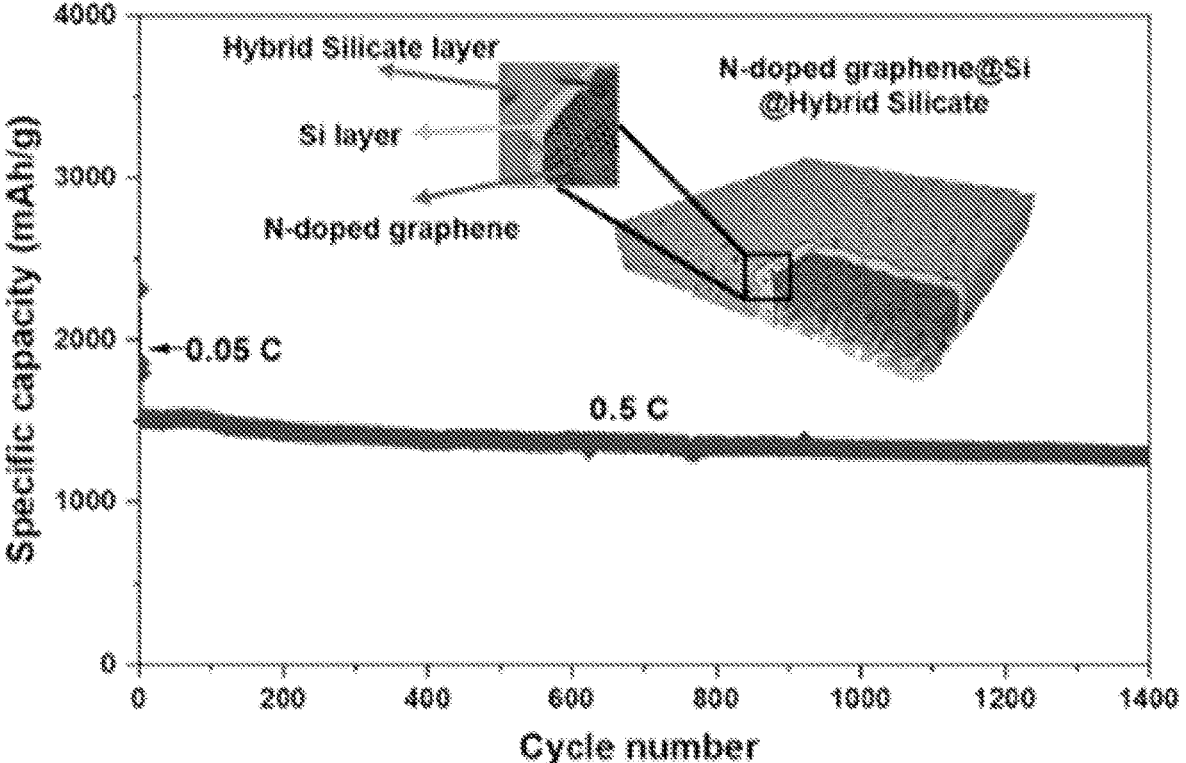
FIG. 8 is graph of the specific capacity versus a cycle number, according to an embodiment of the present invention.

In an embodiment, the layer contacts in the layer-stacked anodes are investigated. We noticed that the cycling performance and specific capacity of the binder-free anodes become worse when the stacking layers are over 20 (total ~801 μm thick, Si loading 2-6 mg/cm$^2$). Poor layer contacts appear to be responsible for the property deterioration. In an embodiment, the contacts can be improved by graphene wielding using the recently developed joule heating method. FIG. 8 is graph of the specific capacity versus a cycle number, according to an embodiment of the present invention. A free-standing nanoporous graphene@Si@hybrid silicate fulfills all the strictest requirements for high-performance Si anodes. This ingenious sandwich design in 3D porous nanoarchitecture endows the hybrid Si anode with high reversible capacities and an ultra-stable cycling at rigorously high rates of 5 and 10 C.

In an embodiment, although massive CVD growth can dramatically reduce the processing costs, it is still "expensive" for batteries. We develop an economic method (FIG. 2, Path-2) to fabricate the nano-architectured Si anodes based on our recent invention of carbide-derived graphene growth.

In an embodiment, the structural evolution of the Si anode can be characterized by multiscale methods, including in-operando hyperspectral confocal Raman imaging and tip-enhance Raman scattering (TERS). Recently, the first TERS mapping of SEI on amorphous silicon anode is implemented to provide both the composition and topography of Si SEI at nanoscale, which can allow the development of a glyme-based type of electrolyte surpassing the well-performing carbonate electrolyte (GenII electrolyte with 10 wt % FEC additive) by forming a more conformal SEI on Si anode.

In an embodiment, the numerical simulations can be conducted to provide the guidelines for improving the anode performance by optimizing the configurations, structure and component materials of the anode. The prototype silicon anode can be tested in a pouch cell close to or at practical conditions.

Aspects of the present invention can be applied to enable design of binder-free high-loading Si anodes which can be potentially scaled to automotive production volumes. The final deliverable of this project can be an advanced Si anode with the performance surpasses all the Performance Targets of this FOA AOI 1a at the high Si loading>4 mg/cm$^2$ and areal capacity>4 mAh/cm$^2$.

REFERENCES

1. Goodenough, J. B.; Kim, Y. Challenges for Rechargeable Li Batteries. *Chem. Mater.* 2009, 22, 587-603.
2. Nitta, N.; Wu, F.; Lee, J. T.; Yushin, G. Li-Ion Battery Materials: Present and Future. *Mater. Today* 2015, 18, 252-264.
3. Armand, M.; Tarascon, J.-M. Building Better Batteries. *Nature* 2008, 451, 652.
4. Choi, J. W.; Aurbach, D. Promise and Reality of Post-Lithium-Ion Batteries with High Energy Densities. *Nat. Rev. Mater.* 2016, 1, 16013.
5. Choi, N. S.; Chen, Z.; Freunberger, S. A.; Ji, X.; Sun, Y. K.; Amine, K.; Yushin, G.; Nazar, L. F.; Cho, J.; Bruce, P. G. Challenges Facing Lithium Batteries and Electrical Double-Layer Capacitors. *Angew. Chem. Int. Ed.* 2012, 51, 9994-10024.
6. Thackeray, M. M.; Wolverton, C.; Isaacs, E. D. Electrical Energy Storage for Transportation—Approaching the Limits of, and Going Beyond, Lithium-Ion Batteries. *Energy Environ. Sci.* 2012, 5, 7854-7863.
7. Reddy, M.; Subba Rao, G.; Chowdari, B. Metal Oxides and Oxysalts as Anode Materials for Li Ion Batteries. *Chem. Rev.* 2013, 113, 5364-5457.
8. Li, W.; Song, B.; Manthiram, A. High-Voltage Positive Electrode Materials for Lithium-Ion Batteries. *Chem. Soc. Rev.* 2017, 46, 3006-3059.
9. Li, X.; Zhi, L. Graphene Hybridization for Energy Storage Applications. *Chem. Soc. Rev.* 2018, 47, 3189-3216.
10. Winter, M.; Barnett, B.; Xu, K. Before Li Ion Batteries. *Chem. Rev.* 2018, 118, 11433-11456.
11. Park, C.-M.; Kim, J.-H.; Kim, H.; Sohn, H.-J. Li-Alloy Based Anode Materials for Li Secondary Batteries. *Chem. Soc. Rev.* 2010, 39, 3115-3141.
12. Son, Y.; Ma, J.; Kim, N.; Lee, T.; Lee, Y.; Sung, J.; Choi, S. H.; Nam, G.; Cho, H.; Yoo, Y. Quantification of Pseudocapacitive Contribution in Nanocage-Shaped Silicon-Carbon Composite Anode. *Adv. Energy Mater.* 2019, 9, 1803480.
13. An, Y.; Fei, H.; Zeng, G.; Ci, L.; Xiong, S.; Feng, J.; Qian, Y. Green, Scalable, and Controllable Fabrication of Nanoporous Silicon from Commercial Alloy Precursors for High-Energy Lithium-Ion Batteries. *ACS Nano* 2018, 12, 4993-5002.
14. Zuo, X.; Xia, Y.; Ji, Q.; Gao, X.; Yin, S.; Wang, M.; Wang, X.; Qiu, B.; Wei, A.; Sun, Z. Self-Templating Construction of 3D Hierarchical Macro-/Mesoporous Silicon from 0D Silica Nanoparticles. *ACS Nano* 2016, 11, 889-899.
15. Lee, J.; Moon, J.; Han, S. A.; Kim, J.; Malgras, V.; Heo, Y.-U.; Kim, H.; Lee, S.-M.; Liu, H. K.; Dou, S. X. Everlasting Living and Breathing Gyroid 3D Network in Si@SiO$_x$/C Nanoarchitecture for Lithium Ion Battery. *ACS Nano* 2019, 13, 9607-9619.
16. Park, S.-H.; King, P. J.; Tian, R.; Boland, C. S.; Coelho, J.; Zhang, C. J.; McBean, P.; McEvoy, N.; Kremer, M. P.; Daly, D. High Areal Capacity Battery Electrodes Enabled by Segregated Nanotube Networks. *Nat. Energy* 2019, 4, 560-567.
17. Zhang, L.; Wang, C.; Dou, Y.; Cheng, N.; Cui, D.; Du, Y.; Liu, P.; Al-Mamun, M.; Zhang, S.; Zhao, H. A Yolk-Shell Structured Silicon Anode with Superior Conductivity and High Tap Density for Full Lithium-Ion Batteries. *Angew. Chem. Int. Ed.* 2019, 58, 8824-8828.
18. Ge, M.; Rong, J.; Fang, X.; Zhang, A.; Lu, Y.; Zhou, C. Scalable Preparation of Porous Silicon Nanoparticles and Their Application for Lithium-Ion Battery Anodes. *Nano Res.* 2013, 6, 174-181.
19. Li, Y.; Yan, K.; Lee, H.-W.; Lu, Z.; Liu, N.; Cui, Y. Growth of Conformal Graphene Cages on Micrometre-Sized Silicon Particles as Stable Battery Anodes. *Nat. Energy* 2016, 1, 15029.
20. Chan, C. K.; Patel, R. N.; O'connell, M. J.; Korgel, B. A.; Cui, Y. Solution-Grown Silicon Nanowires for Lithium-Ion Battery Anodes. *ACS Nano* 2010, 4, 1443-1450.
21. Ge, M.; Rong, J.; Fang, X.; Zhou, C. Porous Doped Silicon Nanowires for Lithium Ion Battery Anode with Long Cycle Life. *Nano Lett.* 2012, 12, 2318-2323.
22. Ryu, J.; Chen, T.; Bok, T.; Song, G.; Ma, J.; Hwang, C.; Luo, L.; Song, H.-K.; Cho, J.; Wang, C. Mechanical Mismatch-Driven Rippling in Carbon-Coated Silicon Sheets for Stress-Resilient Battery Anodes. *Nat. Commun.* 2018, 9, 2924.
23. Ko, M.; Chae, S.; Ma, J.; Kim, N.; Lee, H.-W.; Cui, Y.; Cho, J. Scalable Synthesis of Silicon-Nanolayer-Embedded Graphite for High-Energy Lithium-Ion Batteries. *Nat. Energy* 2016, 1, 16113.
24. Li, X.; Gu, M.; Hu, S.; Kennard, R.; Yan, P.; Chen, X.; Wang, C.; Sailor, M. J.; Zhang, J.-G.; Liu, J. Mesoporous Silicon Sponge as An Anti-Pulverization Structure for High-Performance Lithium-Ion Battery Anodes. *Nat. Commun.* 2014, 5, 4105.
25. Huang, X.; Yang, J.; Mao, S.; Chang, J.; Hallac, P. B.; Fell, C. R.; Metz, B.; Jiang, J.; Hurley, P. T.; Chen, J. Controllable Synthesis of Hollow Si Anode for Long-Cycle-Life Lithium-Ion Batteries. *Adv. Mater.* 2014, 26, 4326-4332.
26. Li, B.; Yang, S.; Li, S.; Wang, B.; Liu, J. From Commercial Sponge Toward 3D Graphene-Silicon Networks for Superior Lithium Storage. *Adv. Energy Mater.* 2015, 5, 1500289.
27. Xu, Q.; Li, J. Y.; Sun, J. K.; Yin, Y. X.; Wan, L. J.; Guo, Y. G. Watermelon-Inspired Si/C Microspheres with Hierarchical Buffer Structures for Densely Compacted Lithium-Ion Battery Anodes. *Adv. Energy Mater.* 2017, 7, 1601481.
28. Chen, S.; Shen, L.; van Aken, P. A.; Maier, J.; Yu, Y. Dual-Functionalized Double Carbon Shells Coated Silicon Nanoparticles for High Performance Lithium-Ion Batteries. *Adv. Mater.* 2017, 29, 1605650.
29. Wei, D.; Gao, X.; Zeng, S.; Li, H.; Li, H.; Li, W.; Tao, X.; Xu, L.; Chen, P. Improving the Performance of Micro-Silicon Anodes in Lithium-Ion Batteries with a Functional Carbon Nanotube Interlayer. *ChemElectroChem* 2018, 5, 3143-3149.
30. Wei, D.; Zeng, S.; Li, H.; Li, X.; Liang, J.; Qian, Y. Multiphase Ge-Based Ge/FeGe/FeGe2/C Composite Anode for High Performance Lithium Ion Batteries. *Electrochim. Acta* 2017, 253, 522-529.
31. Liu, W.; Li, H.; Jin, J.; Wang, Y.; Zhang, Z.; Chen, Z.; Wang, Q.; Chen, Y.; Paek, E.; Mitlin, D. Synergy of Epoxy Chemical Tethers and Defect-Free Graphene in Enabling Stable Lithium Cycling of Silicon Nanoparticles. *Angew. Chem. Int. Ed.* 2019, 58, 16590-16600.
32. Liu, W.; Xia, Y.; Wang, W.; Wang, Y.; Jin, J.; Chen, Y.; Paek, E.; Mitlin, D. Pristine or Highly Defective? Understanding the Role of Graphene Structure for Stable Lithium Metal Plating. *Adv. Energy Mater.* 2019, 9, 1802918.

33. Shen, C.; Fang, X.; Ge, M.; Zhang, A.; Liu, Y.; Ma, Y.; Mecklenburg, M.; Nie, X.; Zhou, C. Hierarchical Carbon-Coated Ball-Milled Silicon: Synthesis and Applications in Free-Standing Electrodes and High-Voltage Full Lithium-Ion Batteries. *ACS Nano* 2018, 12, 6280-6291.

34. Han, J.; Liu, P.; Ito, Y.; Guo, X.; Hirata, A.; Fujita, T.; Chen, M. Bilayered Nanoporous Graphene/Molybdenum Oxide for High Rate Lithium Ion Batteries. *Nano Energy* 2018, 45, 273-279.

35. Han, J.; Guo, X.; Ito, Y.; Liu, P.; Hojo, D.; Aida, T.; Hirata, A.; Fujita, T.; Adschiri, T.; Zhou, H. Effect of Chemical Doping on Cathodic Performance of Bicontinuous Nanoporous Graphene for Li—O$_2$ Batteries. *Adv. Energy Mater.* 2016, 6, 1501870.

36. Guo, X.; Liu, P.; Han, J.; Ito, Y.; Hirata, A.; Fujita, T.; Chen, M. 3D Nanoporous Nitrogen-Doped Graphene with Encapsulated RuO$_2$ Nanoparticles for Li—O$_2$ Batteries. *Adv. Mater.* 2015, 27, 6137-6143.

37. Ito, Y.; Qiu, H. J.; Fujita, T.; Tanabe, Y.; Tanigaki, K.; Chen, M. Bicontinuous Nanoporous N-doped Graphene for the Oxygen Reduction Reaction. *Adv. Mater.* 2014, 26, 4145-4150.

38. Ito, Y.; Shen, Y.; Hojo, D.; Itagaki, Y.; Fujita, T.; Chen, L.; Aida, T.; Tang, Z.; Adschiri, T.; Chen, M. Correlation Between Chemical Dopants and Topological Defects in Catalytically Active Nanoporous Graphene. *Adv. Mater.* 2016, 28, 10644-10651.

39. Chen, L.; Han, J.; Ito, Y.; Fujita, T.; Huang, G.; Hu, K.; Hirata, A.; Watanabe, K.; Chen, M. Heavily Doped and Highly Conductive Hierarchical Nanoporous Graphene for Electrochemical Hydrogen Production. *Angew. Chem. Int. Ed.* 2018, 57, 13302-13307.

40. Ito, Y.; Tanabe, Y.; Han, J.; Fujita, T.; Tanigaki, K.; Chen, M. Multifunctional Porous Graphene for High-Efficiency Steam Generation by Heat Localization. *Adv. Mater.* 2015, 27, 4302-4307.

41. Liu, F.; Xiao, Q.; Wu, H. B.; Shen, L.; Xu, D.; Cai, M.; Lu, Y. Fabrication of Hybrid Silicate Coatings by a Simple Vapor Deposition Method for Lithium Metal Anodes. *Adv. Energy Mater.* 2018, 8, 1701744.

42. Shen, B.; Wang, S.; Tenhaeff, W. Ultrathin Conformal Polycyclosiloxane Films to Improve Silicon Cycling Stability. *Sci. Adv.* 2019, 5, eaaw4856.

43. Nanda, J.; Yang, G.; Hou, T.; Voylov, D. N.; Li, X.; Ruther, R. E.; Naguib, M.; Persson, K.; Veith, G. M.; Sokolov, A. P. Unraveling the Nanoscale Heterogeneity of Solid Electrolyte Interphase Using Tip-Enhanced Raman Spectroscopy. *Joule* 2019, 3, 2001-2019.

44. Goodenough, J. B.; Kim, Y. Challenges for Rechargeable Li Batteries. *Chem. Mater.* 2009, 22, 587-603.

45. Nitta, N.; Wu, F.; Lee, J. T.; Yushin, G. Li-Ion Battery Materials: Present and Future. *Mater. Today* 2015, 18, 252-264.

46. Armand, M.; Tarascon, J.-M. Building Better Batteries. *Nature* 2008, 451, 652.

47. Choi, J. W.; Aurbach, D. Promise and Reality of Post-Lithium-Ion Batteries with High Energy Densities. *Nat. Rev. Mater.* 2016, 1, 16013.

48. Szczech, J. R.; Jin, S. Nanostructured Silicon for High Capacity Lithium Battery Anodes. *Energy Environ. Sci.* 2011, 4, 56-72.

49. Obrovac, M. N.; Chevrier, V. L. Alloy Negative Electrodes for Li-Ion Batteries. *Chem. Rev.* 2014, 114, 11444-11502.

50. Shen, X.; Tian, Z.; Fan, R.; Shao, L.; Zhang, D.; Cao, G.; Kou, L.; Bai, Y. Research Progress on Silicon/Carbon Composite Anode Materials for Lithium-Ion Battery. *J. Energy Chem.* 2018, 27, 1067-1090.

51. Mukanova, A.; Jetybayeva, A.; Myung, S. T.; Kim, S. S.; Bakenov, Z. A Mini-Review on the Development of Si-Based Thin Film Anodes for Li-Ion Batteries. *Mater. Today Energy* 2018, 9, 49-66.

52. An, Y.; Fei, H.; Zeng, G.; Ci, L.; Xiong, S.; Feng, J.; Qian, Y. Green, Scalable, and Controllable Fabrication of Nanoporous Silicon from Commercial Alloy Precursors for High-Energy Lithium-Ion Batteries. *ACS Nano* 2018, 12, 4993-5002.

53. Zuo, X.; Xia, Y.; Ji, Q.; Gao, X.; Yin, S.; Wang, M.; Wang, X.; Qiu, B.; Wei, A.; Sun, Z. Self-Templating Construction of 3D Hierarchical Macro-/Mesoporous Silicon from 0D Silica Nanoparticles. *ACS Nano* 2016, 11, 889-899.

54. Lee, J.; Moon, J.; Han, S. A.; Kim, J.; Malgras, V.; Heo, Y.-U.; Kim, H.; Lee, S.-M.; Liu, H. K.; Dou, S. X. Everlasting Living and Breathing Gyroid 3D Network in Si@SiOx/C Nanoarchitecture for Lithium Ion Battery. *ACS Nano* 2019, 13, 9607-9619.

55. Park, S.-H.; King, P. J.; Tian, R.; Boland, C. S.; Coelho, J.; Zhang, C. J.; McBean, P.; McEvoy, N.; Kremer, M. P.; Daly, D. High Areal Capacity Battery Electrodes Enabled by Segregated Nanotube Networks. *Nat. Energy* 2019, 4, 560-567.

56. Zhang, L.; Wang, C.; Dou, Y.; Cheng, N.; Cui, D.; Du, Y.; Liu, P.; Al-Mamun, M.; Zhang, S.; Zhao, H. A Yolk-Shell Structured Silicon Anode with Superior Conductivity and High Tap Density for Full Lithium-Ion Batteries. *Angew. Chem. Int. Ed.* 2019, 58, 8824-8828.

57. Ge, M.; Rong, J.; Fang, X.; Zhang, A.; Lu, Y.; Zhou, C. Scalable Preparation of Porous Silicon Nanoparticles and Their Application for Lithium-Ion Battery Anodes. *Nano Res.* 2013, 6, 174-181.

58. Li, Y.; Yan, K.; Lee, H.-W.; Lu, Z.; Liu, N.; Cui, Y. Growth of Conformal Graphene Cages on Micrometre-Sized Silicon Particles as Stable Battery Anodes. *Nat. Energy* 2016, 1, 15029.

59. Chan, C. K.; Patel, R. N.; O'connell, M. J.; Korgel, B. A.; Cui, Y. Solution-Grown Silicon Nanowires for Lithium-Ion Battery Anodes. *ACS Nano* 2010, 4, 1443-1450.

60. Ge, M.; Rong, J.; Fang, X.; Zhou, C. Porous Doped Silicon Nanowires for Lithium Ion Battery Anode with Long Cycle Life. *Nano Lett.* 2012, 12, 2318-2323.

61. Ryu, J.; Chen, T.; Bok, T.; Song, G.; Ma, J.; Hwang, C.; Luo, L.; Song, H.-K.; Cho, J.; Wang, C. Mechanical Mismatch-Driven Rippling in Carbon-Coated Silicon Sheets for Stress-Resilient Battery Anodes. *Nat. Commun.* 2018, 9, 2924.

62. Ko, M.; Chae, S.; Ma, J.; Kim, N.; Lee, H.-W.; Cui, Y.; Cho, J. Scalable Synthesis of Silicon-Nanolayer-Embedded Graphite for High-Energy Lithium-Ion Batteries. *Nat. Energy* 2016, 1, 16113.

63. Li, X.; Gu, M.; Hu, S.; Kennard, R.; Yan, P.; Chen, X.; Wang, C.; Sailor, M. J.; Zhang, J.-G.; Liu, J. Mesoporous Silicon Sponge as An Anti-Pulverization Structure for High-Performance Lithium-Ion Battery Anodes. *Nat. Commun.* 2014, 5, 4105.

64. Huang, X.; Yang, J.; Mao, S.; Chang, J.; Hallac, P. B.; Fell, C. R.; Metz, B.; Jiang, J.; Hurley, P. T.; Chen, J. Controllable Synthesis of Hollow Si Anode for Long-Cycle-Life Lithium-Ion Batteries. *Adv. Mater.* 2014, 26, 4326-4332.

65. Hou, T.; Yang. G.; Rajput, N. N.; Self, J.; Park, S. W.; Nanda, J.; Persson. K. A. The Influence of FEC on the Solvation Structure and Reduction Reaction of LiPF$_6$/EC Electrolytes and Its Implication for Solid Electrolyte Interphase Formation. *Nano Energy* 2019, 64, 103881.

66. Nanda, J.; Yang, G.; Hou, T.; Voylov, D. N.; Li, X.; Ruther, R. E.; Naguib, M.; Persson, K.; Veith, G. M.; Sokolov. A. P. Unraveling the Nanoscale Heterogeneity of Solid Electrolyte Interphase using Tip-Enhanced Raman Spectroscopy. *Joule* 2019, 3, 2001-2019.

67. Fujita, T.; Guan, P.; McKenna, K.; Lang, X.; Hirata; A.; Zhang, L.; Tokunaga, T.; Arai, S.; Yamamoto, Y.; Tanaka, N.; Ishikawa, Y.; Asao, N.; Yamamoto, Y.; Erlebacher, J.; Chen, M. W. Atomic Origins of the High Catalytic Activity of Nanoporous Gold. *Nat. Mater.* 2012, 11, 775-780.

68. Lang, X. Y.; Hirata, A.; Fujita, T.; Chen, M. W. Nanoporous Metal/Oxide Hybrid Electrodes for Electrochemical Supercapacitors, *Nat. Nanotechnol.* 2011, 6, 232-236.

69. Snyder, J.; Fujita, T.; Chen, M. W.; Erlebacher, J. Oxygen Reduction Reaction in Nanoporous Metal/Ionic Liquid Composite Electrocatalysts, *Nat. Mater.* 2010, 9, 904-907.

70. Guo, X. W.; Liu, P.; Han, J. H.; Ito, Y.; Hirata, A.; Fujita, T.; Chen, M. W. 3D Nanoporous Nitrogen Doped Graphene with Encapsulated RuO$_2$ Nanoparticles for Li—O$_2$ Batteries. *Adv. Mater.* 2015, 27, 6137.

71. Han, J. H.; Guo, X. W.; Ito, Y.; Liu, P.; Hojo, D.; Aida, T.; Hirata, A.; Fujita, T.; Adschiri, T.; Zhou, H.; Chen, M. W. Effect of Chemical Doping on Cathodic Performance of Nanoporous Graphene for Li—O$_2$ Batteries. *Adv. Energy Mater.* 2016, 6, 1501870.

72. Han, J. H.; Huang, G.; Ito, Y.; Guo, X.; Fujita, T.; Liu, P.; Hirata, A.; Chen, M. W. Full Performance Nanoporous Graphene Based Li—O$_2$ Batteries through Solution Phase Oxygen Reduction and Redox-Additive Mediated Li$_2$O$_2$ Oxidation. *Adv. Energy Mater.* 2017, 7, 1601933.

73. Qiu, H-J.; Du, P.; Hu, K.; Gao, J.; Li, H.; Liu, P.; Ina, T.; Ohara, T.; Ito, Y.; Chen, M. W. Metal and Nonmetal Codoped 3D Nanoporous Graphene for Efficient Bifunctional Electrocatalysis and Rechargeable Zn-Air Batteries. *Adv. Mater.* 2019, 31, 1900843.

74. Yu, Y., Gu, L., Lang, X. Y., Zhu, C. B., Fujita, T., Chen, M. W.; Maier, J. Li Storage in 3D Nanoporous Au-Supported Nanocrystalline Tin. *Adv. Mater.* 2011, 23, 2443.

75. Huang, G.; Han, J. H.; Zhang, F.; Wang, Z.; Kashani, H.; Watanabe, K.; Chen, M. W. Lithiophilic 3D Nanoporous Nitrogen-Doped Graphene for Dendrite-Free and Ultrahigh-Rate Lithium-Metal Anodes. *Adv. Mater.* 2019, 31, 1805334.

76. https://www.jst.go.jp/EN/achievements/research/index.html

77. Huang, G.; Han, J. H.; Yang, C.; Wang, Z.; Fujita, T.; Hirata, A.; Chen, M. W. Graphene-Based Quasi-Solid-State Lithium-Oxygen Batteries with High Energy Efficiency and a Long Cycling Lifetime. *NPG Asia Mater.* 2018, 10, 1037.

78. Yao, Y.; Fu, K. K.; Zhu, S.; Dai, J.; Wang, Y.; Pastel, G.; Chen, Y.; Li, T.; Wang, C.; Li, T.; Hu, L. B. Carbon Welding by Ultrafast Joule Heating. *Nano Lett.* 2016, 16, 7282.

79. Han, J. H.; Huang, G.; Wang, Z. L.; Lu, Z.; Du, J.; Kashani, H.; Chen, M. W. Low-Temperature Carbide-Mediated Growth of Bicontinuous Nitrogen-Doped Mesoporous Graphene as an Efficient Oxygen Reduction Electrocatalyst. *Adv. Mater.* 2018, 30, 1803588.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. An electrode comprising:
an electrically conductive porous graphene core;
a silicon layer disposed on an internal surface of the electrically conductive porous graphene core so as to be in contact with said internal surface of the electrically conductive porous graphene core; and
an ion-conductive hybrid silicate layer disposed on the silicon layer.

2. The electrode according to claim 1, wherein the electrically conductive porous graphene core comprises N-doped graphene.

3. The electrode according to claim 1, wherein the ion-conductive hybrid silicate (HSi) layer is configured to prevent electrolyte infiltration into the silicon layer.

4. The electrode according to claim 1, wherein the ion-conductive hybrid silicate (HSi) layer is configured to regulate solid electrolyte interphase (SEI) on an outer surface of the ion-conductive hybrid silicate layer.

5. The electrode according to claim 1, wherein the ion-conductive hybrid silicate (HSi) layer comprises silicon oxide $Si_xO_y$, and organic moeities, wherein x and y are integer numbers.

6. The electrode according to claim 5, wherein the organic moeities are selected from the group consisting of: —OCH$_3$, —OCH$_2$CH$_3$ and —CH$_2$CH$_2$SH.

7. The electrode according to claim 1, wherein a silicon-oxygen bond forms at an interface between the silicon layer and the ion-conductive hybrid silicate layer (HSi).

8. The electrode according to claim 1, wherein the ion-conductive hybrid silicate (HSi) layer has an ionic conductivity greater than $10^{-6}$ S/cm.

9. The electrode according to claim 1, wherein the silicon layer has a thickness between 10 nm and 500 nm.

10. The electrode according to claim 1, wherein the electrically conductive porous graphene core has a thickness of approximately 0.3 nm to 5 nm.

11. The electrode according to claim 1, wherein said electrode has a reversible capacity greater than 1286 mAh/g and a lifespan greater than 1400 cycles.

12. The electrode according to claim 1, wherein a mass fraction of the silicon layer to the electrically conductive porous graphene core is higher than 30 wt %.

13. A method of making an electrode comprising:
growing N-doped graphene on an internal surface of porous nickel (Ni) to obtain a substrate having a three-dimensional bi-continuous N-doped graphene on nickel such that the N-doped graphene covers a pore surface of the porous nickel;
etching the nickel in the substrate to remove the nickel and form a porous N-doped graphene core;
depositing a silicon (Si) layer into the porous N-doped graphene core; and
depositing a layer of inorganic-organic hybrid silicate on the silicon layer to obtain an electrode having the silicon layer sandwiched between the porous N-doped graphene core and the layer of inorganic-organic hybrid silicate.

14. The method according to claim 13, wherein growing the N-doped graphene on the internal surface of porous nickel (Ni) comprises growing the N-doped graphene on the internal surface of the porous nickel by chemical vapor deposition (CVD).

15. The method according to claim 13, wherein growing the N-doped graphene on the internal surface of porous nickel (Ni) comprises carburizing the porous nickel (Ni) by using a low temperature chemical reaction to form a porous Ni3C, and annealing at a higher temperature to obtain porous graphene on porous nickel.

16. The method according to claim 13, wherein depositing the silicon layer into the porous N-doped graphene core comprises depositing the silicon layer using a sputtering method.

17. The method according to claim 13, wherein depositing the silicon layer into the porous N-doped graphene core comprises depositing the silicon layer for a period of time greater than 30 minutes to generate a loading mass of silicon greater than 0.085 mg/cm$^3$ and a thickness of the silicon layer greater than 59 nm.

18. The method according to claim 13, wherein depositing the silicon layer into the porous N-doped graphene core comprises coating an internal surface of the N-doped graphene.

19. The method according to claim 13, wherein depositing the layer of inorganic-organic hybrid silicate on the silicon layer comprises depositing the layer of inorganic-organic hybrid silicate using a vapor deposition process.

20. The method according to claim 13, wherein the layer of inorganic-organic hybrid silicate prevents direct contact of the silicon layer with an electrolyte during operation.

21. An electrical battery comprising:
   a cathode,
   an anode spaced apart from the cathode, the anode comprising:
      an electrically conductive porous graphene core;
      a silicon layer disposed on an internal surface of the electrically conductive porous graphene core so as to be in contact with said internal surface of the electrically conductive porous graphene core, and
      an ion-conductive hybrid silicate layer disposed on the silicon layer; and
   an electrolyte configured to transfer electric charge between the cathode and the anode.

22. The electrical battery according to claim 21, wherein the electrical battery is a lithium-ion battery having lithium in said cathode.

23. The electrical battery according to claim 21, wherein the electrically conductive porous graphene core comprises N-doped graphene.

24. The electrical battery according to claim 21, wherein the ion-conductive hybrid silicate (HSi) layer is configured to prevent infiltration of the electrolyte into the silicon layer.

25. The electrical battery according to claim 21, wherein the ion-conductive hybrid silicate (HSi) layer comprises silicon oxide $Si_xO_y$ and organic moeities, wherein x and y are integer numbers.

26. The electrical battery according to claim 21, wherein the anode is free-standing and re-stackable.

* * * * *